United States Patent
Boyd et al.

(10) Patent No.: US 7,424,617 B2
(45) Date of Patent: Sep. 9, 2008

(54) OFFLINE-ONLINE INCENTIVE POINTS SYSTEM AND METHOD

(75) Inventors: Eric Boyd, Campbell, CA (US); Arturo Bejar, Mountain View, CA (US); Anil Pal, Sunnyvale, CA (US); David Roman, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 775 days.

(21) Appl. No.: 10/751,038

(22) Filed: Dec. 31, 2003

(65) Prior Publication Data

US 2004/0193489 A1    Sep. 30, 2004

Related U.S. Application Data

(62) Division of application No. 09/638,457, filed on Aug. 14, 2000.

(51) Int. Cl.
*H04L 9/00*    (2006.01)
*G06Q 30/00*   (2006.01)

(52) U.S. Cl. .................... 713/176; 713/181; 705/14; 463/16

(58) Field of Classification Search ............ 705/14
See application file for complete search history.

(56) References Cited

U.S. PATENT DOCUMENTS

| | | | |
|---|---|---|---|
| 5,056,019 A | 10/1991 | Schultz et al. | 364/405 |
| 5,142,578 A | 8/1992 | Matyas et al. | 380/21 |
| 5,426,281 A | 6/1995 | Abecassis | |
| 5,483,444 A | 1/1996 | Heintzeman et al. | 364/401 |
| 5,537,314 A | 7/1996 | Kanter | 364/406 |
| 5,668,591 A | 9/1997 | Shintani | 348/12 |
| 5,734,838 A | 3/1998 | Robinson et al. | |
| 5,745,573 A | 4/1998 | Lipner et al. | 380/21 |
| 5,774,870 A | 6/1998 | Storey | |
| 5,774,873 A | 6/1998 | Berent et al. | 705/26 |
| 5,778,367 A | 7/1998 | Wesinger, Jr. et al. | 707/10 |
| 5,791,990 A * | 8/1998 | Schroeder et al. | 463/17 |

(Continued)

OTHER PUBLICATIONS

FIPS PUB 46-3—Data Encryption Standard (DES), NIST, Oct. 1999, Retrieved from the Internet on Apr. 30, 2007: <URL: http://csrc.nist.gov/publications/fips/fips46-3/fips46-3.pdf>.*

(Continued)

*Primary Examiner*—Gilberto Barron, Jr.
*Assistant Examiner*—Minh Dinh
(74) *Attorney, Agent, or Firm*—Morrison & Foerster LLP

(57) ABSTRACT

An electronic points system that allows consumers to redeem online those points that were earned offline is described. In one implementation, the offline-online points system is applied to a soft drink bottle caps program. A soft drink company is sponsoring a promotions program where certain bottle caps are worth so many points. A consumer buys a soft drink bottle at a local store. The lucky consumer discovers that he is the beneficiary of a winning bottle cap, and in particular, a bottle cap that is worth N points. Instead of redeeming this winning bottle cap in the traditional way, the consumer logs onto the soft drink company's website and registers his bottle cap code. Thereafter, after registration, the consumer can redeem these points for any merchandise that is available for purchase with these points at any participating company's online store.

6 Claims, 19 Drawing Sheets

U.S. PATENT DOCUMENTS

| | | | | |
|---|---|---|---|---|
| 5,794,210 | A | 8/1998 | Goldhaber et al. | 705/14 |
| 5,794,219 | A | 8/1998 | Brown | 705/37 |
| 5,796,830 | A | 8/1998 | Johnson et al. | 380/21 |
| 5,806,045 | A | 9/1998 | Biorge et al. | 705/14 |
| 5,818,914 | A | 10/1998 | Fujisaki | 379/93.12 |
| 5,825,884 | A | 10/1998 | Zdepski | 380/25 |
| 5,835,896 | A | 11/1998 | Fisher et al. | 705/37 |
| 5,855,008 | A | 12/1998 | Goldhaber et al. | 705/14 |
| 5,890,138 | A | 3/1999 | Godin et al. | 705/26 |
| 5,892,827 | A * | 4/1999 | Beach et al. | 705/76 |
| 5,905,975 | A | 5/1999 | Ausubel | 705/37 |
| 5,914,472 | A | 6/1999 | Foladare et al. | 235/380 |
| 5,923,016 | A | 7/1999 | Fredregill et al. | 235/380 |
| 5,937,066 | A | 8/1999 | Gennaro et al. | 380/21 |
| 5,937,391 | A | 8/1999 | Ikeda et al. | 705/14 |
| 5,983,196 | A | 11/1999 | Wendkos | 705/14 |
| 5,991,406 | A | 11/1999 | Lipner et al. | 380/21 |
| 5,996,997 | A | 12/1999 | Kamille | |
| 6,009,177 | A | 12/1999 | Sudia | 380/25 |
| 6,009,411 | A | 12/1999 | Kepecs | 705/14 |
| 6,009,412 | A | 12/1999 | Storey | 705/14 |
| 6,012,039 | A | 1/2000 | Hoffman et al. | |
| 6,012,045 | A | 1/2000 | Barzilai et al. | 705/37 |
| 6,014,645 | A | 1/2000 | Cunningham | |
| 6,030,288 | A | 2/2000 | Davis et al. | 463/29 |
| 6,052,469 | A | 4/2000 | Johnson et al. | 380/286 |
| 6,055,573 | A | 4/2000 | Gardenswartz et al. | 709/224 |
| 6,061,660 | A | 5/2000 | Eggleston et al. | |
| 6,070,147 | A | 5/2000 | Harms et al. | 705/14 |
| 6,072,870 | A | 6/2000 | Nguyen et al. | 380/24 |
| 6,075,971 | A | 6/2000 | Williams et al. | 455/5.1 |
| 6,085,320 | A | 7/2000 | Kaliski, Jr. | 713/168 |
| 6,110,044 | A * | 8/2000 | Stern | 463/29 |
| 6,113,495 | A | 9/2000 | Walker et al. | |
| 6,178,408 | B1 | 1/2001 | Copple et al. | 705/14 |
| 6,251,017 | B1 * | 6/2001 | Leason et al. | 463/42 |
| 6,484,147 | B1 | 11/2002 | Brizendine et al. | |
| 6,510,418 | B1 | 1/2003 | Case et al. | 705/26 |
| 6,532,448 | B1 | 3/2003 | Higginson et al. | |
| 6,594,640 | B1 | 7/2003 | Postrel | |
| 6,629,081 | B1 | 9/2003 | Cornelius et al. | |
| 6,704,713 | B1 | 3/2004 | Brett | |
| 6,766,301 | B1 * | 7/2004 | Daniel et al. | 705/14 |
| 6,829,586 | B2 | 12/2004 | Postrel | |
| 6,987,853 | B2 * | 1/2006 | Uner | 380/44 |
| 7,013,286 | B1 * | 3/2006 | Aggarwal et al. | 705/14 |
| 2001/0034663 | A1 | 10/2001 | Teveler et al. | |
| 2002/0010627 | A1 * | 1/2002 | Lerat | 705/14 |
| 2002/0016737 | A1 * | 2/2002 | Izzo et al. | 705/14 |

OTHER PUBLICATIONS

Krawczyk et al., "RFC 2104—HMAC: Keyed-Hashing for Message Authentication", Feb. 1997, Retrieved from the Internet on Apr. 30, 2007: <URL: http://www.faqs.org/ftp/rfc/pdf/rfc2104.txt.pdf>.*

Schneier, "Applied Cryptography", 1996, John Wiley & Sons, 2nd Edition, pp. 30-31.*

Schneier, "Applied Cryptography", 1996, John Wiley & Sons, 2nd Edition, pp. 455-459.*

Baig, E. C. (Jul. 31, 1997). "Going Once. Going Twice. Cybersold!," Business Week, 4 pages.

Tamosaitis, N. (Jan. 28, 1997). "Online Auctions: Bid Adieu to High Prices," Financial Advisor, HomePC, 3 pages.

* cited by examiner

DUTCH AUCTION - SECOND EMBODIMENT

OFFLINE-ONLINE INCENTIVE POINTS SYSTEM AND METHOD

REFERENCE TO EARLIER FILED APPLICATION

This application is a Divisional Application claiming the benefit of earlier-filed co-pending U.S. patent application Ser. No. 09/638,457, filed Aug. 14, 2000, entitled "OFFLINE-ONLINE INCENTIVE POINTS SYSTEM AND METHOD."

BACKGROUND OF THE INVENTION

1. Field of the Invention

The present invention relates generally to incentive point programs. More particularly, the present invention relates to offline acquisition of incentive points and online registration/verification/redemption of these points.

2. Description of Related Art

Merchants have long realized that due to marketing costs, the first sale made to a customer is far more expensive (and thus less profitable) than ensuing sales. In order to maximize profits, most merchants work to build long-time relationships with customers, yielding ongoing sales with higher and higher profits. While many merchants would be willing to offer lower prices to entice particular customers to stick with them and not switch to competitors, this is often impractical and always expensive. Charging different customers different prices is difficult at many levels and even if it could be accomplished, giving the incremental profit back to the consumer defeats the merchant's goal in the first place. For this reason, incentive award programs were developed.

What is an incentive award program? Incentive award programs come in two varieties—loyalty incentives and permission marketing. Loyalty incentive programs award "purchase points" to those consumers who take certain purchasing actions. A classic loyalty incentive program provides a benefit to consumers who stick with or are loyal to a merchant and not switch to competitors, while "punishing" those who switch from brand to brand. Typically, an incentive is an incremental benefit that is worthless until enough points have been earned to redeem for a discount or a gift. Permission marketing programs reward consumers with "attention points" for paying attention to a marketing message.

The loyalty incentive program will be discussed first. A highly successful form of loyalty incentive award program with which many people are familiar is the airline mileage program, although non-mileage-based programs also are widespread. Mileage programs currently are conducted by almost every commercial airline. Travelers can earn mileage or mileage points by purchasing an airline ticket and actually taking the trip. The exact number of miles earned by the traveler is usually calculated by some formula based on the distance of the trip. After accumulating a certain number of miles or mileage points, the traveler can redeem his miles for a free or discounted airline ticket or some other award (e.g., coffee maker, free upgrades) that he can select from a catalog. The price-shopping, airline-switching fickle traveler would arguably not benefit (or not benefit sooner) than the traveler who is loyal to one airline.

Another incentive award program is the bottle caps collection. Typically, a soft drink merchant sells soft drink in a disposable package—glass bottle, plastic bottle, and cans. In the case of bottles, some soft drink merchants have sponsored promotional programs where some bottle cap may be worth some value. One bottle cap have an inscription saying, "You have won!" At this point, the lucky consumer would either take his bottle cap to the store where he purchased his soft drink or mail them to the designated redemption center to claim his prize.

Similar incentive award programs also have begun to flourish in an online environment over the Internet. Buyers can earn points online, for example, by purchasing goods from an online merchant, clicking on advertisements, filling out registrations and surveys, and performing various other activities of interest to merchants, advertisers and other companies. Users accumulate "points" into an "account" from which they can redeem their points for certain goods or services.

Even those consumers who are not regular online users or even familiar with the Internet may well be familiar with a variation of the point system. Many merchants award discounted or free merchandise to loyal and frequent customers. For example, by ordering a regular meal at a restaurant on ten different occasions (recorded on a stamped card), the customer may get 50% off the eleventh meal (or even get the eleventh meal free). Similarly, another merchant might give a loyal customer a free drink with his meal after every seventh or tenth visit. Another merchant might give $10 off the next purchase for a first-time customer. These variations on the loyalty incentive point system are just that—variations. Even though an actual physical card may be stamped after each visit to a restaurant or a gift certificate is handed out, these stamps and gift certificates are analogous to points, albeit in non-electronic form.

The tremendous power of loyalty incentives is this: the more points that a consumer has earned, the more the consumer wants points! Each incremental point is more and more valuable to the consumer because high point levels are associated with more exclusive (and valuable) benefits. So, the merchant benefits from the increased returns. The best customers are the least likely to switch to a competitor.

Yet, despite the attraction to consumers of points that often are perceived as a "free bonus" for taking actions they otherwise would have taken anyway (such as traveling on an airline or purchasing an item), existing point systems have certain redemption restrictions that have limited the desirability of points to consumers generally, and prevented them from continuing to participate in point systems on a frequent basis. After some degree of initial participation, consumers often are disillusioned after recognizing that they cannot obtain a sufficient number of points to reach their desired goal.

One factor contributing to this problem is that points are not universally redeemable for all goods. Points typically have restrictions on redemption, including limitations to the goods of one or a few affiliated merchants. Miles earned for trips taken on one airline, for example, cannot be applied to the traveler's account with another airline. Thus, in order for the traveler to earn as many redeemable miles as possible within a given timeframe, the traveler must buy and use airline tickets from one airline. By being loyal to one merchant, the consumer is rewarded with points which he can redeem later if he accumulates enough points. Similarly, the consumer with the winning bottle cap can only redeem the bottle cap with that particular soft drink merchant and only for a limited number (usually one) of prizes.

However, the consumer may be missing out on some bargains from other merchants because of his desire to remain loyal to the first merchant. For example, the consumer may continue to purchase relatively high-priced airline tickets from Jones Airlines so that he can accumulate miles from them instead of purchasing the relatively inexpensive airline tickets from Smith Airlines. Similarly, the consumer is likely to visit the expensive Joe's Tacos to get his card stamped after each visit so that he can get a free meal instead of visiting the less expensive Tim's Tacos. Thus, the merchant-specific nature of the incentive points system psychologically limits the consumer's desire to purchase goods that the consumer would otherwise purchase because of the perceived penalty (i.e., opportunity cost) of visiting another merchant.

From the merchant's point of view, loyalty incentives are costly. Every point that is redeemed by a customer costs the merchant money. While some attrition occurs (i.e., many points are never redeemed), the fact remains that every point awarded has a marginal cost to the merchant. For example, some airline companies sell "miles" to hotels and other points issuers for approximately 2 cents each. Thus, a very real cost to these merchants exists for every point issued to a customer. Because points cost money to issue, merchants always require some payment by the consumer to actually earn the points. For example, the consumer must purchase a plane ticket or stay in a hotel to get frequent flyer miles.

Despite these drawbacks in the loyalty incentive programs, consumers are seeing some improvements. Although most point systems are still merchant-specific, more and more merchants are forming relationships with one another so that points are more universally accepted across different merchants, and thus more desirable to consumers. For example, purchasing goods from one merchant can result in earning points with another merchant. A consumer's use of his credit card might earn the consumer miles with Jones Airlines. Similarly, points earned through one merchant may be redeemable with another designated merchant. Thus, the consumer is no longer restricted to one merchant's catalog at redemption time.

However, there still exists no "universal" marketplace for the redemption of points. At best, there may exist a redemption catalog containing the goods of multiple merchants.

Another redemption-related limitation of existing point systems is that points can only be redeemed after certain point thresholds have been reached. For example, Jones Airlines might award a free domestic round trip ticket only after the customer has earned 3,000 miles. A customer with 2,999 miles knows that these 2,999 miles is worthless until that last 1 mile has been earned to qualify for that 3,000 mile threshold. Similarly, only after the tenth visit to Joe's Tacos will the customer be eligible for a free meal. In each of these cases, if the customer has earned even one point, one mile, or one visit less than the required redemption threshold, the customer will not be able to redeem his points, miles, or visits for the desired goods or services.

Finally, points typically expire after a certain specified time period. The merchant benefits in that customers are motivated to redeem points as the expiration date approaches to avoid losing the points forever. Similarly, if the point total is below the redemption threshold, the customer may be motivated to take some action (e.g., purchasing a product, clicking on an ad, registering with a website) to earn enough points so that he may redeem them and not subject his already-earned points to expiration.

Yet, the "fixed-price" nature of redemption continues to limit the desirability of points to consumers, as well as the effectiveness of expiration. Over time, consumers may lose interest (and even let their points expire) as they recognize that the items they desire in the redemption catalog (which require a specified point total) may take a long time to obtain given the current rate at which points are being accumulated.

Were there an alternative form of redemption that provided consumers with a greater perceived opportunity to obtain desirable items, consumers might be more motivated to participate in incentive award programs with greater frequency. If consumers thought they could obtain their desired items, almost regardless of the number of points they had accumulated, they might be less disillusioned by the prospect of expiration of their points.

Thus, incentive award systems have demonstrated the viability of altering consumers' behavior if consumers perceive the points to be of value. Yet, the fixed-price nature of point redemption in existing incentive award systems often has limited the perceived value of points.

Another limitation with existing point systems is the rigid boundary that exists between online and offline purchasing channels. While a consumer that purchases some merchandise at an online web store can also earn incentive points for that purchase and redeem them at that online web store, he cannot redeem them offline at a traditional bricks-and-mortar store. Similarly, incentive points earned at a traditional bricks-and-mortar store can only be redeemed at that bricks-and-mortar store, but not any some other online web store.

The soft drink bottle cap is one example. The lucky consumer with the winning bottle cap from Joe's Cola Company can only redeem them in one of three ways, depending on the bottle cap program: (1) mail the winning bottle cap to Joe's Cola Company's redemption center; (2) call the appropriate telephone number of Joe's Cola Company's redemption center; or (3) take the winning bottle cap to the store where he purchased the soft drink where he can then claim his prize. In the past, this made sense. The consumer purchased his product offline at the store so he must also redeem (i.e., claim his prize) offline.

What is needed is a system, preferably an automated online system, that provides the benefits of incentive award programs (i.e., loyalty incentives), but without the disadvantages as noted above. Furthermore, the system should also provide flexible redemption capabilities across offline-online boundaries so that any points earned offline can be redeemed online, and similarly, any points earned online can be redeemed offline. The present invention provides such an enhanced account-based online system.

SUMMARY OF THE INVENTION

The present invention provides solutions to the aforementioned problems by integrating online-offline incentive points earnings with online-offline points redemption. In particular, one embodiment of the present invention allows users to redeem online those points that were earned offline in a server-based system called the Integrated Points System.

In one embodiment of the present invention, the Integrated Points System is implemented as an online server that is accessible, via a web browser, to those consumers who have access to the Internet. The server includes a web server, a messaging server, a database server, and various databases. This server functionality can be implemented on a single hardware platform having one or more web servers, or can be distributed among multiple hardware servers, each having one or more web servers and handling one or more of these functions (e.g., integrated web server and messaging server). This functionality includes conventional web server and application server functionality, such as running applications, managing resources, handling web requests, managing files and records, delegating tasks, and handling exceptions, among other tasks.

One particular implementation of the Integrated Points System involves soft drink bottle caps. For offline-online points processing, the user first acquires a soft drink bottle cap. On the bottle cap itself is a C-digit code made up from an alphabet of L letters. In one embodiment, the alphabet consists of 29 letters (e.g., L=29) to generate a 10-digit code (e.g., C=10). Theoretically, this 10-digit code is difficult to predict—the odds of guessing the correct code is approximately 1 in 200,000. So, without the soft drink bottle cap, a user would find some difficulty in determining what code to register online.

To generate these codes, an encryption scheme is employed. The encryption scheme involves generating a 48-bit string that includes a number portion and a validation portion. Based on the number portion and a secret key, another string is created using a well known one-way hash function, such as the MD5 algorithm. Some designated portion of this new string is extracted and used as the validation portion of the 48-bit string. Having generated this 48-bit string, the standard DES3 encryption algorithm is applied to generate another string, which is then converted to base L (e.g., L=29) to generate the C-digit code (e.g., C=10). This code is then printed on the bottle cap—one code per bottle cap.

To verify that the bottle cap code that the user submitted online is indeed a valid bottle cap code, the server performs the reverse of the encryption operation except for the MD5 one-way hashing operation which is run forward. It first converts the base L code into base 2. It then decrypts the base 2 number to generate a string S1'. Using one of designated secret keys, the server applies the MD5 one-way hash operation to the number portion of the S1' string to generate a new string S3'. The validation portion of this new string S3' is then compared with the validation portion of the string S1'. If they match, the code is valid; if no match, the code is invalid.

The user accesses a designated web page, which is typically the soft drink manufacturer's home page or some web portal (e.g., Yahoo) that is sponsoring the bottle cap promotion program. The user would register himself with the website, if he has not done so already, to set up an account. Thereafter, the account keeps track of his incentive points as they are earned, redeemed, or otherwise expired.

The user would enter the bottle cap code in the appropriate web page. The server checks the code to make sure it is one of the valid codes. If it is a valid code, the server adds the corresponding points to the user's account and checks off that valid code in the database so that the same code cannot be used again by this or another user.

BRIEF DESCRIPTION OF THE FIGURES

The description of the present invention may be better understood with the aid of the following text and accompanying drawings:

FIG. 14 (A) shows the home page of the Integrated Points System (without the graphics) where the user can shop, enter a bottle ap code, or view his account. FIG. 14(B) shows the web page that allows the user to enter the bottle cap code. FIG. 14(C) shows the webpage that shows some indication that the user entered a valid bottle cap code. FIG. 14(D) shows the webpage which lists items that the user can purchase with his available points. FIG. 14(E) shows a table of items that can be purchased and/or bid (via auction), as well as any available coupons for these items;

DETAILED DESCRIPTION OF PREFERRED EMBODIMENTS

The first part of this patent specification will discuss the electronic auction system where the auction is conducted online with points in various auction formats. The second part of this patent specification will discuss the offline-online incentive points system where users acquire incentive points offline (e.g., soft drink bottle cap program) and verify these points online to accumulate these points in their respective accounts. With such an account that keeps track of the acquisition and redemption of points, users can purchase or win merchandise, services, and prizes.

This DETAILED DESCRIPTION OF PREFERRED EMBODIMENTS section is structured as shown in the following outline:

1.0 Network Configuration
2.0 Server Configuration
3.0 Account Database
4.0 Yahoo! Points
   4.1 General
   4.2 Earning Points
   4.3 Redeeming Points
   4.4 Policies and Abuse Control
   4.5 Controls on Outstanding Points
   4.6 Point Issuance by Offer Server
5.0 Management Tools
6.0 Auction Formats
   6.1 Standard Auction
   6.2 Dutch Auction
   6.3 Progressive Auction
   6.4 Buy-or-Bid Auction
   6.5 Declining Bid Auction
7.0 Automated Closing
8.0 Auction Alert
9.0 Automated Bidder
10.0 Automated Seller
11.0 Account Checks Beyond the Initial Check
12.0 Point Credit
13.0 Yahoo!/Merchant Relationship
14.0 Integrated Points System
   14.1 Network Architecture
   14.2 Network Operation
      14.2.1 System Overview
      14.2.2 Encryption
      14.2.3 Verification
      14.2.4 Database Management One embodiment of the present invention is an electronic auction system that allows merchants and buyers to participate in auctions using any form of payment unit that is permitted by the seller. For the sake of clarity, the electronic auction system and its variations will be referred to herein as the "Yahoo! Auction System" or, in some instances, simply "the system."

One form of payment unit is incentive points that can be earned in many ways, such as purchasing a product/service, clicking through an advertisement, or registering with a merchant. Other ways of earning points are described further below. The Yahoo! Auction System allows potential bidders to bid on auction merchandise with their points.

As described further below, each participant in the Yahoo! Auction System has an account which keeps track of his accumulated points. When bidding for or purchasing any merchandise, the Yahoo! Auction System checks the participant's account balance to determine if such a bid or purchase can be made. Additionally, some participants' accounts may have a credit feature which allows the participant to bid on or purchase merchandise whose price tag exceeds the current account balance (whether in points or cash), provided that the specified credit limit is not exceeded.

1.0 Network Configuration

Figure 1:
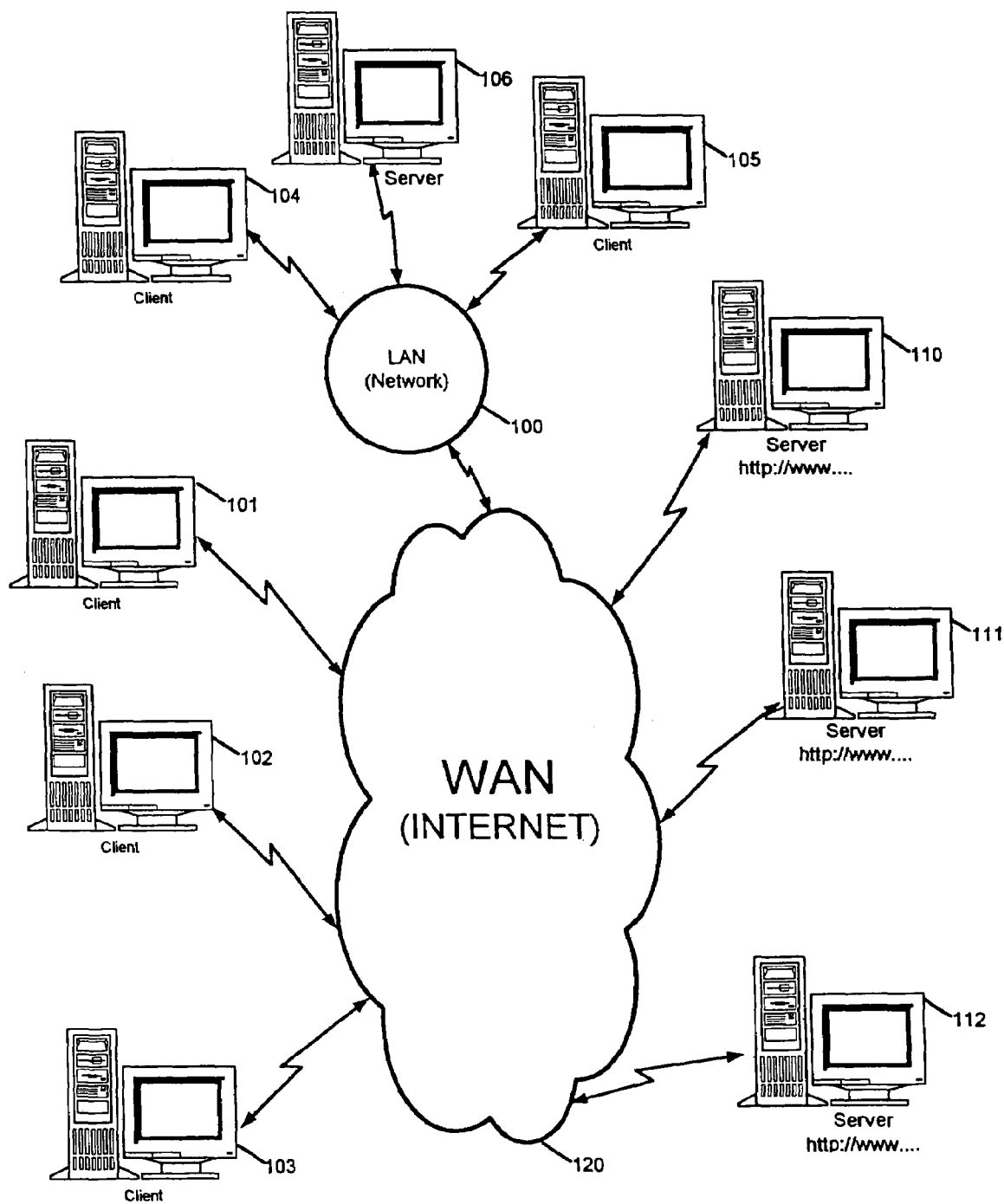
FIG. 1 shows a network environment of client computing stations and server stations within which one embodiment of the present invention operates.

In accordance with one embodiment of the present invention, the Yahoo! Auction System is implemented in an online networked environment. As shown in FIG. 1, a typical network environment includes some client computer stations 101, 102, and 103 that are usually operated by a human participant (e.g., potential bidder) of the Yahoo! Auction System. These client computer stations are connected to the wide area network (WAN) of the Internet 120 via Internet Service Providers, or ISPs (not shown in FIG. 1). Other client computer stations 104 and 105 are part of a local area network (LAN) 100. This network also contains a server computer station 106. Server computer stations 110, 111, and 112 provide various functionality over the web. Each server can be accessed by their identifying uniform resource locator (URL) address (i.e., "http://www.Yahoo.com"). The Yahoo! Auction System is a computer program that resides in and is executed primarily in at least one of these server computer stations, such as server 112.

In one embodiment, the various auction-related screens use HTML. Other embodiments use XML (i.e., static objects from which various HTML pages could be generated dynamically) or some other format. The functionality of server 112 will be discussed in greater detail below.

Client computer stations 101-105 are usually operated out of private residences, small offices, or even large corporate offices. Representative client computer stations are personal computers with modems (or network connections, e.g., to a router and high-speed Internet connection), terminal stations, and network servers. The client computer station is complete with a computer, keyboard, mouse, monitor and appropriate modem/bus/network interface. As known to those ordinarily skilled in the art, a representative client computer station includes a CPU, a local bus, a host/PCI bridge, memory bus, main memory, and hard disk memory. Exemplary client computer stations include a Sun Microsystems SPARC or ULTRA-SPARC workstation, an Intel/Microsoft-based computing station (e.g., Gateway, Dell, Micron), and the Apple Macintosh. These client computer stations are capable of supporting various operating systems, including Solaris, Windows 98, Windows NT, and the Apple OS.

Applications that run on these client computer station include email (e.g., Microsoft Outlook Express, CCMail), web browsers (e.g., Netscape Navigator, Microsoft Internet Explorer), web servers, and community-based online services (e.g., AOL, CompuServe, Prodigy). Access to the Yahoo! Auction System is made possible through a web browser for viewing web content in the form of HTML files. Through the web browser, cookies may also be used to store state information such as user name, ID, password, user preferences, settings, and the like, as known to those skilled in the art.

The email system can also be used to access the Yahoo! Auction System for such tasks as bid submission, receiving notifications that the user has been outbid, or simply to alert the user of other auctions that he may be interested in.

The corporate network 100 is usually implemented as a local area network (LAN) for intra-building or intra-campus communication. Where the corporate network 100 extends to multiple buildings or multiple campuses in different geographic locations, the corporate network 100 can be implemented as a wide area network (WAN) for inter-building or inter-campus communication that extends the individual LANs via common telephone carrier lines. These WANs typically employ bridges or routers to enable the communication over the common carrier lines.

In one embodiment, the server 106 in the LAN network 100 may perform the auction functionality described in this patent specification. Thus, a company operating this network 100 can award points to its employees and allow them to participate in certain auctions for various prizes.

2.0 Server Configuration

A server computer station 112 associated with the Yahoo! Auction System will now be discussed with respect to FIG. 2. At the core of the server 112 is a web server 137 which interfaces with a database server 136, a messaging server 138, and the Internet 150. The web server 137 is further coupled to communications lines 143 (e.g., via a modem or network router connected to server 112) and the Internet 150.

The web server 137 performs many tasks related to the management of the Yahoo! Auction System. From executing code for any number of different applications, managing resources, handling web requests, managing files and records, creating files and records, deleting files and records, delegating tasks, and handling exceptions, the web server 137 provides the main processing for the server 112. As noted above, this functionality, in other embodiments, could be distributed across multiple hardware servers.

The web server 137 also works with a messaging server 138 via line 142 (e.g., the system bus or a network connection to another hardware server) and a database server 136 via line 141. The messaging server 138 works with the web server 137 via line 142 and is also connected to the Internet via communication lines 144. The messaging server 138 provides various messaging functionality in various communications media such as telephone, email, instant messaging, active desktop application, and web browser notices. For example, email notices such as auction news, auction updates, and auction customer service access, are provided via communications line 144. News of upcoming auctions that may interest the potential bidder are delivered frequently. Also, when a bidder has been outbid by another bidder, the losing bidders are notified of the new high bid by the messaging server 138 via communications lines 144. By responding appropriately, the bidder can submit a new higher bid with email that will be handled by the messaging server 138 via communications lines 144. Also, any questions that a user may have may be directed to customer service through the messaging server 138, which will direct the email to the appropriate personnel within the customer service department. As noted above, various forms of instant messaging as are well known in the art could replace some or all of the functionality of messaging server 138.

Note that communications lines 143 and 144 are standard interfaces to the Internet (e.g., an Ethernet or other network interface to a router and CSU/DSU, modem, etc.) or across machines which are typically Ethernet-connected at the "back end" of the network.

In another embodiment, the web server 137 and messaging server 138 are integrated in an Internet server 146. The interface to the Internet 150 is provided by primary communications line 144 (line 143 is not implemented). Thus, all web traffic passes through this Internet server 146 via communications line 144. The messaging server 138 communicates with the web server 137 and the back end of the system (e.g., database server 136).

The database server 136 is a combination of all of the auction and related functionality. Specifically, it performs many tasks related to the creation, deletion, and management of various files and records managed by the server 112. The database server 136 supports the web server 137 in accomplishing its tasks of running the Yahoo! Auction System. The database server 136 serves an auction database 130, a merchandise database 131, a seller database 132, a bidder database 133, an account database 134, and a bid database 135. These databases 130-135 are coupled to a communications line 140 and to the database server 136. Note that the sellers access the management tools via the Internet through a web browser.

These databases on communications line 140 comprise the "back end" of the system. Note that the common bus-like illustration of the communications line 140 is merely conceptual. The databases may not actually be on a common bus. These databases may be widely dispersed geographically or integrated into one database. Also, some of the databases may be on a common bus while others may be located remotely and accessed via the Internet.

These databases contain appropriate linking fields so that an entry in one database can be associated with a related entry in another database. For example, assume that a seller wants to auction off a bicycle in an online auction through the Yahoo! Auction System. Information about the seller is found in the seller database 132, information about the seller's account is found in the account database 134, information about the bicycle is found in the merchandise database 131, information about that auction for the bicycle is found in the auction database 130, information relating to any bids that have been received for that bicycle during the auction is found in the bid database 135, and information about bidders who have submitted bids for that bicycle is found in the bidder database 133.

The auction database 130 stores information about each auction, whether currently active, completed, or upcoming. The information includes parameters that either the Yahoo! Auction System or the seller specifies such as starting bid price, starting bid price decrement, number of times to calculate the new starting bid price, start-up time period, time period of auction, whether float closing feature is enabled, bid increment (or bid increments at each of the auction phases), and sell-off threshold. These parameters are stored in the auction database 130 with appropriate indices to the matching merchandise in the merchandise database 131 and the seller in the seller database 132. These parameters will be discussed in greater detail below in conjunction with the different auction formats.

The merchandise database 131 contains merchandise that the merchants put up for auction. If available, each item of merchandise is associated with a text description, an image file or drawing, a video file, and the seller ID. Each auction item is associated with some identifier so that the database server 136 can track the same item across multiple databases. Thus, a given item in the merchandise database 131 is associated with a seller in the seller database 132, the current high bid in the bid database 135, and all bidders (successful or not) in the bidder database 133.

The seller database 132 contains the names of sellers, whether corporate merchants or individuals, and respective identifiers. Normally, the sellers need to register and set up an account in order for the seller's name to be placed in the seller database 132. The account provides a repository for points, whether earned through an auction sale or designated for distribution to potential customers. Moreover, sellers may also be buyers in a different transaction and accordingly, their accumulated points must also be tracked. Some representative seller information includes name, ID, and ratings submitted by other users of the Yahoo! Auction System. Thus, if one bidder had a bad (or good) experience with a particular seller, he may write an assessment of that seller or rate that seller and submit his review and rating to the Yahoo! Auction System. This allows other users of the Yahoo! Auction System to obtain a better understanding of this particular seller's transaction behavior and product quality.

The seller database also contains the names of those bidders that the seller prefers to block from bidding in certain or all auctions. For whatever reason, from bad prior experience with a particular bidder or reported bad behaviors, the seller may block certain bidders from participating in the seller's auctions. In another embodiment, this information can be stored in the auction database 130 instead of the seller database 132. In this way, the seller may allow a selected bidder to participate in one auction but prevent that same selected bidder from participating in another auction.

The names in the seller database (as well as the bidder database) are in the form of YahooIDs. A YahooID is a unique string that identifies a Yahoo! user along with a password. In another embodiment, the YahooID is analogous to domains to allow users to use identical user names across different domains. Thus, the user with the YahooID or user name "JoePublic" in Yahoo's shopping or auction website can also use the same user name "JoePublic" in GeoCities.

The bidder database 133 contains the names (e.g., YahooID) and other information about the bidders. Normally, the bidders need to register and set up an account in order for the bidder's name to be placed in the bidder database 133. The account provides a repository for points, whether earned through an auction sale or designated for distribution to potential customers. Moreover, bidders may also be sellers in a different transaction and accordingly, their accumulated points must also be tracked. Some representative information includes name, ID, and ratings submitted by other users of the Yahoo! Auction System. Like the ratings for the seller, the bidder rating allows other users of the Yahoo! Auction System to obtain a better understanding of this particular bidder's transaction behavior.

In another embodiment, the seller database 132, the bidder database 133, and the account database 134 are integrated into one database. In this case, the single database does not distinguish between buyer/bidder and seller since every seller can also be a buyer and every buyer can also be a seller.

The account database 134 contains information about each participant's account, whether buyer or seller. The account information includes account balance, expiration date for each point or group of points, redemption information, credit card information, billing information, billing address, and whether the account is authorized for using points for credit. The account database 134 will be described in greater detail below in the ACCOUNT DATABASE section of the patent specification. Although this embodiment illustrated in FIG. 2 shows the account database 134 integrated with the rest of the Yahoo! Auction System, another embodiment may have the account database located in a third party's server and maintained by the third party.

The bid database 135 contains information about any and all pending bids. Regardless of whether the bids are currently the high bid or not, the bid database keeps track of all valid bids (and, in another embodiment, invalid bids as well). The record of all bids allows the Yahoo! Auction System to award multiple items to multiple top bidders who may not necessarily be the highest bidder for such auction formats as Standard Auction, Dutch Auction, Progressive Auction, and Buy-or-Bid. Additionally, a record of all bids facilitates dispute resolution if any competing bidders lodge any complaints about the bidding process for any given auction.

In one embodiment, these databases are distributed across one or more machines. These machines are coupled via communications line 140 to the database server 136. These databases comprise the "back end" of the system which the Internet server 146 access.

Another component (not shown in the figure) is the server that provides the actual Yahoo! Auction System web page. This server provides the Yahoo! Auction template along with the auction content that the bidders and merchants view. When a user sends a request to the Yahoo! Auction website with his browser, the server responds to this request by delivering the Yahoo! Auction template to the user for display by the user's browser.

The Yahoo! Auction template contains the web pages that display auction functionality such as bidder services, merchant services, merchandise categories, auction news, and Yahoo! Shopping. Bidder services include such functionality as browse, bid, auction selection, account creation, search engine, and help (FAQs). Merchant services include such functionality as placing merchandise up for auction and account creation. Merchandise categories allow the auction participants to view the various items of merchandise in groups or categories to make searching easier. Exemplary merchandise categories include antiques and collectibles, arts and entertainment, business and office, clothing and accessories, computers, electronics and cameras, home and garden, sports and recreation, toys and games, trading cards, transportation, and other goods and services. Auction news deliver the latest news on auctions in general and Yahoo! auctions in particular. Yahoo! Shopping provides participants to shop at any participating merchant's website. Other standard features like site maps, "About Yahoo! Auctions," Feedback, Contact Yahoo, and legal notices are also provided on the Yahoo! Auction template. A "My Yahoo! Auctions" feature allows the user to personalize this web page view.

With this web page, users will be able to view their respective balance summaries (including last N transactions or full transaction histories), expiration dates for each group of points, redemption histories, names of merchants that the points were acquired from, and names of merchants that the points were redeemed, among other information.

3.0 Account Database

Figure 2:
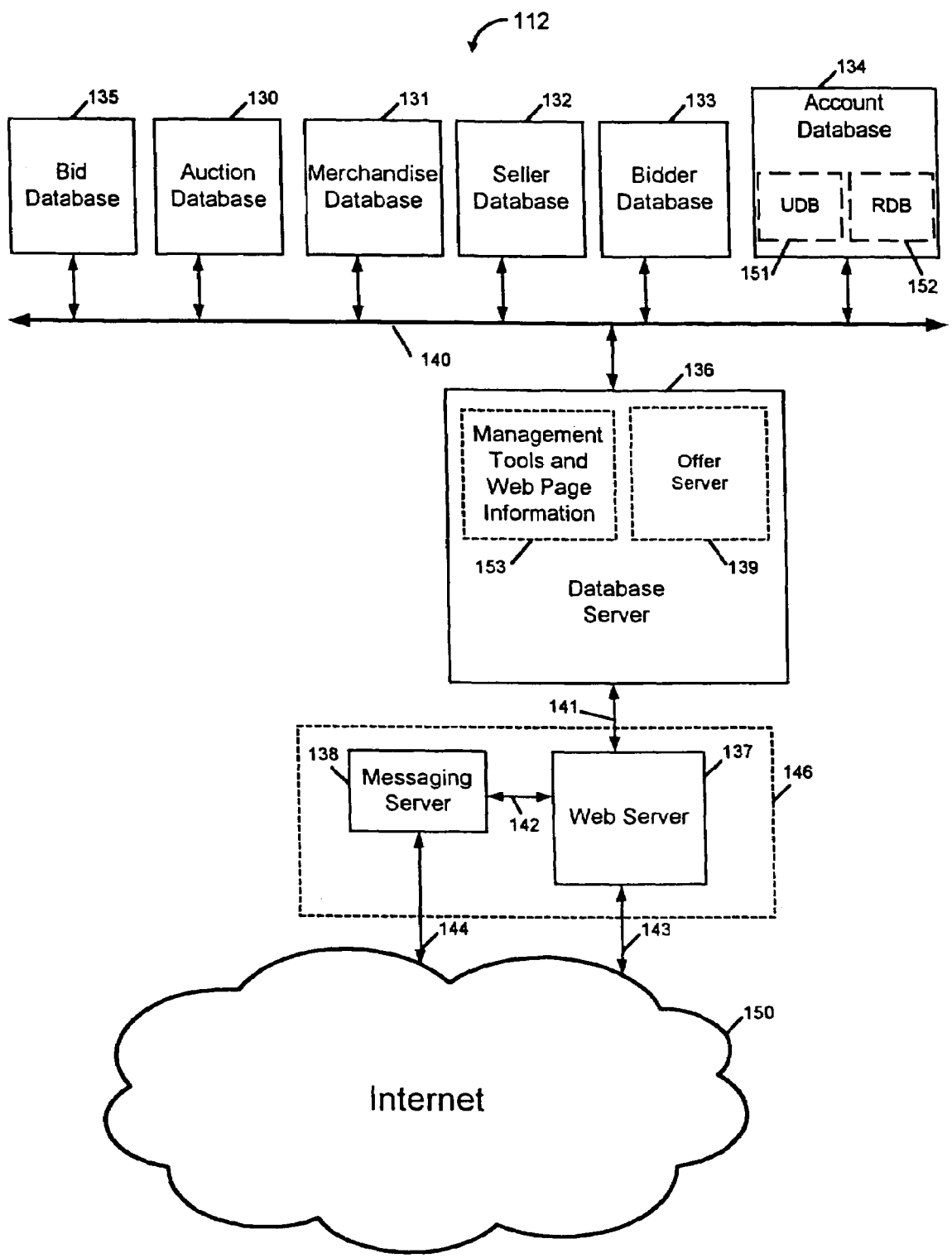
FIG. 2 shows one embodiment of the server computing system which provides the numerous functions and features of the Yahoo! Auction System.

The account database 134 comprises a user database (UDB) 151 and a relational database (RDB) 152, as shown in FIG. 2, which will be maintained in synchronization with each other. The user database (UDB) 151 is used for speed-intensive applications, such as real-time access from production websites. When the offer server 139 awards points, the user's UDB record will be modified to reflect the transaction. The offer server 139 notifies the user that his account balance has been increased (via email or the website). The UDB 151 is also used for redemptions. Upon some redemption action, the Yahoo! Auction System checks the UDB 151 for available points for a specific user and a specific transaction, determines eligibility, and either debits the account for the desired number of points for an actual transaction or places the desired number of points on reserve for a potential transaction.

In one embodiment, the UDB is implemented as a hierarchical, non-relational directory flat file system. The UDB incorporates a tree structure to find the desired account record. For example, to find the account record for "Betty Jones," the system looks for "J" among the tree structure of last names beginning with A-Z. Having found J, the system then seeks "Jones." If multiple Jones's are found, the system then looks for "Betty" (as in "Betty Jones"), and so forth until a unique record is located. In another embodiment, the account that keeps track of Yahoo! Points is maintained in a separate third party server's database.

The relational database (RDB) 152 is used for logging points, running expiration scripts, providing customer care with accurate records, and the like. It is also used by the offer server 139 to record and track all transactions, which includes processing information such as OfferID, time/date stamp, YahooID, the actions that the user took to earn his points, and the like. Only some of the information in the RDB 152 is accessible by the user. In other embodiments, none of the information in the RDB 152 is accessible by the user, except for customer care and other authorized Yahoo! employees. Every transaction that the user is involved in is recorded and tracked in the RDB 152.

In one embodiment, points expire one year from the end of the calendar quarter in which they were earned (refer to the discussion in the "Policies and Abuse Control" section below). To incorporate the expiration date into each account, each account comprises five buckets (B1, B2, B3, B4, B5). A bucket represents a calendar quarter. When points are earned, they are placed in the first bucket B1, which corresponds to the present quarter. Bucket B1 always represents the current quarter. At the start of the next calendar quarter, the points from B1 are transferred to bucket B2, the points that were in B2 are transferred to B3, the points that were in B3 are transferred to B4, the points that were in B4 are transferred to B5, and the points that were in B5 are removed altogether. Thus, these points that were in bucket B5 and removed represent the expired points. At the start of the next calendar quarter, the cycle repeats again as the points that are in bucket B5 will be removed.

In another embodiment, each account comprises five buckets (B1, B2, B3, B4, B5). A bucket represents a particular calendar quarter. Unlike the previous embodiment, however, bucket B1 does not necessarily always represent the current quarter. When points are earned, they are placed in whatever bucket corresponds to the present quarter. To implement the expiration feature, at the start of a calendar quarter, the contents of the bucket corresponding to this new calendar quarter are erased. Thus, whatever points were in this bucket have now expired and are no longer available to the user of this account for redemption. For example, assume that today is Dec. 5, 1999. The user earns 10 points by clicking on an ad on Yahoo!'s website. Bucket B4 represents this quarter. Bucket B5 represents the next quarter which begins on Jan. 1, 2000 and ends on Mar. 31, 2000; bucket B1 represents the quarter from Apr. 1, 2000 to Jun. 30, 2000; bucket B2 represents the quarter from Jul. 1, 2000 to Sep. 30, 2000; bucket B3 represents the quarter from Oct. 1, 2000 to Dec. 31, 2000. Also, bucket B4 now represents the quarter from Jan. 1, 2001 to Mar. 31, 2001. Remember, the user had earned 10 points on Dec. 5, 1999 and these 10 points were placed in bucket B4. At the beginning of the quarter on Jan. 1, 2001, the contents of bucket B4 are erased. So, if the user had not redeemed his 10 points by Jan. 1, 2001, these 10 points and whatever other points in bucket B4 are erased.

Points in the account are also encrypted to prevent unauthorized users from accessing and/or modifying point totals and otherwise interfering with user accounts.

The concept of "reservation" is applied to the account database in one embodiment of the present invention. Assume that a user has N points (e.g., 100 points) in his account. If a user bids on an item in an auction using some fractional amount, say M points (e.g., 20 points) of the N points, this fractional amount M is reserved or set aside by the system in some temporary subaccount. All N points are still in the account but only those points that are not reserved (i.e., N–M points) are available to the user for other transactions until this particular auction in which the M points are reserved has resolved the user's status (i.e., win, lose). If the user wins, these M points (or some portion thereof depending on the type of auction) are used for the sale (i.e., these M points are deducted from the user's account permanently to complete the transaction). If the user loses, these M points are unreserved so that all N points are available to the user. The variations on the reserve/unreserve process are described below with respect to the various auction formats.

4.0 Yahoo! Points 4.1 General

In accordance with one embodiment of the present invention, the Yahoo! Auction System uses payment units, which can be in the form of actual points (and credit points) or cash (and credit). Although any form of payment unit can be used in the Yahoo! Auction System of the present invention (including a mixture of cash and points within a single auction), the patent specification will describe the embodiments with respect to points. However, one skilled in the art will recognize that the implementation details will be similar if money or alternative forms of currency were used instead of points.

In accordance with one embodiment of the present invention, the points are known as Yahoo! Points. Yahoo! Points can be either purchase points or attention points. These points are part of a rewards system that rewards users who use Yahoo's network of online properties, particularly Yahoo's e-commerce properties. Although Yahoo! Points can be viewed as a separate form of currency to purchase products conventionally or through an auction, Yahoo! Points are better viewed as a means of building a mutually beneficial relationship between the merchants and the buyers. Thus, as users earn more and more Yahoo! Points, the users are rewarded with gifts and redeemable merchandise, while merchants are rewarded with more sales-generating traffic on their websites.

Yahoo! Points may have a dollar-equivalent value internal to Yahoo, but may not necessarily have a direct cash value to users. Thus, in one embodiment of the present invention, users are not allowed to convert Yahoo! Points into cash. In another embodiment, Yahoo! Points can be converted into cash, provided that users adhere to certain conversion rules, analogous to redemption rules.

Note, however, that Yahoo! may not allow any conversion at all so as to operate a zero-marginal cost point system; that is, if conversion for cash is allowed (for whatever amount), each point will cost Yahoo! or a participating merchant some amount of money as users ask for conversion into some dollar-equivalent value.

4.2 Earning Points

Because Yahoo! is a high traffic website, numerous merchants have made arrangements with Yahoo! to make Yahoo! Points an accepted form of payment unit. Thus, merchants award Yahoo! Points to consumers, and allow for their redemption, in numerous ways. More importantly, these participating merchants have made these Yahoo! Points so universal that Yahoo! Points earned through one merchant can be redeemed with another merchant, and vice versa. Additionally, Yahoo! Points can also be converted into miles for many frequent flyer programs, and vice versa.

These Yahoo! Points can be earned in any number of ways, such as by registration, by purchase of product/service, and by viewing advertisements. The consumer is not necessarily required to visit the Yahoo! site to earn points; rather, Yahoo! Points can be earned through any website that awards Yahoo! Points (i.e., those merchants with some relationship to Yahoo).

One common way of earning points is by registering with a website. The registration process asks for basic consumer information such as name, address, age, sex, family size, occupation, income level, product preferences, interests, alias (or user ID), password, and information that is specific to the product/service that the merchant is trying to sell. The consumer may also be asked to provide billing information such as credit card number, expiration date, name on credit card account, and billing address, although many websites may delay requesting this information until the consumer has made an actual purchase. By registering, the merchant sets up an account for the consumer. The merchant then credits the consumer's just-created account with the points earned for going through the registration process. The merchant also logs the date that these points were earned for the purpose of determining expiration.

Points can also be earned by purchasing a product or service. For example, by purchasing airline tickets, the consumer has the potential to earn a specific number of miles. When he actually takes the trip, the merchant will then credit his account with the earned miles. In another embodiment, the user need not actually take the trip to earn the miles; rather, the merchant or Yahoo! Will issue points to the user when the user's credit card is charged for the airline travel. The merchant calculates the earned miles with some formula that is based primarily on the distance of each leg of a trip. Similarly, purchasing a product such as a compact disc (CD) may enable the consumer to earn points immediately. The specific number of points earned is merchant-specific. In one embodiment, earned points and dollar amount spent on the purchase have a 1:1 relationship; that is, for every dollar spent, the merchant awards the consumer with a point. In another embodiment, the earned points and dollar amount spent have a 10:1 relationship so that for every dollar spent, the consumer will earn 10 points. Other fixed (e.g., 5:1, 20:1) or variable relationships (e.g., x:1 where x varies from day to day) are of course possible.

Points can also be earned by viewing an advertisement. For example, a merchant places an ad in a website, preferably a high traffic site such as Yahoo's Internet portal. Through various means, the ad attracts the eye of the consumer. By clicking on the ad, the consumer's browser retrieves another web page which gives the consumer more information about the product/service/merchant info that was the focus of the ad. The ad may initially indicate that the consumer may earn a certain number of incentive award points by clicking on the ad. Alternatively, the ad may require the consumer to jump through some hoops first before the points are actually delivered. By clicking on the ad and following any additional instructions, the merchant awards the promised number of points to the consumer's account, if one exists. If the account does not exist, the merchant assists the consumer in setting up an account through a registration process.

Yahoo! Points can also be earned in other ways. Consumers can earn points from select merchants by:

(1) switching long distance carriers,
(2) updating user registration information periodically (to track changing interests)
(3) trying out a new service with an already existing membership,
(4) signing up for a new credit card,
(5) entering a merchant-sponsored sweepstakes,
(6) signing up for a trial membership to any merchant-sponsored club,
(7) playing online games such as poker, blackjack, and slots,
(8) answering questions for an online poll,
(9) trying a new product with no obligations,
(10) requesting a free quote on a vehicle,
(11) submitting a valid bid in an auction,
(12) submitting a winning bid in an auction,
(13) visiting a website (although some registration may be involved),
(14) writing and submitting product reviews (e.g., books, music, video),
(15) downloading software from a website,
(16) signing up a friend to some club membership,
(17) serving an online community by answering user questions,
(18) issuing points based on past behavior; that is, if a person does three things in one day, the number of points earned on the third action could be greater than that earned by someone who took two days to perform all three actions,
(19) issuing bonus points for reaching certain milestones; that is, if a user has earned a large number of points (e.g., 100,000 points), Yahoo! could reward this good customer with bonus points just like first class customers on airline mileage programs get bonus miles,
(20) Points could be awarded as a multiplier (i.e., "Click here to double your points"),
(21) Points could be awarded offline as well (e.g., for using a shopping card at a supermarket), and
(22) purchasing a threshold amount of goods from multiple merchants.

This list is merely representative of the ways in which points can be earned. This list is not meant to be a comprehensive list. As mentioned above, these Yahoo! Points are universally accepted among the participating merchants. Thus, points earned through one merchant can be redeemed through another merchant. So, when a consumer earns 50 points through a music merchant by purchasing some compact discs, that consumer can redeem those earned 50 points with a pet supply merchant to purchase dog food. Of course, the music merchant may have one set of rules on how to earn these points and the pet supply merchant may have a different set of rules on how and when to redeem points and what thresholds are required for redemption. So long as these rules are observed, the consumer can use points like cash and apply them across different merchants.

Yahoo! Points can also be converted into some other incentive program's units or actual money. An example of another incentive program is frequent flyer mileage programs. In one embodiment of the present invention, Yahoo! Points can be converted into miles at a conversion rate of 1:1; that is, each Yahoo! Point is worth a frequent flyer mile. In another embodiment, the conversion rate varies from day to day, much like international currency conversion rates fluctuate depending on the currencies involved, the politics of the respective countries, and the health of these countries' respective economies, among other dynamics that affect international currency conversion rates. Conversely, frequent flyer miles can also be converted into Yahoo! Points at analogous conversion rates; that is, either 1:1 rate or a rate that varies from day to day.

Yahoo! Points may also be convertible into cash. Like the points-to-mileage conversion, the conversion rate can be fixed at one point for every 1/100 of a penny. In another embodiment, the conversion can vary from day to day. The conversion from money to Yahoo! Points is also possible.

In another embodiment, users are allowed to buy Yahoo! Points with payment units such as cash. This allows those users who are otherwise deficient on points to accumulate the needed points to conduct whatever transaction he desires.

4.3 Redeeming Points

Although Yahoo! Points can be earned almost anywhere (i.e., both within the Yahoo! network and outside), Yahoo! Points can only be redeemed at Yahoo's website. In another embodiment, Yahoo! Points can be redeemed at any Yahoo-authorized website—e.g., a website of a merchant that has some commercial relationship with Yahoo! or a third-party service bureau. These Yahoo-authorized merchants may be advertisers on Yahoo, merchants in the Yahoo! Shopping network, and other merchants with some contractual relationship with Yahoo.

Yahoo! Points can be redeemed in one of two ways—(1) redemption for special gift certificates, and (2) redemption through the Yahoo! Auction System. Other forms of redemption are of course possible.

One way to redeem Yahoo! Points is through a fixed point redemption system whereby special gift certificates are awarded. Here, users can redeem their points for special gift certificates to Yahoo! Stores at fixed point levels. For example, for 2000 points, the user may receive a $20-off gift certificate to FAO Schwartz's Yahoo! Store. For more points, the value of the gift certificate may be higher.

Another way to redeem points is through the Yahoo! Auction System. In one embodiment, Yahoo! will set up certain special auctions where users can bid on. special prizes with Yahoo! Points instead of cash. Only those users with the requisite account balance will be allowed to participate. In other embodiments, all users with any number of accumulated Yahoo! Points can participate.

In another embodiment, individual users may auction off their goods for Yahoo! Points instead of cash. In this embodiment, the auction is not initiated by Yahoo! as a special auction; but rather, an individual seller (or even a corporate merchant) can specify that the auction accepts Yahoo! Points instead of cash.

In another embodiment, Yahoo! can charge users points for various services, such as customer service and news subscriptions. In still another embodiment, Yahoo! can deduct points from users who behave in ways that are not desirable to Yahoo!. For example, Yahoo! could deduct points for those users who leave the Yahoo! website for a competitor's website. However, this feature will be used with some care and discretion.

In another embodiment, points could be redeemed offline, just as points could be earned offline.

4.4 Policies and Abuse Control

Certain policies are implemented to minimize the potential for abuse. Because of their resemblance to money, Yahoo! Points inherently invite possible abuse. Typically, those who are cash-poor but time-rich are motivated to come up with schemes to "beat the system." Thus, in accordance with one embodiment of the present invention, several policies are implemented.

One policy will cap the number of points that a user can accumulate over a given time period. Analogously, the system will also limit the number of points that can be issued over a given time period. Refer to the section below entitled "Controls on Outstanding Points."

Another policy will expire points older than a certain date. In one embodiment of the present invention, Yahoo! Points expire one year from the end of the calendar quarter they are earned. Thus, points earned on Feb. 15, 1997 expire on Mar. 31, 1998. Similarly, points earned on Jan. 1, 1997 also expire on Mar. 31, 1998. In both cases, the end of the calendar quarter that the points are earned is Mar. 31, 1997. In another embodiment, Yahoo! Points expire one year form the date they are earned. For example, points earned on Feb. 15, 1997 expire on Feb. 15, 1998 in this latter embodiment. In some instances, however, expired points may be usable in some sweepstakes. In another embodiment, expiration is either not implemented at all or implemented in limited form. How limited? Merchants may indicate whether their points can expire or not. Also, the expiration may only apply to certain merchandise or certain ways of earning points. For example, points earned by clicking on an ad expire in one year, but points earned by registration do not expire at all.

Another policy makes the points non-transferrable from one account to another. This policy will prevent users from simply creating multiple accounts and transferring them to a single deposit account.

Earned points will also be held in "escrow" for some time period (e.g., 30 days) upon issuance in order to account for any returns of merchandise or disputed charges. This policy will not apply to some earned points such as "click-thru" ads, promotional trial memberships, and registrations.

Certain awards can be checked to make sure that they are not being credited more than the requisite number of times for the same action. Thus, a banner ad, which offers one-time-only points for clicking on the ad, may appear on a website for all to see. If a user clicks on that ad, he will earn his points. When he returns to that website, he will see that ad again. By click on the ad again, he should not be awarded points again since he earned them once already and this is a one-time-only promotion. Cookies may be used for this purpose. However, other embodiments will check the user's account instead.

Points in the account are also encrypted to prevent unauthorized access to and/or modification of point totals in user accounts.

4.5 Controls on Outstanding Points

Yahoo! Points will also be budgeted; that is, certain controls will be implemented to limit the number of points that are outstanding among the users. Yahoo! will also control the number of points issued over a given time period. Also, with the expiration date feature, Yahoo! can ensure that users will not accumulate large numbers of points indefinitely without redeeming them. Either the user will use up the points via redemption or the points will expire. In either case, the points will be removed from circulation.

However, controlling the number of points that are outstanding is far from a trivial task. Enough Yahoo! Points will need to be created and issued to keep up with consumer behavior. Many consumers will make purchasing decisions and expect to earn some number of points. Other consumers make purchasing decisions for the sole purpose of earning points. Any negative deviation from this expected outcome will have negative consequences; that is, if the consumer gets fewer points than he was expecting (or no points at all), the consumer will be dissatisfied and may no longer be so loyal to the merchant(s).

Conversely, Yahoo! may also need to encourage the redemption of points to remove these points from circulation. One way to encourage the redemption of points is to increase the variety of merchandise available for auction. Along this line, a variation of this scheme is to increase the quality of the merchandise. Similarly, the variety of the merchandise should also be increased. In this way, the auction system offers merchandise that the consumer actually wants. Redeeming hard-earned points for merchandise that the consumer does not want or that the consumer grudgingly settles for will invariably create dissatisfaction and weaken whatever bond that the merchant has established with the consumer.

Another way to encourage the redemption of points is to decrease the redemption thresholds so that more discount coupons is available for redemption at a faster rate. So, the user need not accumulate as many points as before to obtain that same discount coupon. The merchant must create the perception among the consumers that the requisite thresholds are achievable within a reasonable period of time. If the threshold levels are set so high that the only merchandise that the consumer believes he can win is a toaster, the consumer may not be motivated to be loyal to this merchant. Under this lose-lose scenario, this consumer would rather give up his points than to behave in ways to accumulate more points.

A third way to encourage the redemption of points is to make the life span of the points shorter (expiration in 8 months instead of 1 year). Of course, this does not mean that Yahoo! will accelerate the expiration date; rather, the points will have a shorter life span at the time of issuance (e.g., expire in 8 months from now instead of 1 year). However, if the life span is too short, consumers may not bother earning these points because of their belief that they may never be able to redeem them in time; that is, they believe, whether right or wrong, that they may not buy enough to earn the requisite threshold number of points to be able to redeem them before the points expire.

Different classes of points can also be set up so that each class is associated with a different rules governing their expiration and value. The following is a list of the different classes of points that are offered in various embodiments of the present invention:

(1) Some points last one calendar year from the date of issuance,
(2) Some points last for a shorter duration (i.e., less than one year) but may be easier to obtain,
(3) Some points could be worth more to those consumers who already have a lot of points (e.g., the points could double in value if a particular consumer already has more than 100,000 points in his account),
(4) Some points could be starter points, and be worthless to people who already have accounts set up,
(5) Points could decay over time, with a half-life, much like Uranium,
(6) Points could gain in value when traded within groups of friends, thus creating incentives for communities of points holders to form,
(7) Points could be limited in their quantity, creating collectible points that increase in value because of supply and demand,
(8) Points could have a limited number of uses before they disappear. For example, a point could only work for three purchases, and then be worthless, disappearing from circulation,
(9) A point could gain in value as it moves through the system, increasing in value after each transaction,
(10) Points could have a random element built in, disappearing or increasing in value for no known reason,
(11) Users could be given the ability to "invest" their points, either in the stock market or some other surrogate. Thus, when the chosen financial instrument increased in value, they'd be awarded more points, and if it decreased, they would lose points,
(12) Users could donate their points to charity. A merchant (or Yahoo!) could then agree to transfer those points into a cash donation,
(13) Users could use the points to vote in "elections" that are either polls or are actual town meetings to determine policies of a non-governmental nature. Alternatively, users could donate their points to political candidates, who could use them to buy political advertising on Yahoo!,
(14) Users could bid in auctions in which not only the winner has his points confiscated in exchange for the item being auctioned (the standard model), but in fact, some portion of the losers also lose their points (even though they receive nothing in exchange). While these auctions would certainly attract fewer bidders, the bidding would likely go up,
(15) Users could use the points earned (without purchasing) to buy entries into sweepstakes or participate in online games of chance, In any event, the controls involve the appropriate combination of the above three schemes (i.e., increase inventory, decrease redemption thresholds, variable life span and value of points). In one embodiment, the large number of participating merchants will ensure that the supply of redeemable merchandise will be large enough, varied enough, and of sufficiently high quality to motivate consumers to redeem their points. If the redemption point thresholds are lowered, more consumers will believe that these thresholds are reachable and will behave in ways to accumulate more points for redemption. Finally, by shortening the life span of points, more consumers will redeem points sooner rather than later.

4.6 Point Issuance by Offer Server

Returning to FIG. 2, the database server 136 includes an offer server 139 therein whose primary function is to check and deliver points to users' accounts. The offer server 139 works with the database server 136 and the account database 134 to accomplish this purpose. In other embodiments, the offer server is identical to the database server. Also, in some embodiments, the web server performs the same tasks as the database server.

Figure 3:
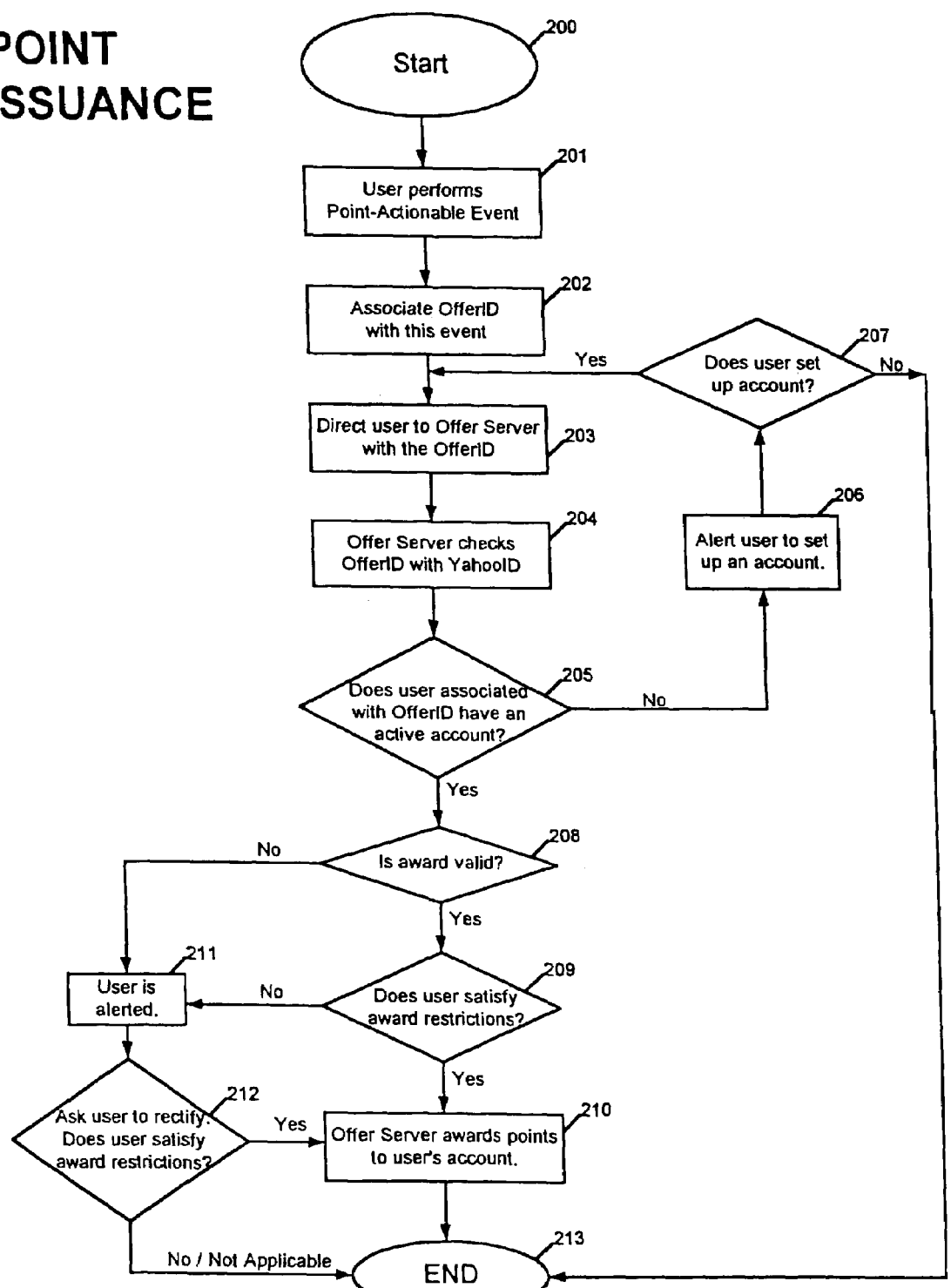
FIG. 3 shows a flowchart that illustrates the manner in which payment units such as Yahoo! Points are issued to users.

The operation of the offer server 139 will now be discussed with respect to the flow chart of FIG. 3 and the server configuration of FIG. 2. The process starts at step 200. At step 201, the user performs some point-actionable event such as viewing an advertisement, purchasing a product, or registering with a website. Of course, not all of these events are point-actionable, but usually the website will indicate that points can be earned by taking some kind of specified action.

At step 202, the database server associates an OfferID and the user's YahooID with this event. In one embodiment, a unique OfferID is associated with a given event. Let's say that clicking on an ad is an event which triggers the point issuance. This particular event is associated with the same OfferID regardless of the users who click on it. Even if multiple users click on this ad, the same OfferID is associated with this action for all the users. Similarly, if the same user clicks on the ad multiple times, the same OfferID will associated with this action.

The database server 136 then directs the user to the offer server 139 with this OfferID and YahooID at step 203 in a manner that is relatively transparent to the user. The offer server 139 then checks the OfferID and YahooID with the plurality of YahooIDs in the account database 134 at step 204. At step 205, the offer server 139 determines whether the user has an active account in the account database 134. If not, the offer server 139 informs the database server 136 of this fact. The database server 136 then alerts the user that no active account exists and requests that the user set up an account with Yahoo! at step 206. The database server 136 then shows the user the web page where the proper registration forms are found. If the user refuses to set up an account at step 207, the process terminates at step 213. If the user successfully sets up an account at step 207, the database server 136 proceeds to step 203 where the database server 136 directs the user to the offer server 139 again.

Returning to step 205, if the user has an active account with Yahoo, the offer server 139 then checks if the award is valid at step 208. Usually, the award is valid and this step will merely serve as a precautionary step. Sometimes, a promotional award may have expired but the award advertisement may still be inadvertently left on the website. Other times, the merchant may have prematurely discontinued an award but the award advertisement may still be on a website. If the award is not valid at step 208, the offer server 139 indicates this fact to the database server 136 which then alerts the user at step 211. Step 212 is not applicable so the process then ends at step 213.

If the award is valid at step 208, the offer server 139 checks if all award restrictions are satisfied at step 209. These restrictions may be dollar amount of the purchase, quantity of purchase, properly filling out a registration (with all required fields completed), and properly viewing the advertisement (a mere click-through may not be enough in some cases). If the award restrictions are not satisfied at step 209, the offer server 139 indicates this fact to the database server 136 which then alerts the user at step 211. At step 212, the database server 136 assists the user to rectify any deficiencies in the restrictions (if possible). If the user still does not satisfy the restrictions of the award at step 212, the offer server 139 proceeds to end the process at step 213. If the invalid condition detected at step 208 is not rectifiable for any reason, step 212 would resolve into "No/Not Applicable" and the proces ends at step 213.

If the user satisfies the restrictions at step 212 or step 209, the offer server 139 proceeds to step 210. At step 210, the offer server 139 awards the points to the user's account in the account database 134. The process then ends at step 213.

In this embodiment, the database server 136 includes the offer server 139 therein. In other embodiments, the offer server 139 may be separate from the database server 136. In still further embodiments, the database server 136 performs all the functions that the offer server 139 performs.

In another embodiment, the steps 205-207 are accomplished before point issuance ever becomes an issue; that is, the user either logs into Yahoo's auction website with his respective YahooID or sets up an account at the time of login if the user has no account established yet. Thus, when the user accesses Yahoo's auction website (or some other Yahoo! shopping website), the system does not recognize the user either because the user does not have an account yet or has yet to log into his account. The standard interface of the system would then give the user the option of either logging into his account (if one already exists) or setting up an account.

5.0 Management Tools

Returning to FIG. 2, the server contains a suite of management tools 153 inside the the database server 136. The management tools 153 also provide storage for web page information. The management tools 153 provide tools to manage various aspects of the Yahoo! Points program.

The management tools 153 include an offer editor, a points program master editor, a coupon generator, and a customer care tool. The offer editor allows marketing/production personnel to enter offer rules (e.g., dates, restrictions). Additionally, the offer editor allows these personnel to schedule "win, ","lose, " and "ineligible" strings, which are the HTML strings served into pages like ads. However, these strings are exemplary. Other strings for different scenarios can be created. For example, Yahoo! can serve ads that are dependent on the number of points a user has accumulated so far. So, a user with 1000 points can get a particular ad. Yahoo! can also serve ads that are dependent on how close the user's accumulated points are to their expiration dates. So, if 500 points are about to expire in the next week, Yahoo! will show a particular ad.

Moreover, the offer editor provides for the entry of point budgets. To test some of the features of the Yahoo! Auction System, the offer editor allows OfferIDs to be artificially created so that an actual point-actionable event need not be triggered.

The points program master editor allows Yahoo! personnel to flexibly set numerical limits on point issuance. Thus, the editor can be used to set the maximum number of points per any given time frame (e.g., day, hour, week, month) that may be issued to any given user. This editor can also set expiration dates on a point by point basis.

In another embodiment, a coupon generator is provided. The coupon generator is used to set up fixed point offers, such as $20-off coupon with a particular merchant in exchange for 500 points. The coupon generator can set any number of points for any value coupon.

The customer care tool allows Yahoo! personnel to view users' transaction histories, make account adjustments, and view prize auction results (including winners and specific prizes).

6.0 Auction Formats

A variety of different auction formats are offered for the buyers and sellers of the Yahoo! Auction System in accordance with one embodiment of the present invention. In the following discussion, each different auction format will be discussed with respect to the Yahoo! Point system and its implication to a user's respective account.

6.1 Standard Auction

The auction format known to most members of the general public is the Standard Auction format, where the Yahoo! Auction System awards the merchandise to the top bidder at the bid price after the auction has been active for the duration of its specified time period.

In one embodiment, the standard auction applies to the case where a single item is up for bid for a specified time period. Typically, a starting bid price is offered by the auctioneer or Yahoo! Auction System based on pre-auction instructions from the seller. In one embodiment, the starting bid price is the absolute minimum price that the seller is willing to sell his merchandise. In other embodiments, the starting bid price is merely the starting point. In either case, the seller will normally inform the Yahoo! Auction System in advance of the minimum selling price for a given item, whether this minimum price is the starting bid price or some specific amount above the starting bid price. In other embodiments, the starting bid price and the minimum selling price are not provided and the seller is willing to accept almost any bid price for the merchandise for the start and conclusion of the auction. Having indicated the starting bid price for the merchandise, the Yahoo! Auction System will reject or refuse any bid that is under the specified starting bid price.

At this point, the seller may elect to lower his starting bid price to entice potential bidders to bid on this item or withdraw his item altogether. Typically, the seller will lower the starting bid price under the theory that as soon as one bid is offered, the Yahoo! Auction System will be flooded with other bids for that same item. Alternatively, the Yahoo! Auction System may automatically lower the starting bid price to a certain point (or series of points) based on pre-auction instructions from the seller if valid bids are not being received after an initial start-up period has elapsed. Thus, after an initial start-up period has elapsed, the starting bid price may be reduced from $200 to $190. If bids are still not received after a second initial start-up period, the Yahoo! Auction System may automatically reduce the starting bid price from $190 to $180.

Depending on the pre-auction instructions by the seller, the starting bid price may be reduced any number of times for any number of initial start-up periods. This initial start-up period may be one day from the start of the auction for that particular item in accordance with one embodiment of the present invention. In other embodiments, the initial start-up period may be more or less than one day depending on the popularity of the merchandise. For popular and hot-selling merchandise, the initial start-up period may be only a few hours to minutes from the start of the auction. For less popular merchandise, the initial start-up period may be several days to weeks. The Yahoo! Auction System of the present invention can accommodate any number of initial start-up periods, any initial start-up period values, any amount for the starting bid price, and any increment for the reduced starting bid price that the seller specifies before the start of the auction for a given item.

In order for a bid to be accepted, the bid must be valid. In one embodiment, a bid is valid if the bidder is properly registered, the bid amount is proper, the item amount must be supported by the inventory, and the bid was submitted within a specified time period. In each of these cases, if an invalid bid has been received, the Yahoo! Auction System will attempt to rectify the situation by alerting the bidder of the invalidity of the bid and suggesting possible courses of action that the bidder can take to make the bid valid.

With respect to the registration, the Yahoo! Auction System may require all potential bidders to register with some basic information such as name, age, address, phone number, and some billing information such as a credit card number. This registration ensures that only authorized people will participate in the Yahoo! Auction System. Also, the registration ensures that a user account will be set up in the database so that if particular payment units (e.g., incentive points, cash) are used during the bidding process, appropriate checks can be made to ensure that he either has enough payment units in his account or is otherwise credit worthy if his bid exceeds his account balance. If a bidder is not registered, the Yahoo! Auction System will alert the bidder of this fact and suggest that the bidder register. The registration process is relatively straightforward and quick.

In another embodiment, the potential bidder need not register with the Yahoo! Auction System directly. Instead, he may register with any number of other merchants who are associated with the Yahoo! Auction System somehow including, but not limited to: (1) the merchant has an agreement with the owners of the Yahoo! Auction System, (2) the merchant is allowed to advertise on the Yahoo! Auction System's website, (3) the Yahoo! Auction System's website has provided a link to the merchant's website, (4) the merchant offers points that are recognized by the Yahoo! Auction System, and (5) the Yahoo! Auction System awards points that can be redeemed at the merchant's website.

With respect to the proper bid amount, the Yahoo! Auction System requires a bid that satisfies an absolute minimum amount and minimum increment. The absolute minimum amount is typically the starting bid price. So, if the starting bid price is $400, a bid of $350 is not valid. Also, the Yahoo! Auction System requires subsequent bids to satisfy some prescribed increment. This increment may vary from one item to another and from one bid phase to another. For example, if the required minimum increment for a bicycle is $5 and the current high bid is $600, a valid higher bid must be at least $605. So, if the bid $603, the bid is not valid. Also, if the bid is $599, the bid is not valid. Conversely, if the bid is $606, the bid is valid because the minimum bid increment of $5 has been satisfied. For both the bid amount and bid increment, the Yahoo! Auction System will alert the bidder if neither is satisfied and suggest possible amounts. For bid amounts, the Yahoo! Auction System will suggest the starting bid price if the auction has just commenced or no bid has been received. For the bid increment, the Yahoo! Auction System will alert the bidder of the correct bid increment and suggest a bid price by adding the valid bid increment to the current high bid.

In accordance with another embodiment of the present invention, the minimum bid increment may also vary for an auction session for a given item. In particular, an auction session may be divided into distinct phases—a first initial start-up phase, a middle phase, and an end game phase. During each of these phases, the required minimum bid increment may be different. The initial start-up phase and end game phase may allow a modicum amount for the increment, while the middle phase may require substantially larger increments.

The quantity of the items must also be supported by the inventory in order for the bid to be valid. If N items are being auctioned, a bid on N+1 items is not valid because the inventory of N items cannot support N+1 items. Similarly, if N items are being auctioned off but during the course of the auction, M items (where M<N) have already been awarded to a bidder, a subsequent bid for N items is not valid because only N−M items are remaining. If a bid is invalid because the quantity requested cannot be supported by the inventory, the Yahoo! Auction System will alert the bidder of this state and ask the bidder for a lower quantity. The Yahoo! Auction System may also suggest the lower quantity that can actually be supported by the current inventory. For single item cases, though, the item quantity requirement should be easily satisfied because either that single item is available (no high bidder yet) or not available (winning bidder has been determined and auction is closed).

Finally, the bid must be received by the Yahoo! Auction System within the specified time period for the auction in order for the bid to be valid. For any given auction session, the seller offers his merchandise for only a specific time period (e.g., 24 hours). The auction opens (i.e., starts) at some beginning time and closes (i.e., ends) at some specific future time. This time period will vary from one item to another and from one seller to another. Any bid that is otherwise valid (i.e., proper bid amount, proper bid increment, properly registered bidder) that is received within the time period for the auction remains valid. If the bid is received after the specified time period has expired, the bid is not valid. When a bid is received by the Yahoo! Auction System, the bid is time stamped so that it can be properly processed.

The winner of the auction is the bidder with the highest valid bid among all the other valid bids within the time period specified for the auction. The winning bidder must then purchase the item he won at the winning bid price from the seller. The Yahoo! Auction System in effect matches up the buyer and the seller for the offered item. For the seller, this buyer is the best buyer because this buyer has offered the highest price for that particular desired item. For the buyer, this seller is the best seller because he was able to purchase (theoretically) from the seller that particular desired item at a price that is lower than its retail value. Of course, if no one bids on this item at the starting bid price during the entire auction time period specified for this item, the auction ceases with no winners. The Yahoo! Auction System may then automatically lower the starting bid price (in accordance with pre-auction instructions from the seller) to entice bid submission. On the other hand, the seller may not want to lower the starting bid price and not offer this item for auction.

In a variation of this time-based Yahoo! Auction System, another embodiment requires that the merchandise be awarded immediately to the bidder who bids some amount that is at or above a sell-off threshold. Refer to the "Buy-or-Bid" Auction format described further below. Alternatively, the merchandise is sold at the highest bid price when the time period for the auction expires. This sell-off threshold may or may not be disclosed to the potential bidders. Thus, if the seller wants to sell a particular item when the bid price reaches $500, the first bidder to bid $500 (or more) will be awarded the item regardless of whether another bidder may outbid this bidder. On the other hand, if none of the bids reaches the magic $500 threshold, the highest bidder after the auction time period expires will win the contest.

Figure 4:
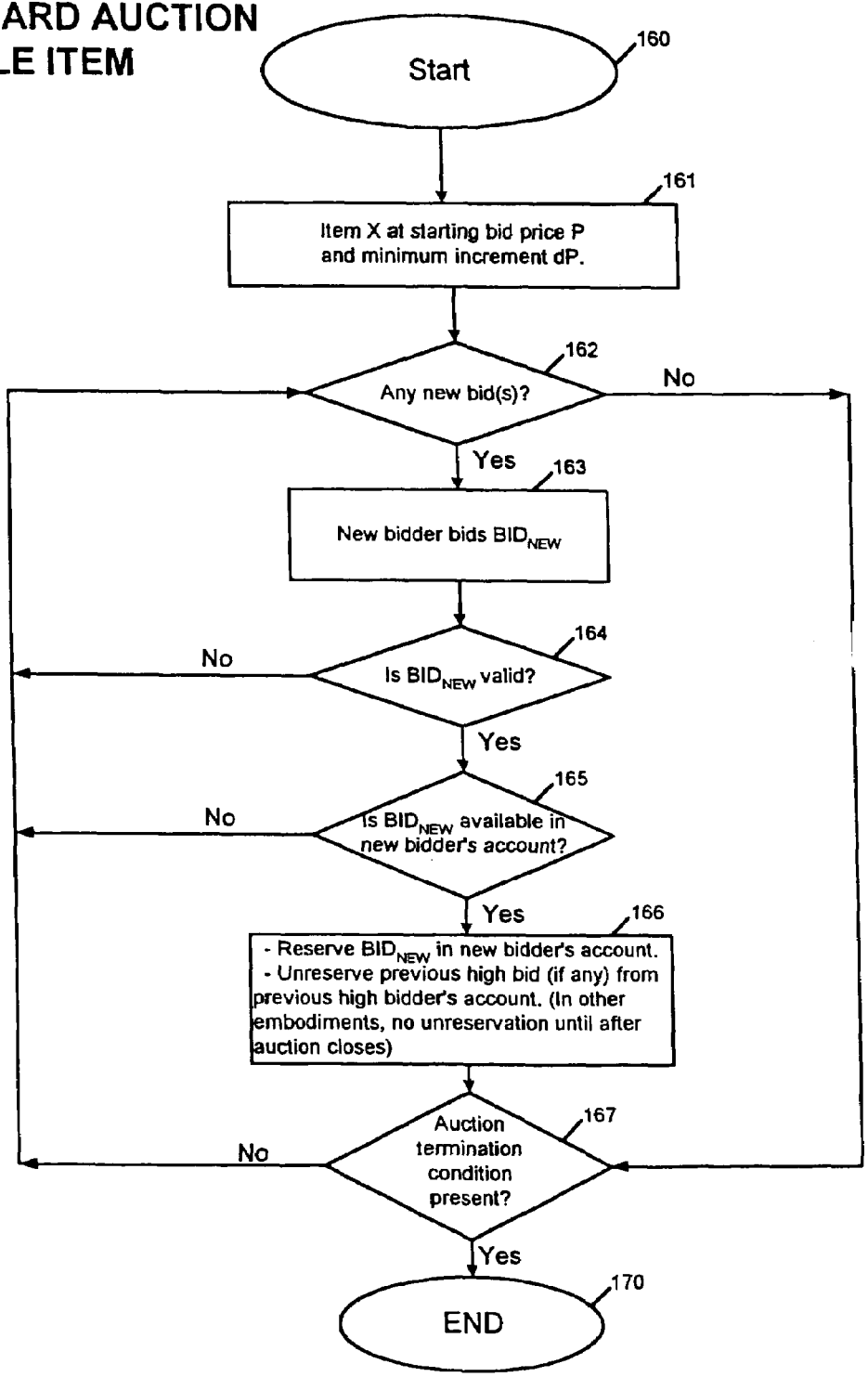
FIG. 4 shows the operation of the Yahoo! Auction System and the implications to the users' accounts when implementing the Standard Auction format where a single item is being auctioned off in accordance with one embodiment of the present invention.

A particular implementation of the Yahoo! Auction System and how it implicates the users' respective accounts will now be described with respect to FIG. 4. The auction begins at step 160.

At step 161, the Yahoo! Auction System offers item X at starting bid price P with a minimum increment dP in accordance with the seller's pre-auction instructions. At step 162, the Yahoo! Auction System waits for or inquires about any new bid(s). If no new bid is forthcoming, the Yahoo! Auction System proceeds to step 167, which checks for any auction termination condition. Auction termination conditions are discussed in greater detail below and include such conditions as expiration of a predetermined time period for the auction (e.g., 72 hours) and premature closing due to inactivity within any specified time period. If any of these auction termination conditions is present, the auction terminates at step 170; otherwise, the Yahoo! Auction System returns to step 162 to check for any new bids.

If a new bid is received, such as $BID_{NEW}$ by a new bidder (whoever this may be) at step 163, the Yahoo! Auction System checks for the validity of $BID_{NEW}$ at step 164. If this is the very first bid, checking validity means that $BID_{NEW}$ must be at least the starting bid price P. If this bid is an attempt to outbid an already existing high bid, the new bid $BID_{NEW}$ must be at least the sum of the current high bid and the minimum bid increment dP. Other validity checks are described elsewhere in this patent specification. If $BID_{NEW}$ is not valid, the Yahoo! Auction System returns to step 162 where it checks for other new bids.

If $BID_{NEW}$ is valid, the Yahoo! Auction System proceeds to step 165 where it checks the new bidder's account to determine if $BID_{NEW}$ points are available. This ensures that the new bidder is bidding with points that he has so that if he ultimately wins the auction, the seller of the item X can be paid. Also, this step 165 is performed after step 164 so that if the bid is invalid at step 164, the Yahoo! Auction System need not spend additional time and resources to check the new bidder's account in the account database. On the other hand, other embodiments of the present invention require the system to check the new bidder's account before the validity check. If $BID_{NEW}$ is not available in the new bidder's account at step 165, the Yahoo! Auction System returns to step 162 where it checks for new bids.

If $BID_{NEW}$ is available in the new bidder's account at step 165, the Yahoo! Auction System proceeds to step 166. Here, the system reserves $BID_{NEW}$ in the new bidder's account so that this reserved amount of points can not be used for other transactions. If $BID_{NEW}$ was submitted to outbid and already existing high bid, then the previously reserved high bid amount is unreserved in the previous high bidder's account. At this point, the new bidder is the current high bidder with the current high bid at $BID_{NEW}$.

In other embodiments, step 166 does not unreserve any bids until after the auction closes. This is done as a precaution in case a winning bidder backs out. Because other bids are reserved, the bidders associated with these bids may be the ultimate winner in those infrequent occasions when a winning bidder changes his mind. In another embodiment, the Yahoo! Auction System prevents bidders from backing out since Yahoo! has control of his account.

The system then proceeds to step 167 where it checks for the presence of any auction termination condition. If no auction termination condition is present, the system returns to step 162 where it checks for new bids. If new bids are received, the system proceeds down the flowchart as described above. Note that in this embodiment, the system will always reserve the new high bid in the new high bidder's account while unreserving the previous high bid (now losing bid) in the previous high bidder's account. If any auction termination condition is present, the auction ends at step 170.

At this point, the Yahoo! Auction System actually deducts the reserved amount (or the winning bid amount if the winning bid amount is different from the reserved amount) from each winner's account. Also, the other reserved amounts of non-winners (if any) are unreserved in their respective accounts, if this had not been done already. Some embodiments unreserve prior to auction close and other embodiments unreserve after the auction closes.

The Standard Auction format also applies to multiple items and multiple winners. Whenever a seller has multiple quantities of the same item that he wants to auction, such as twenty light bulbs of the same brand from company X, the seller need not auction them off separately. Instead, the seller may auction these identical and otherwise commodity items together. Of course, the seller will normally not sell non-commodity items together, such as multiple rare baseball cards whose respective value depends on the baseball player profiled, the year of the card, the rarity of the card, and the physical condition of the card.

In the multiple item/multiple winner variation of the Standard Auction format, if N items are auctioned off the Yahoo! Auction System will award these N items to N different winning bidders at each winning bidder's bid price. For example, if ten items are being auctioned off and ten different bidders are the highest bidders, each item is awarded to each bidder at each bidder's respective bid prices. Thus, for the same item, different bidders may ultimately be awarded the item at different prices.

Figure 5:
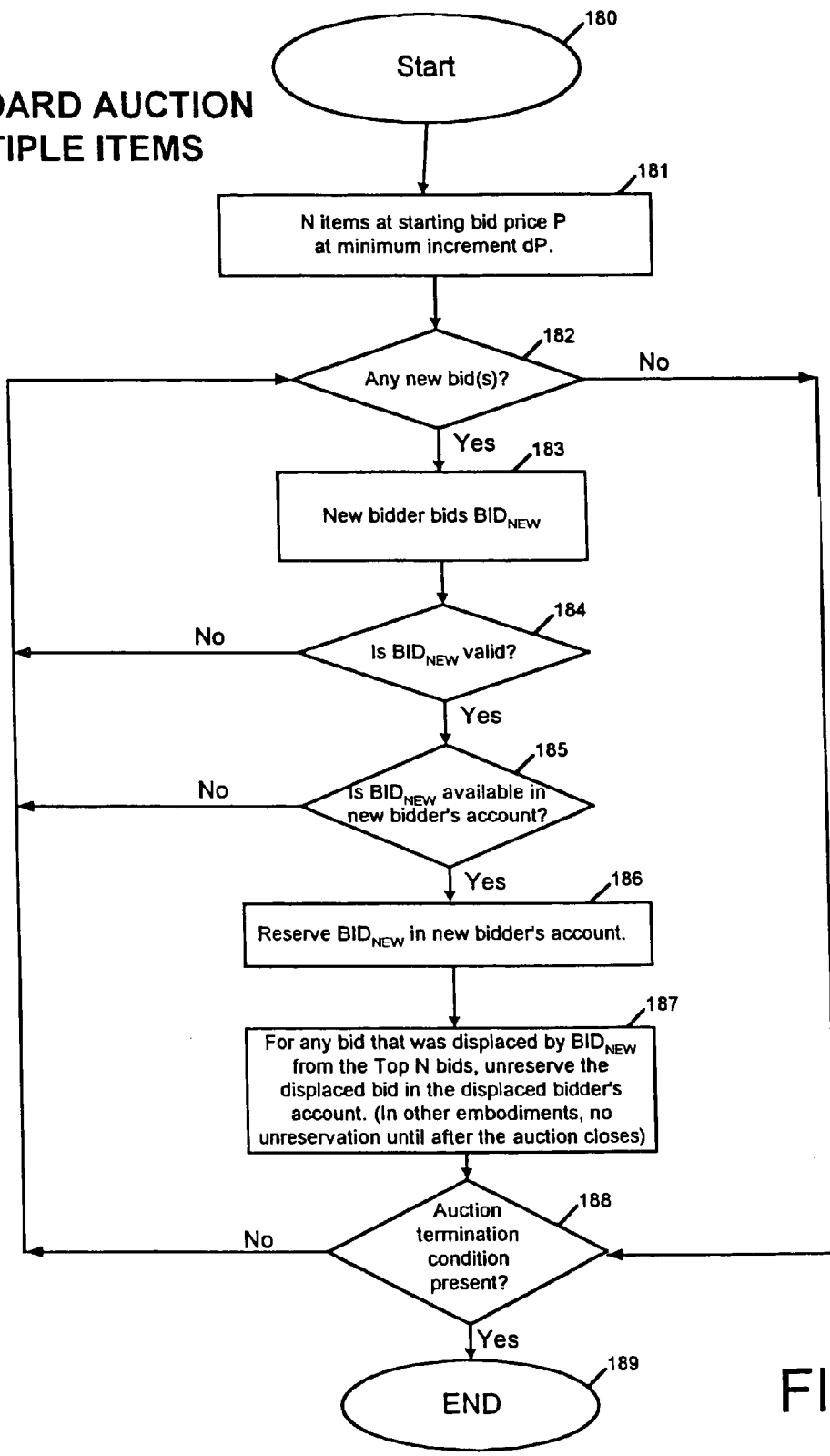
FIG. 5 shows the operation of the Yahoo! Auction System and the implications to the users' accounts when implementing the Standard Auction format where multiple items are being auctioned off in accordance with another embodiment of the present invention.

A particular implementation of the Yahoo! Auction System for the Standard Auction format for multiple items and how it implicates the users' respective accounts will now be described with respect to FIG. 5. The auction begins at step 180.

At step 181, the Yahoo! Auction System offers N items (i.e., commodity identical items) at starting bid price P each with a minimum increment dP in accordance with the seller's pre-auction instructions. For the auction of multiple items, these N items will be awarded to the top N bidders at their respective top N bids. At step 182, the Yahoo! Auction System waits for or inquires about any new bid(s). If no new bid is forthcoming, the Yahoo! Auction System proceeds to step 188, which checks for any auction termination condition (as discussed above). If any auction termination condition is present, the auction terminates at step 189; otherwise, the Yahoo! Auction System returns to step 182 to check for any new bids.

If a new bid is received, such as $BID_{NEW}$ by a new bidder (whoever this may be) at step 183, the Yahoo! Auction System checks for the validity of $BID_{NEW}$ at step 184. If this is the very first bid, checking validity means that $BID_{NEW}$ must be at least the starting bid price P. If this bid is an attempt to outbid an already existing high bid or be included among the top N bids, the new bid $BID_{NEW}$ must be at least the sum of the current high bid and the minimum bid increment dP. Other validity checks are described elsewhere in this patent specification. If $BID_{NEW}$ is not valid, the Yahoo! Auction System returns to step 182 where it checks for other new bids.

If $BID_{NEW}$ is valid, the Yahoo! Auction System proceeds to step 185 where it checks the new bidder's account to determine if $BID_{NEW}$ points are available. This ensures that the new bidder is bidding with points that he has so that if he is ultimately named as one of the top N bidders for this auction, the seller of the N items can be paid. If $BID_{NEW}$ is not available in the new bidder's account at step 185, the Yahoo! Auction System returns to step 182 where it checks for new bids.

If $BID_{NEW}$ is available in the new bidder's account at step 185, the Yahoo! Auction System proceeds to step 186. Here, the system reserves $BID_{NEW}$ in the new bidder's account so that this reserved amount of points can not be used for other transactions. If $BID_{NEW}$ displaces an already existing bid from the top N bid positions, then the displaced bid amount is unreserved in the displaced bidder's account at step 187. At this point, the new bidder is among the top N bidders with his bid at $BID_{NEW}$.

In other embodiments, step 187 does not unreserve any bids until after the auction closes. This is done as a precaution in case a winning bidder backs out. Because other bids continue to be reserved, the bidder(s) associated with these bids may be the ultimate winner(s) in those infrequent occasions when a winning bidder changes his mind. In another embodiment, the Yahoo! Auction System prevents bidders from backing out since Yahoo! has control of his account.

The system then proceeds to step 188 where it checks for the presence of any auction termination condition. If no auction termination condition is present, the system returns to step 182 where it checks for new bids. If new bids are received, the system proceeds down the flowchart as described above. Note that in this embodiment, the system will always reserve the top N bids in the top N bidders' respective accounts while unreserving any displaced bids in the displaced bidders' respective accounts. If any auction termination condition is present, the auction ends at step 189.

At this point, the Yahoo! Auction System actually deducts the reserved amount (or the winning bid amount if the winning bid amount is different from the reserved amount) from each winner's account. Also, the other reserved amounts of non-winners (if any) are unreserved in their respective accounts, if this had not been done already. Some embodiments unreserve prior to auction close and other embodiments unreserve after the auction closes.

In another variation of the multiple item/multiple winner Standard Auction format, a 1:1 mapping of items to winners is not strictly required; that is, the bidders may bid on more than one item and different winning bidders will generally pay different prices for the items. One bidder may potentially win all N items, but typically, a plurality of bidders may win any combination of these N items. For example, for two top bidders for ten auction items, one bidder may win seven items and the other bidder may win three items. Obviously, if ten items are being auctioned, the Yahoo! Auction System will not allow more than ten bidders to win. Other variations on the multiple item/multiple winners format will be described further below.

6.2 Dutch Auction

Another auction format is known as Dutch Auction. The Dutch Auction format also involves the auctioning of multiple items to multiple successful bidders. In contrast to the Standard Auction format, however, the Dutch Auction format awards the plurality of items to the top bidders at the price (per unit) bid by the lowest successful bidder. Not only do all the winning bidders pay the same price for items but at the lowest bid price among the winning bidders. Thus, a successful bidder is not necessarily "penalized" for bidding too high since this bidder will eventually pay for the item(s) at the price bid by the lowest successful bidder. For example, assume that five items are being auctioned off and the top five bidders at the conclusion of the auction time period bid $70, $67, $66, $61, and $60, respectively. Instead of each successful bidder paying for the item at their respective bid price, all of the five top bidders will be awarded the items for $60 each, which is the lowest of the bids among the top bidders.

Two embodiments of the Dutch Auction system as implemented within the Yahoo! Auction System will now be discussed. The primary difference between the two embodiments is the bid that is reserved for the top bidders. In the first embodiment, the lowest bid among the top N bidders is determined after the reception of each valid bid and reserved in the top N bidders' respective accounts. In the second embodiment, the respective bids of the top N bidders are reserved in the bidders' respective accounts and, upon completion of the auction, the necessary adjustments to the accounts are made so that all the top bidders pay only the lowest bid among the top bids.

Figure 6:
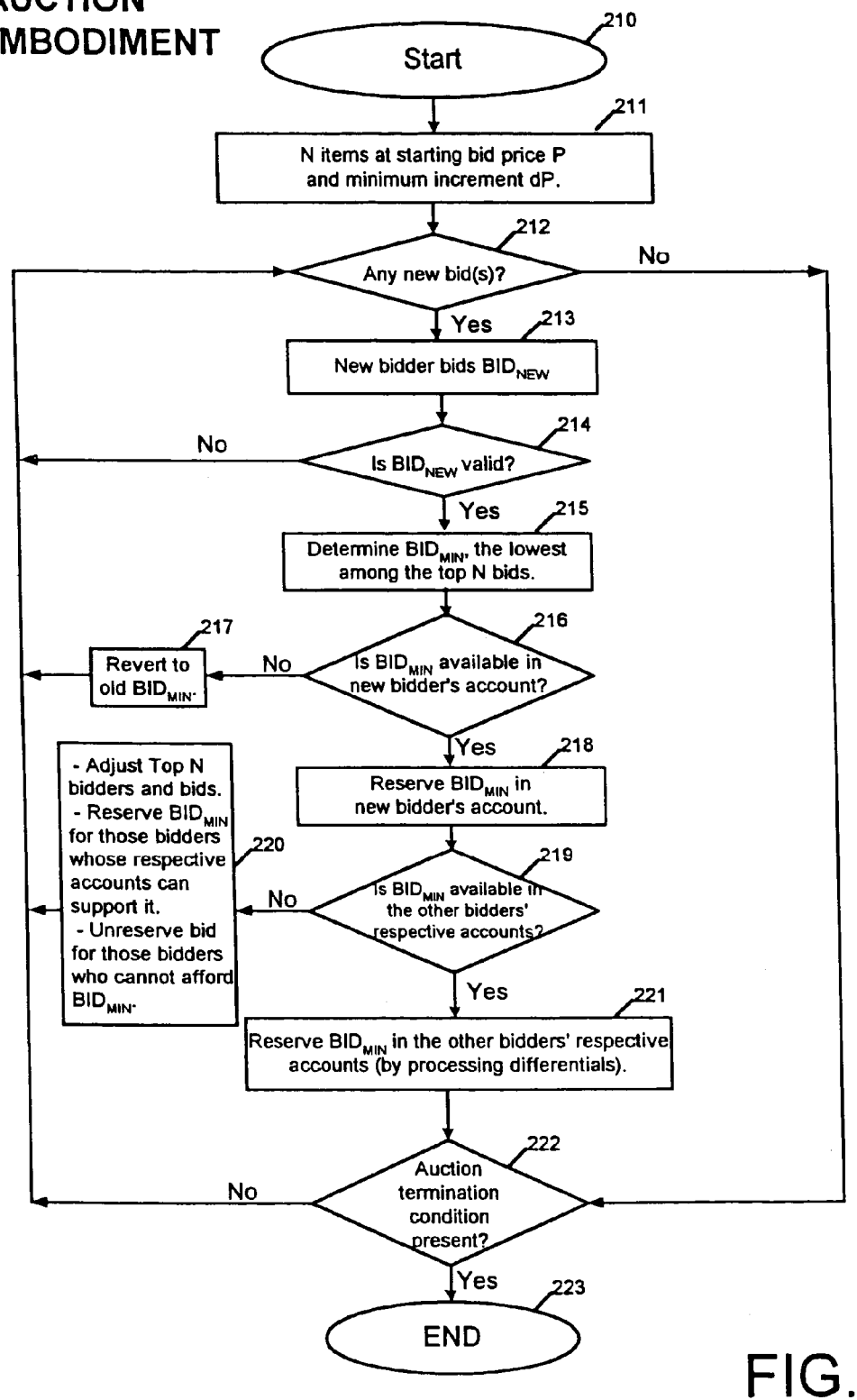
FIG. 6 shows the operation of the Yahoo! Auction System and the implications to the users' accounts when implementing the first embodiment of the Dutch Auction format.

The first embodiment of the Dutch Auction format in the Yahoo! Auction System and how it implicates the users' respective accounts will now be described with respect to FIG. 6. The auction begins at step 210.

At step 211, the Yahoo! Auction System offers N items at starting bid price P each with a minimum increment dP in accordance with the seller's pre-auction instructions. For the auction of multiple items, these N items will be awarded to the top N bidders at the bid price of the lowest bid among the top N bidders. At step 212, the Yahoo! Auction System waits for or inquires about any new bid(s). If no new bid is forthcoming, the Yahoo! Auction System proceeds to step 222, which checks for any auction termination condition (as discussed above). If any auction termination condition is present, the auction terminates at step 223; otherwise, the Yahoo! Auction System returns to step 212 to check for any new bids.

If a new bid is received, such as $BID_{NEW}$ by a new bidder (whoever this may be) at step 213, the Yahoo! Auction System checks for the validity of $BID_{NEW}$ at step 214. If this is the very first bid, checking validity means that $BID_{NEW}$ must be at least the starting bid price P. If this bid is an attempt to outbid an already existing high bid or be included among the top N bids, the new bid $BID_{NEW}$ must be at least the sum of the current high bid and the minimum bid increment dP. Other validity checks are described elsewhere in this patent specification. If $BID_{NEW}$ is not valid, the Yahoo! Auction System returns to step 212 where it checks for other new bids.

If $BID_{NEW}$ is valid, the Yahoo! Auction System proceeds to step 215 where it determines $BID_{MIN}$, which is the lowest bid among the top N bids. If the auction were to end now, all of the top N bidders pays the same bid price $BID_{MIN}$. At step 216, the system checks the new bidder's account to determine if $BID_{MIN}$ points are available. This ensures that the new bidder has enough points in his account so that if he is ultimately named as one of the top N bidders for this auction, the seller of the N items can be paid at $BID_{MIN}$ points per item. If $BID_{MIN}$ is not available in the new bidder's account at step 216, the Yahoo! Auction System proceeds to step 217 so that $BID_{MIN}$ reverts back to the previous value since the new bidder will not be among the top N bidders. The system then returns to step 212 where it checks for new bids.

If $BID_{MIN}$ is available in the new bidder's account at step 216, the Yahoo! Auction System proceeds to step 218. Here, the system reserves $BID_{MIN}$ in the new bidder's account so that this reserved amount of points can not be used for other transactions. The new bidder's bid $BID_{NEW}$ is also associated with the new bidder and stored for two purposes: (1) $BID_{NEW}$ is used to determine the top N bidders, and (2) if $BID_{NEW}$ is the lowest bid among the top N bidders, all winners pay for the items at the bid price $BID_{NEW}$. Note that by reserving $BID_{MIN}$ instead of $BID_{NEW}$ in this embodiment, the Yahoo! Auction System allows bidders to bid on items with points (i.e., $BID_{NEW}$) that they may not have in their accounts because they have just enough points (i.e., $BID_{MIN}$) to be among the top N bidders.

At step 219, the system checks if $BID_{MIN}$ is available in the other bidders' respective accounts. Because the new bidder is now one of the top N bidders, it has more than likely displaced another bidder who was among the top N bidders. As a result of this displacement, the lowest bid among the top N bidders may have changed, usually with an increase in the bid. This new increase in the bid price may or may not be affordable to some of the top N bidders. Thus, this check at step 219 ensures that the other top bidders can pay for the items if the auction were to end now.

If any of the top N bidders cannot afford $BID_{MIN}$, the system proceeds to step 220. The bidders whose account cannot support the new lowest bid $BID_{MIN}$ among the group is removed from the list of top N bidders along with their respective bids. Their respective bids are unreserved. In other embodiments, step 220 does not unreserve any bids until after the auction closes. This is done as a precaution in case a winning bidder backs out. Because other bids continue to be reserved, the bidder(s) associated with these bids may be the ultimate winner(s) in those infrequent occasions when a winning bidder changes his mind. In another embodiment, the Yahoo! Auction System prevents bidders from backing out since Yahoo! has control of his account.

For the remaining bidders, $BID_{MIN}$ is reserved in their respective accounts. This does not mean that an additional $BID_{MIN}$ amount of points will be reserved; rather, differentials will be processed so that the total number of points reserved in each account for this particular auction will be $BID_{MIN}$. For example, if a bidder had 5 points reserved in his account but the new $BID_{MIN}$ is now 8 points, the system will now reserve 3 more points from this bidder's account so that the total number of points reserved is 8 points, or the new $BID_{MIN}$. The system then proceeds to step 212 to check for any new bids.

If all of the remaining bidders have enough points in their respective accounts to support $BID_{MIN}$, the system reserves $BID_{MIN}$ in their respective accounts at step 221 by processing differentials as described above. The system then proceeds to step 222, which checks for any auction termination condition (as discussed above). If any auction termination condition is present, the auction terminates at step 223; otherwise, the Yahoo! Auction System returns to step 212 to check for any new bids.

At the conclusion of the auction, the Yahoo! Auction System actually deducts the reserved amount (or the winning bid amount if the winning bid amount is different from the reserved amount) from each winner's account. Also, the other reserved amounts of non-winners (if any) are unreserved in their respective accounts, if this had not been done already. Some embodiments unreserve prior to auction close and other embodiments unreserve after the auction closes.

Note that in this embodiment, the Yahoo! Auction System reserves the lowest bid among the top N bids in each of the top N bidders' respective accounts, rather than the bidders' respective bids. For example, bidder A bids 66 points to secure his position among the top 5 bidders for the 5 items that are being auctioned off. As a result, the top 5 bids are 55 points (bidder B), 57 points (bidder C), 60 points (bidder D), 65 points (bidder E), and 66 points (bidder A). However, despite his bid of 66 points, the system actually reserves only 55 points in his account since this Dutch Auction format awards the 5 items to the top 5 bidders at the lowest bid among the top 5 bids.

Figure 7:
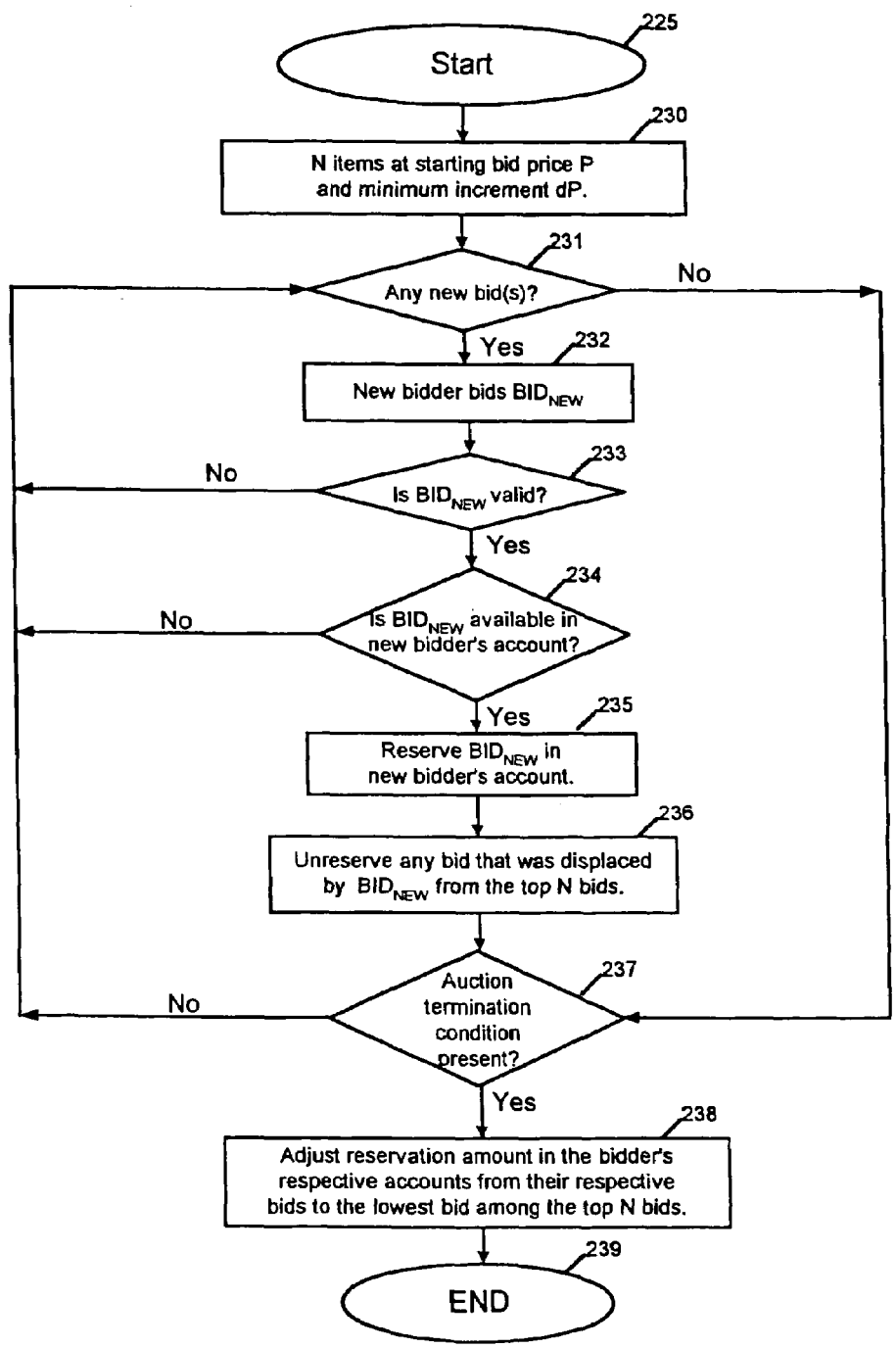
FIG. 7 shows the operation of the Yahoo! Auction System and the implications to the users' accounts when implementing the second embodiment of the Dutch Auction format.

The second embodiment of the Dutch Auction format in the Yahoo! Auction System will now be described with respect to FIG. 7. The auction begins at step 225.

At step 230, the Yahoo! Auction System offers N items at starting bid price P each with a minimum increment dP in accordance with the seller's pre-auction instructions. For the auction of multiple items in accordance with the Dutch Auction format, these N items will be awarded to the top N bidders at the bid price of the lowest bid among the top N bidders. At step 231, the Yahoo! Auction System waits for or inquires about any new bid(s). If no new bid is forthcoming, the Yahoo! Auction System proceeds to step 237, which checks for any auction termination condition (as discussed above). If any auction termination condition is present, the auction proceeds to step 238; otherwise, the Yahoo! Auction System returns to step 231 to check for any new bids.

If a new bid is received, such as $BID_{NEW}$ by a new bidder (whoever this may be) at step 232, the Yahoo! Auction System checks for the validity of $BID_{NEW}$ at step 233. If $BID_{NEW}$ is not valid, the Yahoo! Auction System returns to step 231 where it checks for other new bids.

If $BID_{NEW}$ is valid, the Yahoo! Auction System proceeds to step 234 where it checks the new bidder's account to determine if $BID_{NEW}$ points are available. This ensures that the new bidder has enough points in his account so that if he is ultimately named as one of the top N bidders for this auction and his bid $BID_{NEW}$ is the lowest bid among the top N bidders, the seller of the N items can be paid at $BID_{NEW}$ points per item from this new bidder. If $BID_{NEW}$ is not available in the new bidder's account at step 234, the Yahoo! Auction System returns to step 231 where it checks for new bids.

If $BID_{NEW}$ is available in the new bidder's account at step 234, the Yahoo! Auction System proceeds to step 235. Here, the system reserves $BID_{NEW}$ in the new bidder's account so that this reserved amount of points can not be used for other transactions.

Because the new bidder is now one of the top N bidders, it has more than likely displaced another bidder who was among the top N bidders. At step 236, the system unreserves the bid of any bidder who was displaced by the new bidder and the new bid $BID_{NEW}$. In other embodiments, step 236 does not unreserve any bids until after the auction closes. This is done as a precaution in case a winning bidder backs out. Because other bids continue to be reserved, the bidder(s) associated with these bids may be the ultimate winner(s) in those infrequent occasions when a winning bidder changes his mind. In another embodiment, the Yahoo! Auction System prevents bidders from backing out since Yahoo! has control of his account.

The system then proceeds to step 237, which checks for any auction termination condition (as discussed above). If any auction termination condition is present, the system proceeds to step 238; otherwise, the Yahoo! Auction System returns to step 231 to check for any new bids.

At the conclusion of the auction, the Yahoo! Auction System actually deducts the reserved amount (or the winning bid amount if the winning bid amount is different from the reserved amount) from each winner's account. Also, the other reserved amounts of non-winners (if any) are unreserved in their respective accounts, if this had not been done already. Some embodiments unreserve prior to auction close and other embodiments unreserve after the auction closes.

Since an auction termination condition is present at step 237, the system proceeds to process the accounts of the top N bidders. Remember, in this embodiment, the system reserved the bidders' respective bids in their respective accounts. Because the Dutch Auction format awards the auction items to the top N bidders at the lowest bid price among the top N bids, some adjustments to the accounts have to be made. At step 238, the system adjusts the reservation amount in each of the top N bidders' accounts so only only the lowest bid amount among the top N bids is reserved in each account. Unlike the first embodiment, this embodiment reserves each bidder's bid instead of the lowest bid among the top N bids during the bidding process. At the conclusion of the auction, the adjustment is then made. The auction ends at step 239.

6.3 Progressive Auction

Another auction format is known as Progressive Auction. The Progressive Auction is similar to the Dutch Auction format except that the 1:1 mapping of items to winners is not required. Instead, the multiple items can be divided up any way possible. In the Progressive Auction format, the Yahoo! Auction System awards the item(s) to the top bidders at different prices based on the quantity of items bid; that is, the price that the top bidders have to pay for the item or items being auctioned is based on the lowest successful bid price for the given item quantity. For example, for twenty items, assume that three bidders are successful for four items each, and four bidders are successful for two items each. The three bidders who each won four items successfully bid $50, $55, and $58. Thus, the three bidders pay for their respective lot of four items at the lowest successful bid price for this group—$50 each. The four bidders who each won two items successfully bid $40, $42, $45, and $48. Thus, these four bidders pay for their respective lot of two items each at the lowest successful bid price for this group—$40 each.

In the same example, if the top bidders all bid for only one item, the Yahoo! Auction System will have twenty successful bidders and each bidder will pay the lowest successful bid price, not the price that he bid. In this case, the Progressive Auction format reduces to the Dutch Auction format where the quantity of items awarded is the same for the entire inventory of such items.

One embodiment of the Progressive Auction format in the Yahoo! Auction System and how it implicates the users' respective accounts will now be described with respect to FIG. 8. The auction begins at step 240.

At step 241, the Yahoo! Auction System offers N items at starting bid price P each with a minimum increment dP in accordance with the seller's pre-auction instructions. For the auction of multiple items, these N items will be awarded to the top bidders at the bid price of the lowest bid among the bidders within its group, where the bidders are grouped together based on the quantity of items bid. At step 242, the Yahoo! Auction System waits for or inquires about any new bid(s). If no new bid is forthcoming, the Yahoo! Auction System proceeds to step 252, which checks for any auction termination condition (as discussed above). If any auction termination condition is present, the auction terminates at step 253; otherwise, the Yahoo! Auction System returns to step 242 to check for any new bids.

If a new bid is received, such as $BID_{NEW}$ points for each of K items by a new bidder (whoever this may be) at step 243, the Yahoo! Auction System checks for the validity of $BID_{NEW}$ at step 214. In one embodiment, the various quantities available are fixed by the auction system. For example, if 10 total items are available, the system may only permit bidding on 4 items, 3 items, 2 items, and 1 item. In another embodiment, the quantity is not fixed and the bidder may bid whatever quantity he desires.

Also, as more bidders submit bids, the auction system will need to resolve ties between a bidder who has bid a certain per unit price P1 for K1 items and another bidder who bid a certain per unit price P2 for K2 items when the supply for the items cannot support both bidders. Several scenarios may be possible:

P1=P2; K1=K2

In this scenario, the bid price and the quantities are identical. One embodiment of the invention will favor the bid that came in first.

P1=P2; K1>K2

In this scenario, the bid prices are identical but the quantities are different (K1>K2). In one embodiment, the system will favor the bidder with the higher quantity (i.e., K1). In another embodiment, the system will favor the bid that came in first.

P1>P2; K1=K2

In this scenario, the quantities are identical but the bid prices are different (P1>P2). This scenario is essentially the classic auction model and the system will favor the higher bid price (i.e., P1).

P1>P2; K1>K2

In this scenario, both the quantities and the bid prices are different. Note also that one bidder's price (P1) and item quantity (K1) are each greater than that for the other bidder. This is the also an easy conflict to resolve. The system will favor the higher bidder with the higher item quantity.

P1>P2; K1<K2

In this scenario, both the quantities and the bid prices are different. Note that in this scenario, although one bidder's bid price (P1) is greater than the other bidder's bid price (P2), the higher bidder's item quantity (K1) is less than the lower bidder's item quantity (K2). This is the most difficult scenario to resolve. In one embodiment, the system favors the bidder with the greater bid price (P1) to maximize his potential profits. In another embodiment, the system favors the bidder with the greater quantity (K2) to encourage volume sales.

Figure 8:
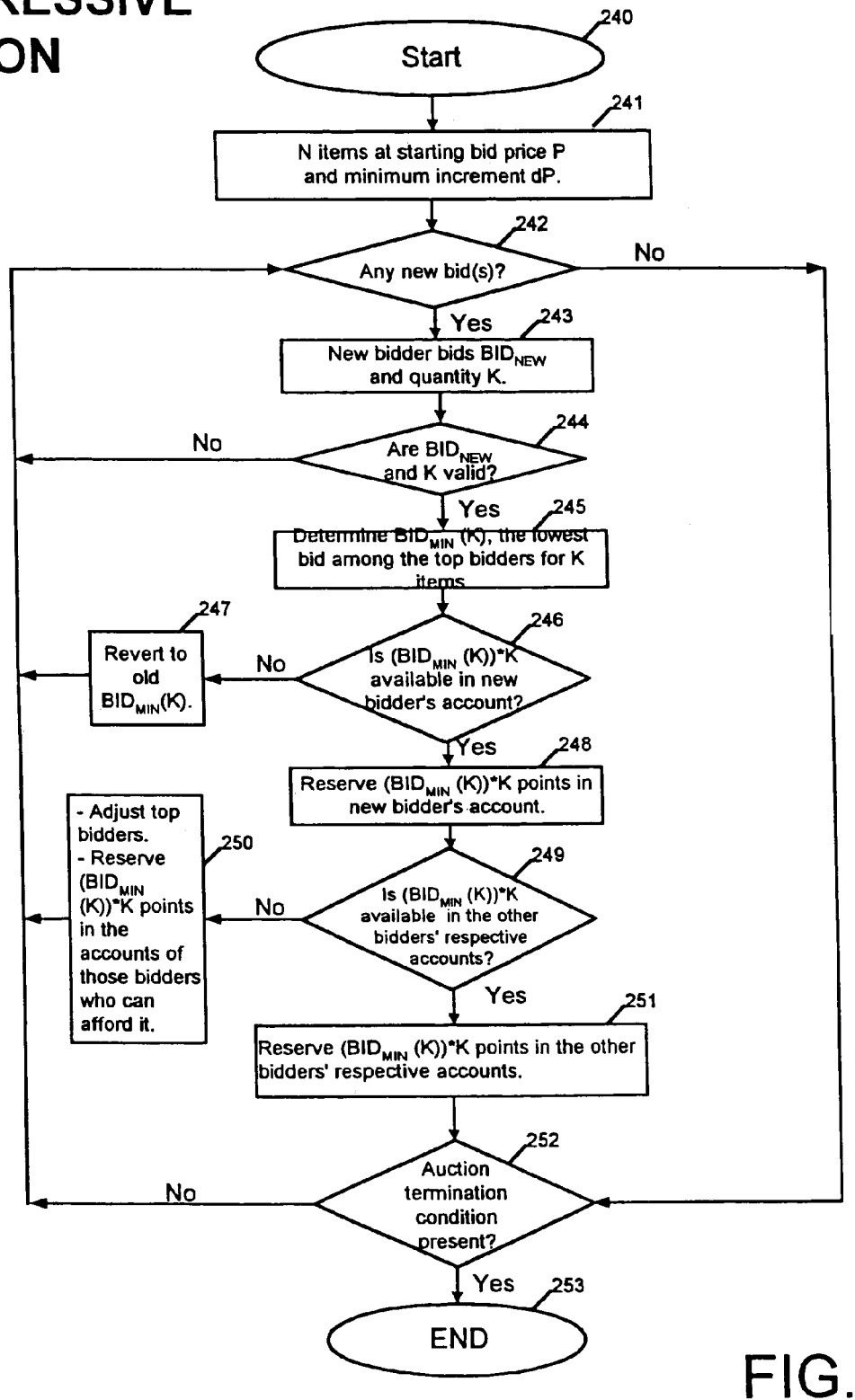
FIG. 8 shows the operation of the Yahoo! Auction System and the implications to the users' accounts when implementing the Progressive Auction format where multiple items are being auctioned off in accordance with a further embodiment of the present invention.

For the purposes of illustrating this invention, however, the flowchart of FIG. 8 show the fixed quantity embodiment. The flowchart of FIG. 8 also not examine the different price-quantity scenarios (i.e., P1 vs. P2; K1 vs. K2) to facilitate a clearer presentation of the accounting aspect of the invention.

Returning to step 244, the system checks the validity of $BID_{NEW}$ and item quantity K. If this is the very first bid, checking validity means that $BID_{NEW}$ must be at least the starting bid price P. If this bid is an attempt to outbid an already existing high bid or be included among the top bids, the new bid $BID_{NEW}$ must be at least the sum of the current high bid and the minimum bid increment dP. Of course, the item quantity K must not exceed the supply N. For example, if 10 items are available and two bidders bid for 4 items each, a third bidder cannot bid for 3 items because only 2 items are remaining. Other validity checks are described elsewhere in this patent specification. If either $BID_{NEW}$ or K is not valid, the Yahoo! Auction System returns to step 242 where it checks for other new bids.

If $BID_{NEW}$ and K are valid, the Yahoo! Auction System proceeds to step 245 where it determines $BID_{MIN}(K)$, which is the lowest bid among those top bids associated with quantity K. The indexing of bids by bid quantity facilitates the formation of groups, which then allows the system to compare bids within a group.

At step 246, the system checks the new bidder's account to determine if the product $(BID_{MIN}(K))*K$ points are available. This ensures that the new bidder has enough points in his account so that if he is ultimately named as one of the top bidders in his group for this auction, the seller of the N items can be paid at $BID_{MIN}(K)$ points per item. If $(BID_{MIN}(K))*K$ is not available in the new bidder's account at step 246, the Yahoo! Auction System proceeds to step 277 so that $BID_{MIN}(K)$ reverts back to the previous value since the new bidder will not be among the top N bidders. The system then returns to step 242 where it checks for new bids.

If $(BID_{MIN}(K))*K$ points are available in the new bidder's account at step 246, the Yahoo! Auction System proceeds to step 248. Here, the system reserves $(BID_{MIN}(K))*K$ points in the new bidder's account so that this reserved amount of points can not be used for other transactions. The new bidder's bid $BID_{NEW}(K)$ is also associated with the new bidder and stored for two purposes: (1) $BID_{NEW}(K)$ is used to determine the top bidders in its group, and (2) if $BID_{NEW}(K)$ is the lowest bid among the top bidders in its group, all winners pay for the items at the bid price $BID_{NEW}(K)$. Note that by reserving $BID_{MIN}(K)$ instead of $BID_{NEW}(K)$ in this embodiment, the Yahoo! Auction System allows bidders to bid on items with points (i.e., $BID_{NEW}(K)$) that they may not have in their accounts because they have just enough points (i.e., $BID_{MIN}(K)$) to be among the top bidders in their respective groups.

At step 249, the system checks if $(BID_{MIN}(K))*K$ is available in the other bidders' respective accounts. Because the new bidder is now one of the top bidders, it may have displaced another bidder who was among the top bidders if the supply is limited (i.e., the auction system can only have so many top bidders for the N items). If a displacement has occurred or the new bidder has just been added to the group with the lowest bid in that group, the lowest bid among the top bidders has probably changed. This new bid price in the group may or may not be affordable to some of the top bidders, especially if the bid price increased. Thus, this check at step 249 ensures that the other top bidders can pay for the items if the auction were to end now.

If any of the top bidders in their respective group cannot afford $(BID_{MIN}(K))*K$ points, the system proceeds to step 250. The bidder(s) whose account cannot support the new lowest bid $(BID_{MIN}(K))*K$ within the respective group is removed from the list of top N bidders along with their respective bids. In these cases, the previously reserved amounts are now unreserved. In other embodiments, previously reserved bids are not unreserved until after the auction closes. This is done as a precaution in case a winning bidder backs out. Because other bids continue to be reserved, the bidder(s) associated with these bids may be the ultimate winner(s) in those infrequent occasions when a winning bidder changes his mind. In another embodiment, the Yahoo! Auction System prevents bidders from backing out since Yahoo! has control of his account.

For the remaining bidders, $(BID_{MIN}(K))*K$ is reserved in their respective accounts. If the auction were to end now, the top bidders in the different groups pay the same per unit bid price $BID_{MIN}(K)$ that is associated with their respective group. The system then proceeds to step 242 to check for any new bids.

If all of the remaining bidders have enough points in their respective accounts to support $(BID_{MIN}(K))*K$ points at step 249, the system reserves $(BID_{MIN}(K))*K$ points in their respective accounts at step 251 by processing differentials as described above. The system then proceeds to step 252, which checks for any auction termination condition (as discussed above). If any auction termination condition is present, the auction terminates at step 253; otherwise, the Yahoo! Auction System returns to step 242 to check for any new bids.

At the conclusion of the auction, the Yahoo! Auction System actually deducts the reserved amount (or the winning bid amount if the winning bid amount is different from the reserved amount) from each winner's account. Also, the other reserved amounts of non-winners (if any) are unreserved in their respective accounts, if this had not been done already. Some embodiments unreserve prior to auction close and other embodiments unreserve after the auction closes.

In another embodiment of the Progressive Auction format, the successful bidders for a quantity of an item pay the lowest successful bid price in their group, where the group consists of the successful bidders who bid for that quantity of items those successful bidders who bid for less than that quantity of items. To use the same twenty item example above, three bidders are successful for four items each, and four bidders are successful for two items each. The three bidders who each won four items successfully bid $50, $55, and $58. The four bidders who each won two items successfully bid $40, $42, $45, and $48. The lowest bid price among the successful bidders who each won four items or less is $40. Thus, each of the successful three bidders who won four items each need to pay only $40 each because this is the lowest successful bid price among those who bid for four items or less. The four bidders who each won two items also pay $40 each. This embodiment provides an incentive for volume bidding since the successful bidders at the higher item quantity pay at the lowest bid price among those successful bidders who bid at that higher item quantity or less.

In this embodiment, the grouping would be different for the purposes of determining a bid price. So, although one bidder who bid for 9 items may reference the bid price of a bidder who bid for 5 items, the latter bidder cannot reference the bid price of the former bidder. Thus, with respect to FIG. 8, K is not a single fixed number; rather it is a variable number that is the bidder's quantity or less.

6.4 Buy-or-Bid Auction

Another format is Buy-or-Bid Auction format. This format is a variation of the Standard Auction format and was briefly discussed above. Here, the Yahoo! Auction System awards the merchandise to bidders who place bids at or above a posted selling price. This format guarantees the item to the bidder who bids at this posted selling price provided the inventory can support his requested quantity. Those bids that are not at or above the posted selling price are stored in reserve. If a predetermined sales volume has not been achieved after a specified time period, the posted selling price is lowered by some predetermined decrement. Those bids in reserve that are at or above this new posted selling price are deemed successful and the requested merchandise is awarded to these bidders. Those bids that are still below this new posted selling price are kept in reserve. This process continues until certain pre-auction termination conditions set by the seller have been reached. These conditions may include maximum number of selling price reductions, sales volume level, time period for auction, total items sold, or any combination of these conditions.

Conversely, if the sales volume has been achieved within the specified time period for the auction, the Yahoo! Auction System will increase the posted selling price by a predetermined increment in accordance with pre-auction instructions from the seller. This feature allows the Yahoo! Auction System to adjust prices in response to market fluctuations so that the seller can sell the given items at the highest possible price that the market can support.

Figure 9:
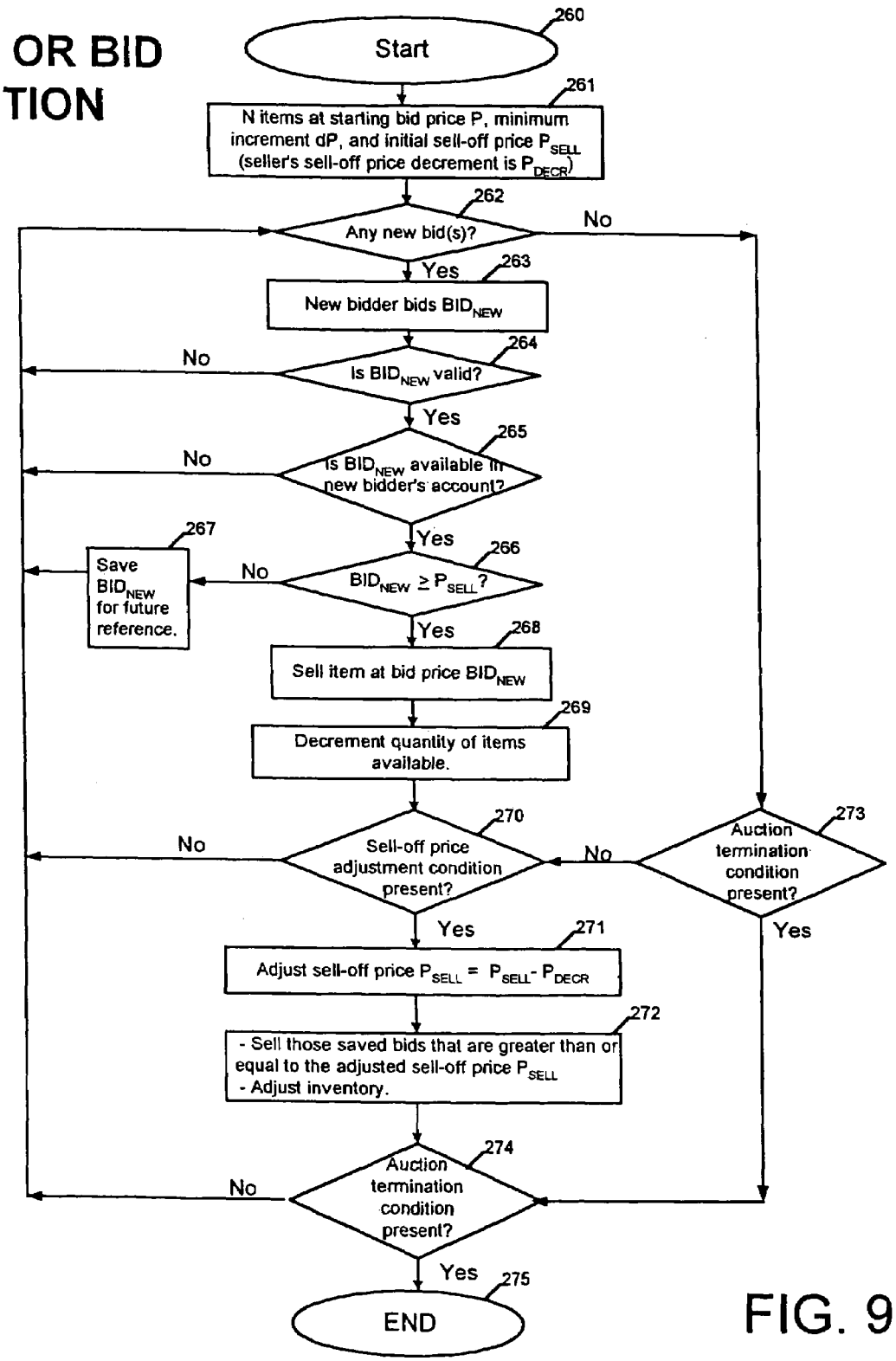
FIG. 9 shows the operation of the Yahoo! Auction System and the implications to the users' accounts when implementing the Buy-or-Bid Auction format where multiple items are being auctioned off in accordance with still another embodiment of the present invention.

One embodiment of the Buy-or-Bid Auction format in the Yahoo! Auction System and how it implicates the users' respective accounts will now be described with respect to FIG. 9. The auction begins at step 260.

At step 261, the Yahoo! Auction System offers N items at starting bid price P each with a minimum increment dP and an initial sell-off price $P_{SELL}$. The seller has also specified to the Yahoo! Auction System that the sell-off price decrement is $P_{DECR}$ in the event that the N items do not sell at the initial sell-off price $P_{SELL}$. For the auction of multiple items, these N items will be awarded to the bidders who bid at or above the sell-off price $P_{SELL}$.

At step 262, the Yahoo! Auction System waits for or inquires about any new bid(s). If no new bid is forthcoming, the Yahoo! Auction System proceeds to step 273, which checks for any auction termination condition (as discussed above). If any auction termination condition is present, the auction terminates at step 275; otherwise, the Yahoo! Auction System proceeds to step 270 to check for the presence of any sell-off price adjustment condition. An example of a sell-off price adjustment condition is the failure to reach a particular sales volume within a predetermined time period. When this condition is satisfied, the sell-off price is adjusted (i.e., lowered) to entice bidders to bid on the items at step 271.

If a new bid is received, such as $BID_{NEW}$ by a new bidder (whoever this may be) at step 263, the Yahoo! Auction System checks for the validity of $BID_{NEW}$ at step 264. If this is the very first bid, checking validity means that $BID_{NEW}$ must be at least the starting bid price P. If this bid is an attempt to outbid an already existing high bid, the new bid $BID_{NEW}$ must be at least the sum of the current high bid and the minimum bid increment dP. Other validity checks are described elsewhere in this patent specification. If $BID_{NEW}$ is not valid, the Yahoo! Auction System returns to step 262 where it checks for other new bids.

If $BID_{NEW}$ is valid, the Yahoo! Auction System proceeds to step 265 where the system checks the new bidder's account to determine if $BID_{NEW}$ points are available. This ensures that the new bidder has enough points in his account so that if he is ultimately a winner for this auction, the seller of the N items can be paid at $BID_{NEW}$ points per item. If $BID_{NEW}$ is not available in the new bidder's account at step 265, the Yahoo! Auction System proceeds to step 262 where the system checks for new bids.

If $BID_{NEW}$ is available in the new bidder's account at step 265, the Yahoo! Auction System proceeds to step 266. Here, the system checks if $BID_{NEW}$ is greater than or equal to the sell-off price $P_{SELL}$. If $BID_{NEW}$ is less than the sell-off price $P_{SELL}$, then the system proceeds to step 267 where this valid bid $BID_{NEW}$ is saved for future reference. After all, the sell-off price $P_{SELL}$ may be decreased later and this bid $BID_{NEW}$ may then be greater than or equal to the adjusted $P_{SELL}$ level. The system then returns to step 262 where it checks for new bids.

If $BID_{NEW}$ is greater than or equal to the sell-off price $P_{SELL}$ at step 266, the system proceeds to step 298 where it sells the item at the bid price $BID_{NEW}$ to the new bidder. At step 269, the system decrements the quantity of items available since this new bidder has been awarded one of the items.

At step 270, the system checks check for the presence of any sell-off price adjustment condition (e.g., failure to reach a particular sales volume within a predetermined time period). If this condition is not satisfied, then the system returns to step 262 where it checks for any new bids. If this sell-off adjustment condition is satisfied at step 270, the sell-off price is adjusted (i.e., lowered) to entice bidders to bid on the items at step 271. The new adjusted sell-off price is $P_{SELL}=P_{SELL}-P_{DECR}$; that is, the initial sell-off price $P_{SELL}$ takes on a new value which is $P_{SELL}-P_{DECR}$.

At step 272, the system checks those saved bids that are now greater than or equal to the newly adjusted sell-off price $P_{SELL}$. If any exist, the corresponding bidders are awarded the items at the bidders' respective bid prices. If the number of saved bidders who satisfy the adjusted sell-off price exceeds the inventory, then the system applies the first-in-time rule (based on bid reception date) to resolve conflicts. Also, the item quantity now available to bidders is also adjusted at step 272 to reflect the inventory.

At step 274, the system then checks for any auction termination condition (as discussed above). If any auction termination condition is present, the auction terminates at step 275; otherwise, the Yahoo! Auction System returns to step 262 to check for any new bids.

6.5 Declining Bid Auction

Another auction format is the Declining Bid Auction. In this format, the auction sells multiple items beginning at a starting maximum price of P points. Periodically, the auction system decrements the price P by some predetermined decrement dP, so that a future price would be P=P−dP; that is, the old P value would be replaced by the new P value which is the decremented value from the old P value. The auction has a relatively short duration, but as time passes by, the price P would slowly be lowered. Whenever any bidder wants one of the auctioned items, he would submit a bid. However, the bid amount is based on the particular price P at the time of the bid.

In one embodiment, the actual price that the winning bidders pays for each item is based on the lowest successful bid price. Thus, if the top five bidders for five computer monitors bid 50 points, 40 points, 35 points, 32 points, and 30 points, each of the five bidders would pay only 30 points, because this the lowest successful bid. In this format, the bidder must not bid too soon or else he may unwittingly force the other bidders to also bid soon, which may ultimately lead to higher prices. On the other hand, if a bidder waits too long to bid, he may not win the items. Of course, the bidder should submit a bid at a high enough bid price to secure the item because he knows that he will not have to actually pay at this bid price but rather the bid price of the lowest successful bid.

Figure 11:
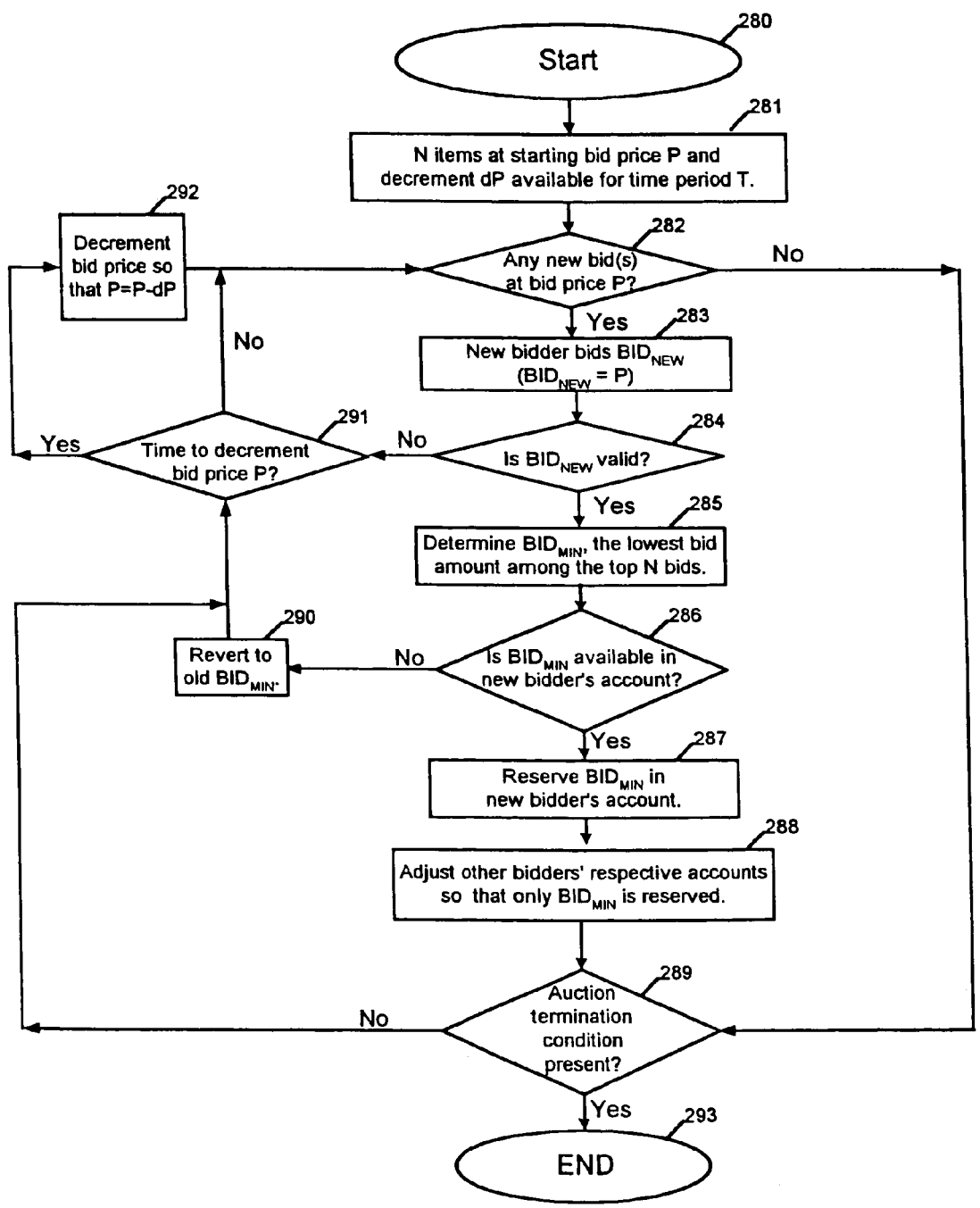
FIG. 11 shows the operation of the Yahoo! Auction System and the implications to the users' accounts when implementing the Declining Auction format where multiple items are being auctioned off in accordance with still another embodiment of the present invention.

One particular embodiment of the Declining Bid Auction format in the Yahoo! Auction System and how it implicates the users' respective accounts will now be described with respect to FIG. 11. The auction begins at step 280.

At step 281, the Yahoo! Auction System offers N items at starting bid price P each with a minimum decrement dP for a time period T in accordance with the seller's pre-auction instructions. For the auction of multiple items, these N items will be awarded to the top N bids (however they are distributed among the bidders) at the bid price of the lowest successful bid. At step 282, the Yahoo! Auction System waits for or inquires about any new bid(s). If no new bid is forthcoming, the Yahoo! Auction System proceeds to step 289, which checks for any auction termination condition (as discussed above). If any auction termination condition is present, the auction terminates at step 293; otherwise, the Yahoo! Auction System proceeds to step 291 to determine whether the auction system should decrement the bid price P.

If, at step 291, the system determines that it is now time to decrement the bid price P further, the system proceeds to step 292 where it decrements the bid price P from the old P to the new P (P−dP). Thereafter, the system proceeds to step 282 where it checks for any new bids.

If a new bid is received at step 282, such as $BID_{NEW}$ by a new bidder at step 283, the Yahoo! Auction System checks for the validity of $BID_{NEW}$ at step 284. For this Declining Bid format, $BID_{NEW}$ is the same as the current bid price P. Also, bid validity may be determined by merely checking whether the bidder is properly registered and whether the manner in which the bid was submitted complies with the Yahoo! Auction System's rules. If $BID_{NEW}$ is not valid, the Yahoo! Auction System returns to step 291 where it checks for whether the system should decrement the bid price P further.

If $BID_{NEW}$ is valid, the Yahoo! Auction System proceeds to step 285 where it determines $BID_{MIN}$, which is the lowest bid among the top N bids. At step 286, the system checks the new bidder's account to determine if $BID_{MIN}$ points are available. This ensures that the new bidder has enough points in his account so that if he is ultimately named as one of the top successful bidders for this auction, the seller of the N items can be paid at $BID_{MIN}$ points per item. If $BID_{MIN}$ is not available in the new bidder's account at step 216, the Yahoo! Auction System proceeds to step 290 so that $BID_{MIN}$ reverts back to the previous value since the new bid will not be among the top N bids. The system then returns to step 291 where it checks for whether the system should decrement the bid price P further.

If $BID_{MIN}$ is available in the new bidder's account at step 286, the Yahoo! Auction System proceeds to step 287. Here, the system reserves $BID_{MIN}$ in the new bidder's account so that this reserved amount of points cannot be used for other transactions. If the auction were to end now, all of the top bidders pays the same bid price $BID_{MIN}$.

At step 288, the system adjusts the other bidders' respective accounts so that $BID_{MIN}$ is reserved, which may involve calculating differentials. The system then proceeds to step 289, which checks for any auction termination condition. If any auction termination condition is present, the auction terminates at step 293; otherwise, the Yahoo! Auction System returns to step 291 to determine whether the auction system should decrement the bid price P.

At the conclusion of the auction, the Yahoo! Auction System actually deducts the reserved amount (or the winning bid amount if the winning bid amount is different from the reserved amount) from each winner's account. Also, the other reserved amounts of non-winners (if any) are unreserved in their respective accounts, if this had not been done already. Some embodiments unreserve prior to auction close and other embodiments unreserve after the auction closes.

In another embodiment, the system reserves $BID_{NEW}$ instead of $BID_{MIN}$ if available in the bidder's account. Also, the accounts of the other top bidders need not be adjusted at the time that $BID_{NEW}$ is reserved in the new bidder's account. However, at the end of the auction, the system processes the accounts of all the successful bidders and make adjustments as necessary so that the successful bidders pay at the lowest successful bid price $BID_{MIN}$. Note that one of the $BID_{NEW}$ bids will be the lowest successful bid price. This reduces the amount of traffic and computing that are necessary to perform the accounting task for all the top bidders since this adjustment is done only once at the end of the auction.

In a further embodiment of the Declining Bid format, the winning bidders do not pay at the bid price of the lowest successful bid. Instead, the winning bidders pay at their respective bids as the bid price is slowly decreased during the time period of the auction. In this embodiment, the flowchart of FIG. 11 is applicable except for the bid amount reserved. Instead of $BID_{MIN}$, the system reserves $BID_{NEW}$ if available in the bidder's account. Also, the accounts of the other top bidders need not be adjusted since the top bidders pay for the items at their respective bid prices.

7.0 Automated Closing

In one embodiment of the present invention, the auction closes automatically after the expiration of a specified time period (e.g., 48 hours). The range of time periods that are available is anywhere from 2-14 days. This ensures that the auction is not open indefinitely. This time period is specified by the seller in the form of pre-auction instructions to the Yahoo! Auction System. In other cases, the auction seller may have a default setting of 72 hours—a time period which is not too and not too short.

Normally, the time period should be selected such that it is long enough to optimize its exposure to potential bidders so that they may participate in the auction and short enough to maintain the high interest level of the average bidder, encourage the high energy frenzy of bidding activity which usually results in a higher winning bid, and promote the timely finalization of the sales transaction so that bidders and sellers may participate in other auctions (if they are not doing so already). This is important because even though bidders can participate in multiple auctions simultaneously, they may be hesitant to do so for various reasons—limited account balance, loss of "control," and the lower psychological energy rush due to spreading around the bidder's focus, among others. Many human bidders are not adept at multitasking. By shortening the time period for the auctions, each auction will close faster which allows the bidder to participate in other auctions.

In another embodiment of the present invention, the auction may close earlier than scheduled if no new bids are received within some predetermined period. For example, let's say a particular auction for item X is scheduled to last for five days from 8:00 AM Monday to 8:00 AM Saturday. The seller has also instructed the Yahoo! Auction System that if no new bids are received within a 48-hour period at any time during the five days or a 12-hour period after Wednesday 8:00 AM, then the auction should close immediately. This closing condition is also posted to potential bidders so that they are aware of this potential for premature closing. So, assume that a bid has been received at 1:20 PM on Tuesday. On Thursday at 1:20 PM, no new bid has been received since that last bid on Tuesday at 1:20 PM. At this point, 48 hours have elapsed and the Yahoo! Auction System closes immediately and awards the merchandise to the bidder who submitted the bid on Tuesday at 1:20 PM. To use another example, assume that a bid has been received on Friday at 7:25 AM. However, by 7:25 PM on Friday, no new bid has been received. Since 12 hours have elapsed and it is after Wednesday 8:00 AM, the auction closes immediately and the Yahoo! Auction System awards the merchandise to the bidder who bid on Friday at 7:25 AM.

This feature of prematurely closing the auction when the bidding activity has died down may encourage bidding during a shorter time period because bidders are notified that the auction may close abruptly if bidding is inactive. Accordingly, bidders may be motivated to remain active in the bidding process to prevent the closure of the auction. If a certain bid has been the high bid for some time, another bidder will be motivated to outbid the current high bidder now or else the Yahoo! Auction System may prematurely close the auction for inactivity. Furthermore, this feature may allow more merchandise to be auctioned off in a shorter period of time since the auction automatically ceases when the bidding is inactive for some predetermined length of time.

8.0 Auction Alert

In accordance with another embodiment of the present invention, once a bidder has participated in an auction (i.e., by submitting a bid), the Yahoo! Auction System will alert the bidder of other auctions of identical or similar items that are either currently active or coming up in the near future. This feature is attractive to a participating seller because the Yahoo! Auction System advertises that seller's auctions to those bidders who may otherwise not be aware of such auctions. This ensures that the Yahoo! Auction System will attempt to deliver as large a pool of bidders as possible to that seller's auction. In effect, the Yahoo! Auction System advertises other related auctions to the potential bidders based on his bidding activity in an auction.

For example, assume that four separate auctions are currently being held to auction off four similar 17-inch color monitors owned by four different sellers. Also, a similar monitor will be auctioned off beginning tomorrow in another separate auction. A typical customer who has already registered with the Yahoo! Auction System is interested in buying a 17-inch color monitor. He sees the notice of a currently active 17-inch color monitor auction on the Yahoo! Auction System's web site. He immediately accesses that auction and submits a bid. The Yahoo! Auction System receives his bid soon thereafter, checks for validity, and if it is valid, saves this bidder's name and bid in the appropriate databases as the current high bidder and current high bid. The Yahoo! Auction System also sends this bidder a notice via email or the web page that three other auctions are currently active for the item (i.e., 17-inch color monitor) he is pursuing. Also, the Yahoo! Auction System also notifies him that another auction for a similar 17-inch color monitor will commence tomorrow. At this point, this bidder is now notified of all other auctions that are either currently active or will commence in the near future for the very item he is interested in purchasing. He may then participate in these other auctions to maximize his chances of winning, and if the Yahoo! Auction System permits, he may even cancel his currently submitted bid so that he can focus on another auction.

In another embodiment of the present invention, the customer may want to be automatically notified if any of the following conditions are satisfied: (1) a selected seller is conducting another auction or has scheduled an auction in the near future, (2) a selected item or category of items is being auctioned, or (3) a selected bidder is participating in an auction. These features add to the attractiveness of participating in auctions so that the user is notified of any auctions that he may potentially be interested in. Whether his interest is in a particular seller, item, or competing against a particular bidder, this feature allows the user to passively receive notifications so that he can decide if he wants to actively participate in them.

The user may be interested in participating in all auctions where a particular seller is involved. The user's reasoning may be that the seller has high quality items or that this seller has a good reputation after a transaction has been consummated. Furthermore, this particular seller may be offering points that the buyer deems to be more valuable than those of other sellers.

The user may also be interested in participating in all auctions where a particular item is being auctioned. Usually, this is not an entire category of merchandise, where the term "category" is used to describe those goods on the Yahoo! Auction System's homepage. Usually, if the user is interested in baseball cards, he may want some notification of all baseball card auctions so that he may participate in them. The user may also be interested in 17-inch computer monitors of a certain brand.

Furthermore, the user may be interested in participating in those auctions where a particular bidder is a participant, regardless of seller or merchandise. Here, the user may be motivated by pure competitive fire. On the other hand, the user may have determined that this particular bidder has similar interests and to the extent that this bidder has some insights on some bargains, the user would like to be notified.

In another embodiment, an auto-refresh feature is implemented. So, if no winning bidder has been determined during the course of the auction, the Yahoo! Auction System automatically resubmits the auction to allow users to participate. For those users who had previously participated but were not declared the winner, this refresh feature allows them to participate again. For those users who did not participate in this auction before, this refresh feature allows them to participate for the first time.

Another feature is an auto-extension of auctions. During the course of the auction, if bids are submitted in the last X minutes (e.g., last 5 minutes until closing), the Yahoo! Auction System will extend the auction for another Y minutes. This feature prevents those users who attempt to strategically "swoop in" in the last few minutes or seconds to win the auction. In one embodiment, the X minutes can range anywhere from the 5-30 minutes and Y minutes can range anywhere from 15-120 minutes.

9.0 Automated Bidder

Another embodiment of the present invention provides for the automated bidder or some aspect of bidding by proxy. An advantage of conducting a sales transaction online through an electronic Yahoo! Auction System is the ability to automate almost every aspect of the transaction. The online and electronic nature allows the bidder to participate in auctions without physically being present at the auction floor. Indeed, in the auctions held by the Yahoo! Auction System of the present invention, the traditionally known auction floor does not exist since all transactions occur electronically. Bids can be submitted from almost any place on earth (or outside earth) so long as the electronic communication medium (e.g., telephone lines, free space with appropriate radio transmitters/receivers or optical transmitters/receivers) is available and connected to the remote Yahoo! Auction System. Also, the electronic nature of the Yahoo! Auction System of the present invention allows bidders to participate in multiple auctions simultaneously, which was physically impossible in the traditional auction houses. Furthermore, the electronic nature of the Yahoo! Auction System allows the human bidder to automate his actions so that he does not have to be physically present at this computer to locate an auction, submit a bid, or finalize a sale.

In accordance with one embodiment of the present invention, the Yahoo! Auction System allows any registered bidder to automate particular bidder-side aspects of the bidding process so that he does not have to manually participate in the auction. The automation involves an agent application process at the client computer. In another embodiment, the agent application resides in the server of the remote Yahoo! Auction System but associated with the user. The automation involves the configuration of certain settings of the agent process by the user. Some configurable settings include maximum bid amount, out-bid increment, start bid enable, and item quantity. For these settings to function properly, the user must select a particular auction or auctions. These settings can be set at the time of the auction or in advance of the start of the auction.

The maximum bid amount places a ceiling on the amount that the bidder is willing to bid on an item. For example, assume that the current high bid for an item is $490. The required increment is $10 for this auction. The user has set his maximum bid amount of $500 and an out-bid increment of DEFAULT, which informs the Yahoo! Auction System that the required increment will be observed. The client computer process at the bidder's side submits a bid of $500 to the Yahoo! Auction System. If no other higher bid has been received by the Yahoo! Auction System and it receives the user's bid of $500, the user's bid will now be the current high bid. If another bidder out-bids this current high bid to $510, the user's agent process will not submit another bid because the minimum valid bid is $520 (current high bid $510+default increment of $10) which is greater than the maximum bid amount specified by the user in the agent process settings. With this setting, the user can control how much payment units (in the form of cash or points) he is willing to use up to obtain this particular item through this Yahoo! Auction System. Of course, if the user intervenes during the auction process, he may manually override this maximum bid amount setting quickly and easily.

The maximum bid amount is applied with some checks. If the user's account does not have enough payment units to cover the maximum bid amount specified for the agent process, the Yahoo! Auction System will either disallow the participation of the user in that auction, suggest a lower maximum bid amount that can be covered by the user's account balance, or allow the user to participate provided that the credit line in the user's account is not exceeded. Normally, the Yahoo! Auction System will prompt the user with the first two options—disallow participation and suggest a lower maximum bid amount. The third option is available provided that the Yahoo! Auction System has enabled the credit feature of the user's account. Not every account has a credit line and credit balance because of the inherent risks of offering credit to those users who are not credit worthy. Also, the user's account is periodically checked to ensure that sufficient payment units are available to cover any outstanding bids because even though the account may have had sufficient payment units yesterday, it may not have enough payment units today in light of other intervening transactions that may have occurred.

The out-bid increment can be set to either DEFAULT or some other value. If the setting is DEFAULT, the agent process uses the required bid increment for the particular auction selected by the user. Because each auction's bid increment may be different, the DEFAULT setting allows the user to comply with the minimum required bid increment for each auction. The user may also use some bid increment value that is not equivalent to the required bid increment for the auction. Normally, this bid increment value is some amount above the minimum required bid increment so that the user's bid is valid. If some absolute value regardless of the required bid increment is selected, the user runs the risk of having his bid rejected by the Yahoo! Auction System for being invalid (i.e., below the required minimum bid increment). The user may want to use this value instead of the DEFAULT value because of some perceived advantage that they will outbid other bidders. Some of these users assume, rightly or wrongly, that most bidders will only submit a bid that satisfies the absolute minimum increment (i.e., current high bid+required minimum bid increment). Thus, by submitting a bid that is above the required bid increment, these users believe that they will have a better chance of outbidding competitors.

Like the maximum bid amount setting the out-bid increment is also applied with some checks. First, when the agent process applies the out-bid increment to the current high bid, it also checks the maximum bid amount to ensure that the user's new bid does not exceed the specified maximum bid amount. If the new bid does exceed the maximum bid amount, the agent process does not submit the new bid to the Yahoo! Auction System. Also, the new bid amount is compared to the user's account balance to ensure that the user has sufficient payment units to cover the new bid amount since the agent process does not know in advance whether the new bid will be successful or not. If the account is associated with credit, the new bid amount is compared to the authorized credit line to ensure that the new bid amount does not exceed the credit line.

The start bid enable setting allows the user start the bidding process for any specified auction, whether currently active or scheduled to commence sometime in the near future, by submitting a bid. With this feature, the bidder need not manually be present at his computer station to submit the starting bid. The bidder specifies two starting bid prices—one for those auctions where the starting bid price is not specified and the other for those auctions where the starting bid price is specified. For those auctions where the starting bid price is not specified, the user sets some bid value, which is usually very low. For those auctions where the starting bid price is specified, the user may either set a default value or some other specific value. The default value is the starting bid price specified by the seller (via the Yahoo! Auction System). A non-default specific value can be provided as well and normally, this value is some amount above the starting bid price. If this value is set without any context of the required starting bid price, the user runs the risk that his starting bid price is below the required starting bid price and hence, invalid.

Of course, regardless of whether the default value or some other specific value is set for the start bid enable setting, the agent process compares the starting bid price to the maximum bid amount to ensure that the starting bid price does not exceed the maximum bid amount. If the starting bid price does exceed the maximum bid amount, the agent process does not submit this bid and in effect, it does not participate in this auction.

Another setting is the item quantity. Here, the user specifies the maximum and minimum item quantity. This setting is effective only for those auctions where multiple items are being auctioned off and bidders are allowed to bid for more than one item. The agent process initially selects the maximum quantity and submits a bid in accordance with the other settings described above (i.e., start bid enable, maximum bid amount, bid increment). Typically, the Yahoo! Auction System will accept this bid. Many times, however, the Yahoo! Auction System may reject this bid because the specified item quantity cannot be supported by the inventory. (Other reasons for bid rejection have been discussed above including someone else outbidding you or the auction has closed). If so, the agent process receives this notification from the Yahoo! Auction System and the agent promptly reduces the item quantity by one unit (so long as this reduction does not reduce the item quantity below the minimum item quantity specified by the user). The agent process then submits the bid again with this new quantity. This back-and-forth interchange between the Yahoo! Auction System and the agent process may continue indefinitely until the auction closes, the Yahoo! Auction System can support the requested item quantity, or the agent process cannot lower the item quantity any further.

Like the other settings, the agent process performs checks on the item quantity. This time, the agent must determine the total price (by multiplying the item quantity by the price per unit) and compare this total price to the user's maximum bid amount. If the maximum bid amount is not violated, the agent compares the total price to the user's account balance to ensure that sufficient payment units are available to cover the cost of purchasing these items if the user wins the auction. If the credit feature is associated with the user's account, the agent checks the user's credit line and credit balance to ensure that the user's credit is still usable.

With this automated bidder feature, the human bidder can specify various parameters to the agent process which then acts on behalf of the user to compete (and win) the auction. Sufficient checks are provided so that the agent process does not deplete the user's resources. Even if the user wanted to deplete his resources, other checks are implemented so that the Yahoo! Auction System prevents the user from abusing his account (and credit).

Figure 10:
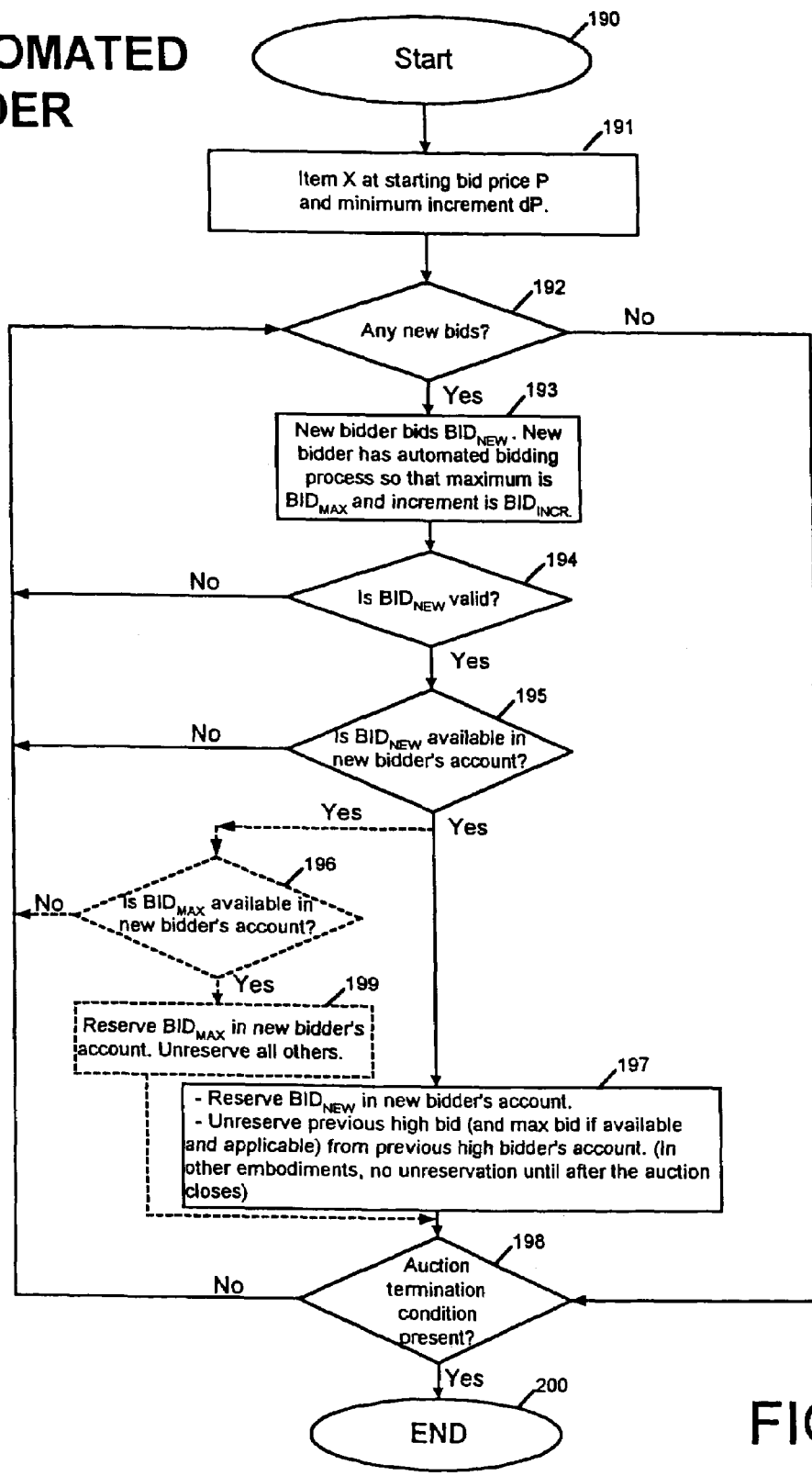
FIG. 10 shows the operation of the Yahoo! Auction System and the implications to the users' accounts when implementing the automated bidder feature in accordance with an embodiment of the present invention.

A particular implementation of the automated bidder feature in the Yahoo! Auction System and how it implicates the users' respective accounts will now be described with respect to FIG. 10. The auction begins at step 190.

At step 191, the Yahoo! Auction System offers item X at starting bid price P with a minimum increment dP in accordance with the seller's pre-auction instructions. At step 192, the Yahoo! Auction System waits for or inquires about any new bid(s). If no new bid is forthcoming, the Yahoo! Auction System proceeds to step 198, which checks for any auction termination condition (discussed elsewhere). If any auction termination condition is present, the auction terminates at step 200; otherwise, the Yahoo! Auction System returns to step 192 to check for any new bids.

At step 193, a new bid $BID_{NEW}$ by a new bidder (whoever this may be) is received by the Yahoo! Auction System. In this automated bidder feature, the new bidder has automated his bidding so that he can bid on item X even though he is not present at his computer station. He has specified a maximum bid of $BID_{MAX}$ and an increment of $BID_{INCR}$, which is greater than or equal to the minimum bid increment dP.

At step 194, the system checks for the validity of $BID_{NEW}$. If this is the very first bid, checking validity means that $BID_{NEW}$ must be at least the starting bid price P. If this bid is an attempt to outbid an already existing high bid, the new bid $BID_{NEW}$ must be at least the sum of the current high bid and the minimum bid increment dP. Other validity checks are described elsewhere in this patent specification. If $BID_{NEW}$ is not valid, the Yahoo! Auction System returns to step 192 where it checks for other new bids.

If $BID_{NEW}$ is valid, the Yahoo! Auction System proceeds to step 195 where it checks the new bidder's account to determine if $BID_{NEW}$ points are available. This ensures that the new bidder is bidding with points that he has so that if he ultimately wins the auction, the seller of item X can be paid. If $BID_{NEW}$ is not available in the new bidder's account at step 195, the Yahoo! Auction System returns to step 192 where it checks for new bids.

If $BID_{NEW}$ is available in the new bidder's account at step 195, the Yahoo! Auction System proceeds to step 197. Here, the system-reserves $BID_{NEW}$ in the new bidder's account so that this reserved amount of points can not be used for other transactions. If $BID_{NEW}$ was submitted to outbid an already existing high bid, then the previously reserved high bid amount is unreserved in the previous high bidder's account. At this point, the new bidder is the current high bidder with the current high bid at $BID_{NEW}$. The system then proceeds to step 198 to check for the presence of any auction termination condition.

In other embodiments, step 197 does not unreserve any bids until after the auction closes. This is done as a precaution in case a winning bidder backs out. Because other bids continue to be reserved, the bidder(s) associated with these bids may be the ultimate winner(s) in those infrequent occasions when a winning bidder changes his mind. In another embodiment, the Yahoo! Auction System prevents bidders from backing out since Yahoo! has control of his account.

In an alternative embodiment, the Yahoo! Auction System proceeds from step 194 to step 196 while skipping step 195 altogether. At step 196, the system checks if $BID_{MAX}$, which is the new bidder's maximum bid amount that he specified for his automated bidder setup, is available in the new bidder's account. This is done because, theoretically, the bidding process may escalate to this maximum amount and the new bidder may ultimately win the auction. At step 199, the system reserves $BID_{MAX}$ in the new bidder's account and unreserves any other previously reserved bid in the previous high bidder's account. Because the maximum bid $BID_{MAX}$ is reserved, the system need not reserve the current high bid $BID_{NEW}$ (because $BID_{MAX}$ is greater than or equal to $BID_{NEW}$). Note that if the ultimate winner of the auction is the bidder who used the automated bidder feature, some additional accounting process is done at the conclusion of the auction. Remember that in this embodiment, the system reserved $BID_{MAX}$ from the new bidder's account. If the ultimate winning bid is $BID_{NEW}$, where $BID_{NEW}$ is less than $BID_{MAX}$, the difference must be put back into the winning bidder's account since all of $BID_{MAX}$ will not be needed to purchase item X.

At step 198, the system checks for the presence of any auction termination condition. If no auction termination condition is present, the system returns to step 192 where it checks for new bids. If new bids are received, the system proceeds down the flowchart as described above. If any auction termination condition is present, the auction ends at step 200.

At the conclusion of the auction, the Yahoo! Auction System actually deducts the reserved amount (or the winning bid amount if the winning bid amount is different from the reserved amount) from each winner's account. Also, the other reserved amounts of non-winners (if any) are unreserved in their respective accounts, if this had not been done already. Some embodiments unreserve prior to auction close and other embodiments unreserve after the auction closes.

In another embodiment of the present invention, several bidders may automate the bidding process. Since these bidders have all specified a maximum bid amount, the Yahoo! Auction System need not check the bidders' respective accounts at each outbid increment since the outbidding will play itself out after time.

For example, assume that bidder A has automated his bidding process with a maximum bid amount of 55 points with an outbid increment of 5 points. Bidder B also has automated his bidding process with a maximum bid amount of 65 points with an outbid increment of 7 points. Assume that bidder A has provided the starting bid at 30 points. Bidder B outbids bidder A with 37 points in accordance with the automated bidder instructions for bidder B. In this embodiment, the auction system does not check bidder B's account to check if 37 points is available. Instead, bidder A now bids 42 points in accordance with his automated bidder instructions. Bidder B then bids 49 points. Bidder A then bids 54 points. Bidder B then bids 61 points. At this point, bidder A cannot bid further because doing so would violate his automated bidding instructions which capped his bid amount at 55 points. The system then checks bidder B's account to make sure that 61 points are available.

In another variation of the above theme, the amount reserved is the maximum bid amount at the time the bid is received by the auction system. To use the same example above, the auction system reserves 55 points in bidder A's account when bidder A's bid of 30 points is received. The auction system also reserves 65 points in bidder B's account when bidder B's bid of 37 points is received. At the conclusion of this auction, bidder B wins with 61 points. At this point, the auction system unreserves the 55 points in bidder A's account because bidder A lost. The auction system also unreserves 4 points (65−61=4) in bidder B's account.

10.0 Automated Seller

Another embodiment of the present invention provides for the automated seller or some aspect of selling by proxy. Most of the automated seller features have been discussed in this patent specification. Like the automated bidder, the Yahoo! Auction System sells the seller's merchandise based on instructions (i.e., settings) provided by the seller. In one embodiment, although an agent process at the client computer handles automated bidder tasks, the Yahoo! Auction System itself carries out the automated seller tasks.

The seller normally provides time period-related settings to the Yahoo! Auction System. For all auctions, the seller can specify a specific time period including open and close dates/times for auctioning his merchandise. The open and close dates/times can be almost anything although the Yahoo! Auction System encourages the time period to be long enough to allow an optimal number of potential bidders to participate in the auction and short enough to keep bidders' interests and maximize the number of auctions held every year.

Alternatively, the seller can select a default setting. In one embodiment, the default setting is 72 hours and will open immediately. In another embodiment, the Yahoo! Auction System may suggest some dates/times based on the merchandise being auctioned off and times of peak auction activity. For example, assume that a seller has a bicycle that he wants to sell. The Yahoo! Auction System compares the time periods for auctions of bicycles and provides a report of the various time periods used by other sellers. The report also contains information on the average time period, ultimate selling price, and a histogram indicating the peak bidding activity.

The seller may also want to close the auction prematurely, as described above in the automated closing feature section. The seller specifies a low bidding activity time period to the Yahoo! Auction System. Thus, if bidding activity is very low (or nonexistent) during this pre-specified low bidding activity time period, the auction closes abruptly and the merchandise is awarded to the current high bidder. For example, the seller can specify that if no bidding activity occurs during any 6-hour time period, the Yahoo! Auction System should close the auction immediately. The seller can specify numerous low bidding activity time periods for a single auction. For example, he may command the Yahoo! Auction System to close the auction whenever any of the following conditions is satisfied—no bidding activity within a 12-hour period, no bidding activity within a 2-hour period if only 24 hours remain until the scheduled close of auction, or no bidding activity within the first 48 hours of the opening of the auction.

The seller can also specify the starting-bid price. If the bidders do not bid the required starting bid price, the Yahoo! Auction System will reject the bid as being invalid. The seller can also specify the start-up time period, the number of start-up time periods, and the decrements for each start-up time period. The start-up time period is some specified time from the opening of the auction. If no bid has been received by the Yahoo! Auction System within the start-up time period, the seller can specify that the starting bid price be decremented by some amount to entice bidders to submit bids. The seller can set up a second start-up time period with an associated decrement if the revised starting bid price still does not entice potential bidders to submit bids. The seller can set up as many start-up time periods with their associated decrements. The Yahoo! Auction System also has default values for the start-up time period and the appropriate decrements and will suggest them to the seller to facilitate the sale of the seller's merchandise.

As for the actual reception of bids, the seller can either specify some minimum increment value required for the bid to be valid or leave it in the default setting, in which case the Yahoo! Auction System decides for the seller. Typically, the default setting is 5 payment units. In another embodiment, the valid increment increases as the number of points associated with the current high bid increases. The table below shows one example of the varying valid bids:

| Current high bid | Valid increment |
|---|---|
| <100 | 5 |
| 101-500 | 10 |
| 501-1000 | 20 |
| 1001-1500 | 25 |
| 1501-2000 | 30 |

Like the floating closing feature which closes an auction prematurely if no bidding activity occurs within a specified time period, the Yahoo! Auction System provides a sell-off feature. The sell-off feature is normally associated with the Buy-or-Bid Auction format whereby the merchandise is immediately awarded to bidders who submit a bid that has a value that meets or exceeds some threshold sell-off value. Those bids that are less than the posted sell-off price are stored in reserve. This sell-off price is in effect for some specified time period which the seller sets. After this sell-off time period has expired and so long as inventory for the merchandise is available, the sell-off price can be lowered by some decrement. Those bids that are above this new (but lower) sell-off price win the merchandise and those bids that are below this sell-off price are kept in reserve. After some specified sell-off time period, the Yahoo! Auction System lowers the sell-off price even further based on instructions from the seller (if the seller wants to decrement the sell-off price further).

The seller may also specify the names (i.e., YahooID) of those bidders that the seller prefers to block from bidding in certain or all auctions. For whatever reason, from bad prior experience with a particular bidder or reported bad behaviors, the seller may block certain bidders from participating in some or all of a seller's auctions.

In all of these cases, the Yahoo! Auction System actually conducts the sales process and transaction based on pre-auction instructions from the seller. In many cases, the seller may take the time to provide the specific settings to maximize his sales potential. In other cases, the seller may choose default values to quickly place his merchandise in play. Regardless, once the auction has opened, the Yahoo! Auction System is capable of conducting the auction and finalizing sales without any subsequent intervention by the human seller.

11.0 Account Checks Beyond the Initial Check

As mentioned in the various embodiments above, the Yahoo! Auction System checks the bidder's account at the time that a bidder makes a bid to determine if enough points exist in the account to afford the item(s) bid. In some cases, this involves comparing the actual number of points bid (i.e., $BID_{NEW}$) with the account balance and reserving these points if the account balance can support it. Some examples include the Standard Auction format, the second embodiment of the Dutch Auction format, and the Buy-or-Bid format. In other cases, the system compares some other number of points (i.e., $BID_{MIN}$) that may not be the bidder's bid with the account balance and reserving these points if the account can support it. Some examples include the first embodiment of the Dutch Auction format and the Progressive Auction. In these instances, the auction system performs the account check at the time the bid is received.

In other embodiments, the Yahoo! Auction System does not perform the account check at the time of bid; rather, the system performs the account check for those bids received near the end of the auction. For many popular auctions, many bids are received during the course of the auction as one bidder tries to outbid another bidder. However, the ultimate winning bid will normally be one that was received near the end of the auction.

By checking into the account database-to verify that the requisite minimum balance exists and reserve the bid amount for every single valid bid, the Yahoo! Auction System generates a lot of network traffic and uses computing resources, especially if the account database is owned and operated by a third party. By limiting the inquiries and computations to those bids that may ultimately be the winning bid (i.e., those bids that are received later in the auction rather than earlier), traffic can be minimized. This embodiment makes sense because, in many cases, a bidder is aware of his account balance and will refrain from engaging in any transaction that involves more points than he can afford.

In some infrequent cases, however, a bidder may be unaware of his account balance altogether. Although the bidder's account could have satisfied a bid price yesterday, he may have conducted some other transactions today that depleted his account to such an extent that he no longer has the points to satisfy yesterday's bid today. In this case, another embodiment of the present invention includes some functionality in the Yahoo! Auction System that periodically checks each bidder's account status with respect to each auction for which he is a participant. This periodic check can be once a day, once every 12 hours, once every 6 hours, once every 3 hours, or some other frequency. Whether the check is for his actual bid (i.e., $BID_{NEW}$) or some other bid value (i.e., $BID_{MIN}$) against his account, the Yahoo! Auction System performs the check based on the particular auction's rules and format. If a bidder's account status has changed such that he can no longer afford the requisite amount, the Yahoo! Auction System removes him from the top bidder list in his respective auction. In one embodiment, the reservation scheme is not implemented throughout the auction; instead, the system relies on periodic checks for the most part and reservations near the end of the auction.

In another embodiment, the Yahoo! Auction System does not check the bidders' respective accounts periodically. Rather, the Yahoo! Auction System checks the bidders' respective accounts whenever the bidder conducts any transaction on the Yahoo! site. The transaction would be conducted using the user's YahooID, which would then flag the Yahoo! Auction System. The Yahoo! Auction System checks the YahooID from the flag with the bidder database. In most cases, the flag will identify a Yahoo! user who is probably not actively participating in any Yahoo! auction at the moment. If, however, the YahooID corresponds with a currently active bidder from the bidder database, the Yahoo! Auction System checks the bidder's account to determine if the bidder still has enough points to support the auction(s) he is currently participating in. If his account balance is too low, this bidder is removed from the relevant auction(s). The Yahoo! Auction System also notifies the user of his removed status. If the user wants to participate further in the auction(s) from which he was removed, he would have to earn enough points to satisfy whatever thresholds have been set for the auction (e.g., highest bid for the Standard Auction, $BID_{MIN}$ for the Dutch Auction, sell-off price for Buy-or-Bid Auction).

A special case that occasionally occurs will now be discussed. What happens when some or all of the user's points are scheduled to expire prior to the official close of a particular auction? Of course, if the user is not a participant of that auction, no issue is raised.

In accordance with one embodiment of the present invention, the Yahoo! Auction System will make a decision on whether to allow a user to bid based on some account checks. The Yahoo! Auction System first determines whether any points are scheduled to expire prior to the official close of the auction. If so, the Yahoo! Auction System performs a quick check of the user's account to determine the user's account balance after the expiration of the points. For those cases where the user is using the automated bidder feature, the Yahoo! Auction System compares the max bid amount with the post-expiration account balance. If the account balance can support the max bid amount, the Yahoo! Auction System will allow the user to participate in the auction and accept any valid bids by this user. If the account balance does not support the max bid amount, the Yahoo! Auction System will not allow the user to participate in the auction.

In some cases, the user may not be using the automated bidder feature; that is, he is bidding manually. In these cases, the Yahoo! Auction System compares the current bid by the user to the post-expiration account balance. If the post-expiration account balance can support the user's current bid amount, the Yahoo! Auction System will allow the user to participate in the auction. If the post-expiration account balance does not support the user's current bid amount, the Yahoo! Auction System will not allow the user to participate in the auction.

In another embodiment of the present invention, if any points are scheduled to expire prior to the official close of the auction, the Yahoo! Auction System makes a decision on whether to roll over the points into the next calendar quarter. This, in effect, rewards those users who submit a valid bid in an auction by extending the life of the points into the next calendar. In one embodiment, the Yahoo! Auction System first determines whether any points are scheduled to expire prior to the official close of the auction. If so, the Yahoo! Auction System performs a quick check of the user's account to determine the user's account balance after the expiration of the points. If the post-expiration account balance can support the current bid (for manual bidding) or the max bid (for automated bidding), no roll overs will be necessary and the user is allowed to participate. In another embodiment, the Yahoo! Auction System rewards the user anyway for participating and rolls over the points for expiration in the next calendar quarter. If the post-expiration account balance cannot support the current bid (for manual bidding) or the max bid (for automated bidding), the Yahoo! Auction System will roll over the points that are scheduled to expire in this calendar quarter into the next calendar quarter and allow the user to participate.

In a further embodiment of the present invention, the Yahoo! Auction System will let users participate in auctions so long as the current bid (for manual bidding) or the max bid (for automated bidding) is reserved at the moment. Thus, any amount that is reserved will not necessarily expire at the time of the expiration date. So, the Yahoo! Auction System first determines whether any points are scheduled to expire prior to the official close of the auction. If so, the Yahoo! Auction System performs a quick check of the user's account to determine the user's account balance after the expiration of the points. If the past-expiration account balance can support the current bid (for manual bidding) or the max bid (for automated bidding), no further action is necessary since the user can clearly participate. If the post-expiration account balance cannot support the current bid (for manual bidding) or the max bid (for automated bidding), and the pre-expiration account balance can support the bid, the Yahoo! Auction System will flag the points that are scheduled to expire. The Yahoo! Auction System allows the user to participate and will reserve the bid amount (which includes the flagged points). Once reserved, the expiration date will have no effect on these points because they are flagged. If the user ultimately wins the auction item, the points (flagged and otherwise) will be deducted from the user's account. If the user does not ultimately win the auction item, the Yahoo! Auction System removes the flags from the flagged points. Thereafter, these points will then expire. In another embodiment, these flagged points will not necessarily expire if the user ultimately loses the auction; rather, the flagged points will expire at the end of the next calendar quarter.

12.0 Point Credit

In accordance with one embodiment of the present invention, a user may participate in an auction even though he lacks the points in his account. Because some users are very active customers or are otherwise considered a low credit risk, the Yahoo! Auction System may provide a "CREDIT APPROVED," "CREDIT WORTHY," or "CREDIT ENABLED" marker in the user's account. This marker indicates that the user of this account can purchase items or participate in auctions on credit points. The Yahoo! Auction System may also specify the credit line as well as a credit balance. So long as the user remains credit worthy, the lack of points in his account should not be an obstacle to making purchasing decisions. Of course, in order for the user to remain credit worthy, he would have to pay back the borrowed points at some time in the near future. Thus, for all the different embodiments described in this patent specification where the Yahoo! Auction System checks the bidders' respective accounts to determine whether sufficient points are available to support the bid, the Yahoo! Auction System checks for the "CREDIT ENABLED" marker, and if it exists, reserves the requisite number of points from the user's credit line.

In a preferred embodiment, the account that keeps track of credit line and credit balance is maintained in a separate third party server's database. In this embodiment, Yahoo! would prefer to not be involved in the day-to-day management of the users' accounts. Note also that the extension of credit can be provided by third-party credit companies (e.g., Visa), as well as by Yahoo! itself.

13.0 Yahoo!/Merchant Relationship

In accordance with one embodiment of the present invention, most of the sellers of merchandise in the Yahoo! Auction System will be corporate merchants as opposed to individuals. In order to participate, each merchant must pay a fixed percentage commission (e.g., 2% of revenue) for the ability to give away Yahoo! Points. However, Yahoo! will provide an incentive for these merchants to get back most, if not all, of the commission. When these issued Yahoo! Points are returned (i.e., redeemed) to the merchant, the merchant should report the return information to Yahoo. When the return information is received by Yahoo, Yahoo! will then remove the points from the user's account. Yahoo! will then pay back the commission on a prorated basis; that is, if all of the issued points are returned and the merchant reports this information, Yahoo! will pay back 100% of the commission, but if only 40% of the issued points are returned, Yahoo! will pay back only 40% of the commission. This buy/refund system enables merchants to buy points so that they can distribute them as they wish and still be refunded a portion or all of the cost to buy these points by reporting returns to Yahoo.

Similarly, advertisers will also be able buy points from Yahoo! so that they can use them on banner ads or simply award them to selected consumers. When users click on an ad, the click is linked back to the ad server which keeps track of the various points from various campaigns, whether Yahoo-related or not. After all, the advertiser may advertise on sites other than Yahoo's website and distribute points to consumers from other point programs. The ad server will then be able to provide a report to the advertiser who can then report the returns to Yahoo! for the refund. One scenario that falls under this class is when merchants purchase points from Yahoo! and private label them. These points are then issued as the merchant's own points in their own points program but Yahoo! will be able to track them during redemption for refund purposes.

In another embodiment, Yahoo! does not give the Merchants anything for the points. Thus, no Merchant account would be necessary. For the winning bidder, points used in the auction to win the merchandise are deleted from the user's account but these points are not necessarily transferred to the Merchant's account. These points are simply removed from circulation.

In another embodiment of the present invention, merchants can buy points from Yahoo! for a fixed purchase price. They can then distribute these points to any consumer in any way it pleases. The merchants could pay for their points by giving Yahoo! cash, traffic, advertising dollars, or any other form of compensation. For example, a merchant could buy 1,000 points and then inform the consumers that the first 100 users to visit the Yahoo! website will earn 10 points each.

In another embodiment, merchants can earn points by auctioning off their items through the Yahoo! Auction System. Then, these merchants can take the points that they earned from the sale of their auctioned item and use them in any manner they desire. For example, a merchant auctions off 100 pairs of jeans within the Yahoo! Auction System. Assume that the merchant gained 100,000 points from the auction (e.g., 100 winners at 1,000 points each). The merchant can then give away the 100,000 points in their website through some sort of sweepstakes or click-through ads.

In a further embodiment, Yahoo! may permit the creation of a secondary market for points. Thus, merchants can buy, sell, or trade points with each other. A merchant with a lot of points can sell them to another merchant for cash, who can then use these points for marketing purposes to attract traffic to their website. In addition to merchants, points can be traded, bought, and sold by individuals in various markets. Users could create "bots" that will buy, sell and trade points with each other or barter them for goods and services Users could also act in concert and create buying groups that would band together to use their points as a bloc. Financial markets in points, including puts, calls, and other option type transactions could occur, especially with points of varying life and collectibility.

Yahoo? could create a directory of point awarding sites and locations. This could be sorted by size, or by relevance to each user who sees it. Yahoo! could sell slots on this directory to merchants who want to attract attention from users. This directory could be delivered by email, served on the web, or delivered offline in a variety of media.

Clubs could form that automatically donate all their points to a common cause, thus creating a secondary beneficiary to all points activity. Affiliate programs could exist that would pay individuals a share of all the points awarded to a friend any time that individual refers a merchant to a friend. Alternatively, a user could receive a share of a referral's point total forever, not just from the first referral.

Private label programs in which other points programs are monitored and run by Yahoo!. For example, Nordstrom's could pay Yahoo! so that they could have their own points, controlled by them and run by Yahoo!. Exchange rate and arbitrage issues would naturally emerge. As Yahoo! runs different points programs, Yahoo! can serve as an intermediary, offering real time exchange between one program and another, based on supply and demand. Alternatively, Yahoo can enable any individual or organization to set up its own exchange system.

14.0 Integrated Points System

One embodiment of the present invention is an electronic points system that allows consumers to redeem online those points that were earned offline. The offline-online incentive points system (hereinafter "Integrated Points System") will now be described. To place it in context, the Integrated Points System will be described with respect to a particular soft drink bottle caps program. A soft drink company is sponsoring a promotions program where certain bottle caps are worth so many points. A consumer buys a soft drink bottle at a local store. The lucky consumer discovers that he is the beneficiary of a winning bottle cap, and in particular, a bottle cap that is worth N points. Instead of redeeming this winning bottle cap in the traditional way, the consumer logs onto the soft drink company's website and registers his bottle cap with the points. Thereafter, after registration, the consumer can redeem these points for any merchandise that is available for purchase with these points at any participating company's online store.

In one embodiment, all of the bottle caps are worth the same number of incentive points. In other embodiments, the bottle caps are worth different number of points; that is, some are worth 500 points while others are worth 1,000 points.

14.1 Network Architecture

The online aspect of the Integrated Points System will be described first. Generally, any consumer who obtains some incentive points offline can register and verify these points online so that he can redeem these points later for prizes. The system configuration of the server and the databases will be described first followed by a discussion of the operation of the system.

In accordance with one embodiment of the present invention, the Integrated Points System is implemented in an online networked environment. As shown in FIG. 1, a typical network environment includes some client computer stations 101, 102, and 103 that are usually operated by a human participant of the Integrated Points System. These client computer stations are connected to the wide area network (WAN) of the Internet 120 via Internet Service Providers, or ISPs (not shown in FIG. 1). Other client computer stations 104 and 105 are part of a local area network (LAN) 100. This network also contains a server computer station 106. Server computer stations 110, 111, and 112 provide various functionality over the web. Each server can be accessed by their identifying uniform resource locator (URL) address (i.e., "http://www.serveraddress.com"). The Integrated Points System is a computer program that resides in and is executed primarily in at least one of these server computer stations, such as server 112.

In one embodiment, the various screens use HTML. Other embodiments use XML (i.e., static objects from which various HTML pages could be generated dynamically) or some other format. The functionality of server 112 will be discussed in greater detail below.

Client computer stations 101-105 are usually operated out of private residences, small offices, or even large corporate offices. Representative client computer stations are personal computers with modems (or network connections, e.g., to a router and high-speed Internet connection), terminal stations, and network servers. The client computer station is complete with a computer, keyboard, mouse, monitor and appropriate modem/bus/network interface. As known to those ordinarily skilled in the art, a representative client computer station includes a CPU, a local bus, a host/PCI bridge, memory bus, main memory, and hard disk memory. Exemplary client computer stations include a Sun Microsystems SPARC or ULTRA-SPARC workstation, an Intel/Microsoft-based computing station (e.g., Gateway, Dell, Micron), and the Apple Macintosh. These client computer stations are capable of supporting various operating systems, including Solaris, Windows 98, Windows NT, and the Apple OS.

Applications that run on these client computer station include email (e.g., Microsoft Outlook Express, CCMail), web browsers (e.g., Netscape Navigator, Microsoft Internet Explorer), web servers, and community-based online services (e.g., AOL, CompuServe, Prodigy). Access to the Integrated Points System is made possible through a web browser for viewing web content in the form of HTML files. Through the web browser, cookies may also be used to store state information such as user name, ID, password, user preferences, settings, and the like, as known to those skilled in the art.

The email system can also be used to access the Integrated Points System for such tasks as communicating with technical support or submitting bottle cap number for registration. Purchases with incentive points can also be made via email.

The corporate network 100 is usually implemented as a local area network (LAN) for intra-building or intra-campus communication. Where the corporate network 100 extends to multiple buildings or multiple campuses in different geographic locations, the corporate network 100 can be implemented as a wide area network (WAN) for inter-building or inter-campus communication that extends the individual LANs via common telephone carrier lines. These WANs typically employ bridges or routers to enable the communication over the common carrier lines.

In one embodiment, the server 106 in the LAN network 100 may perform the functionality described in this patent specification. Thus, a company operating this network 100 can award points to its employees and allow them to participate in certain offline-online programs for various prizes.

Figure 12:
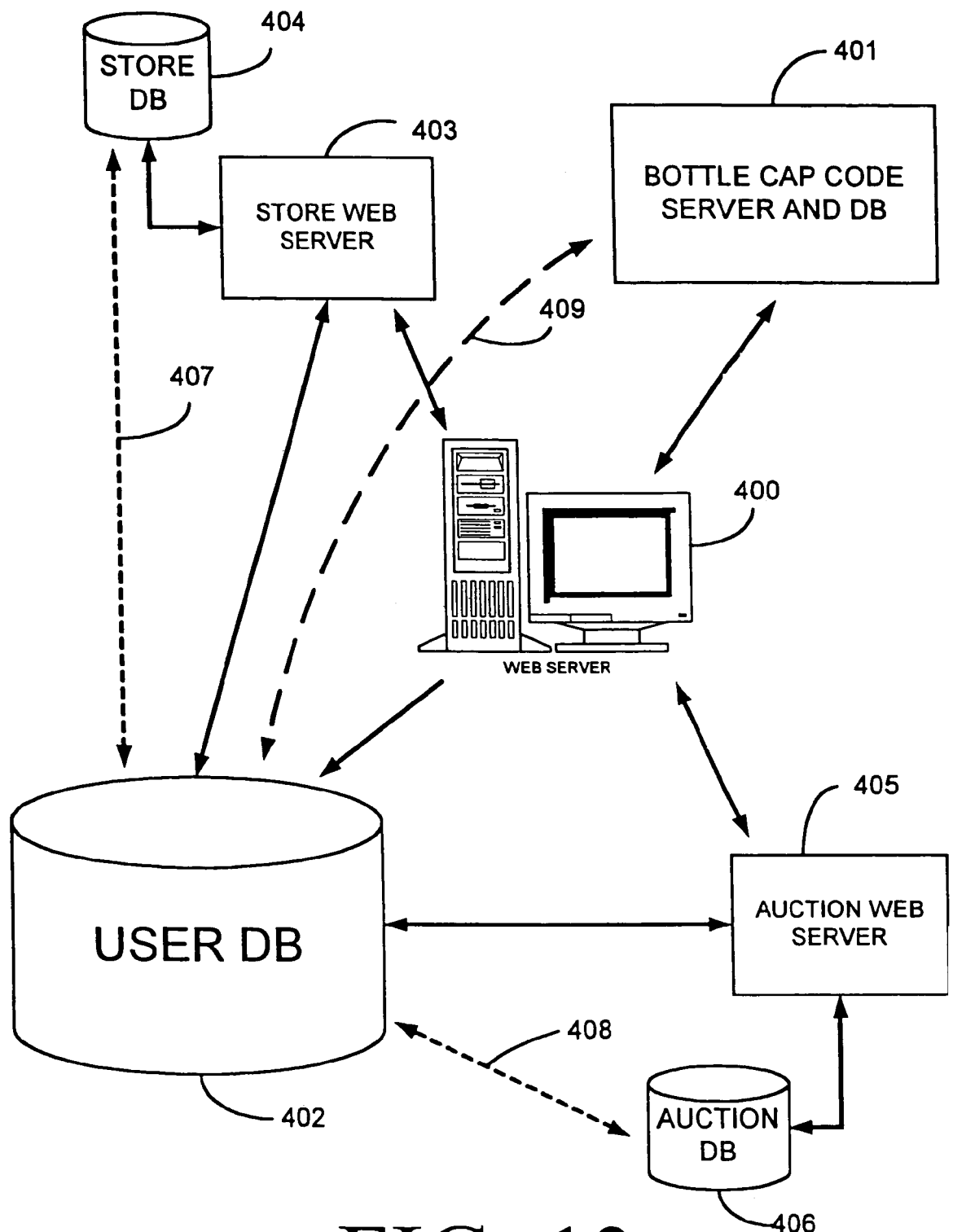
FIG. 12 shows the Integrated Points System in accordance with one embodiment of the present invention where all the components are widely distributed.

The Integrated Points System in accordance with one embodiment of the present invention will now be described. Referring to FIG. 12, web server 400 provides the user interface to the Integrated Points System. As discussed above, the consumer can access this web server by entering a URL that has been marketed to the public. Typically, if the offline product is the soft drink bottle cap, the bottle cap itself may indicate the URL. Also, the consumer can also access the home website of the manufacturer of the soft drink. The web server supporting the manufacturer's home website also includes functionality to allow consumers to register/verify their respective points.

The web server 400 includes the appropriate user interface screen and functionality to securely allow only registered users to enter the site, access their respective account information, register to set up an account if an account has not already been set up, and/or verify a particular bottle cap code so that his account is updated with the offline-earned points.

The web server 400 is coupled to a bottle cap code server/production database 401 and user database 402. The web server 400 contains the necessary functionality to allow any consumer to register, which involves setting up an account with an ID (user name) and password. Once the account is set up, it is placed in the user database 402. The security features (user ID and password) that allow only registered users to view account information are implemented in the web server 400.

At some point after registration, the user may want to make sure that his account is updated with his recently earned bottle cap points. This is called verification. For example, if the bottle cap says that the lucky user just earned 100 points, these 100 points must make their way somehow into his online account. The bottle cap is associated with a particular 10-digit code. When verifying a particular bottle cap, the user enters this 10-digit code and the bottle cap code server 401 verifies the validity of this 10-digit code. If the 10-digit code is valid, the user's account is updated with the points associated with this 10-digit code. If the 10-digit code is not valid, the user is asked to reenter the number. For repeated failed attempts to enter the 10-digit code, the web server 400 generates some alarm indication to prevent this user from entering the 10-digit code again or otherwise making an attempt to access the account.

From the website associated with the Integrated Points System web server 400, users can access any participating web store's website via the web store's web server 403. The web store 403 is associated with a store database 404 which includes coupons, hard goods (e.g., iron, toaster, computer, printer), soft goods (e.g., downloadable music, downloadable software), and other inventory. The store database may also include account information of individual users who may or may not have set up an account with the Integrated Points System web server 400 and user database 402. The store web server 403 is also coupled to the user database 402. In another embodiment, the store database 404 is coupled to the user database 402 via line 407.

Similarly, from the website associated with the Integrated Points System web server 400, users can access any participating auction website via that auction's web server 405. The auction website 405 is associated with an auction database database 406 which includes bidders, sellers, auction items, and outstanding bids. The auction database may also include account information of individual users who may or may not have set up an account with the Integrated Points System web server 400 and user database 402. The auction web server 405 is also coupled to the user database 402. In another embodiment, the auction database 404 is coupled to the user database 402 via line 408.

In one embodiment, the store web server 403, the auction web server 405, and web server 400 are all located in different locations. However, the store database 404 is co-located with the store web server 403, the auction database 406 is co-located with the auction server 405, and the user database 402 is co-located with the Integrated Points System web server 400. The bottle cap code server and production database 401 is co-located with the web server 400.

In one embodiment, as mentioned above, the users can access the various participating web stores, such as via web store server 403, and participating auction sites, such as auction server 405, from the Integrated Points System web server 400. In addition, users can access the Integrated Points System web server 400 from the participating web stores and auction sites.

Figure 13:
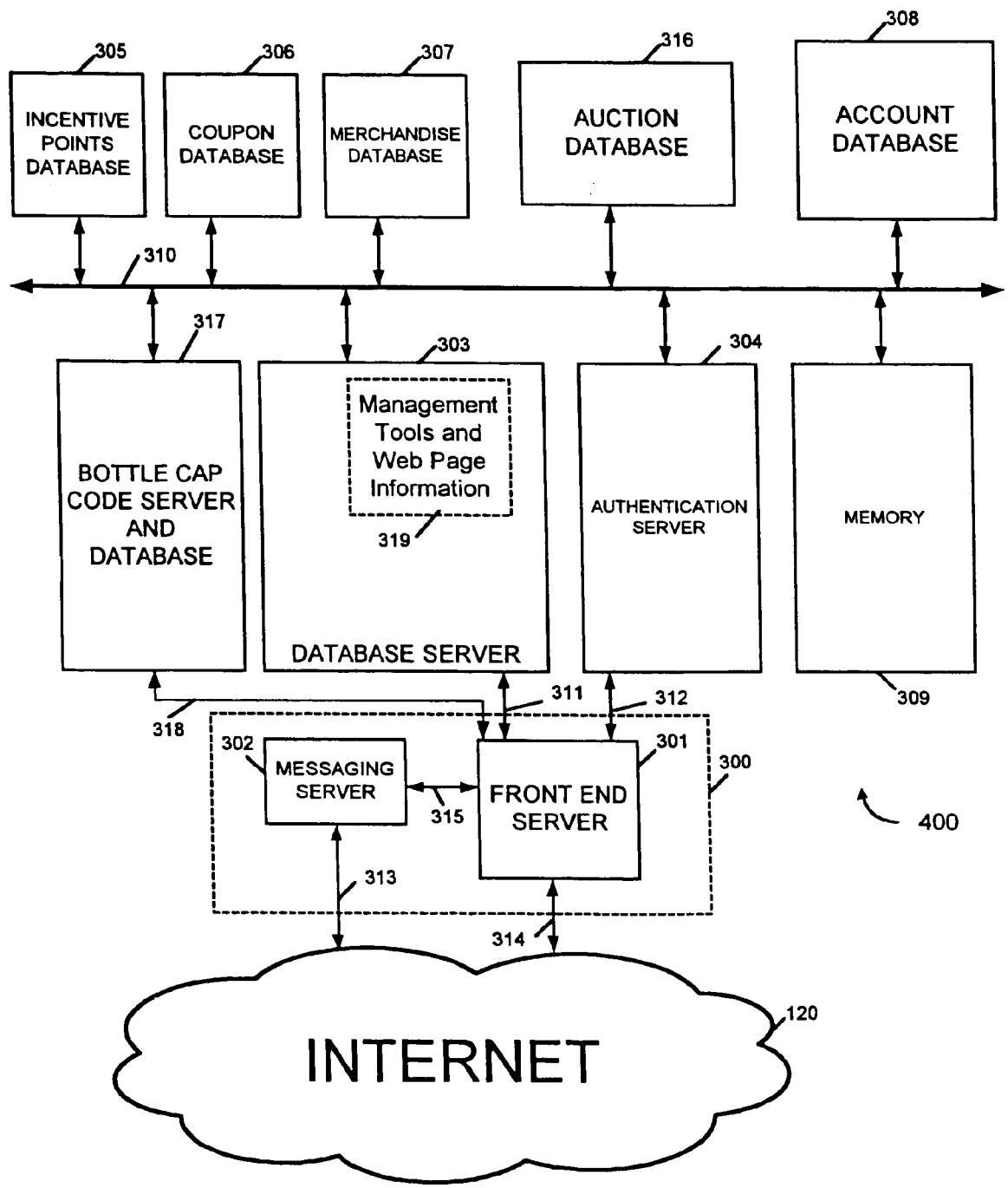
FIG. 13 shows a detailed view of the web server of the Integrated Points System where all the components are centrally located.

In another embodiment, the various servers and databases are all co-located together as shown in FIG. 13. In this embodiment, the server 400 is associated with the Integrated Points System. At the core of the server 400 is a front end server 301 which interfaces with a database server 303, a messaging server 302, an authentication server 304, a bottle cap code server 317, and the Internet 120. The front end server 301 is further coupled to communications lines 314 (e.g., via a modem or network router connected to server 400) and the Internet 120.

In one embodiment, the front end server 301 performs many tasks related to the management of the accounts, merchandises, coupons, incentive points, and auction bids. From executing code for any number of different applications, managing resources, handling web requests, managing files and records, creating files and records, deleting files and records, delegating tasks, and handling exceptions, the front end server 301 provides the main processing for the server 400. Of course, this functionality, in other embodiments, could be distributed across multiple hardware servers.

The front end server 301 also works with a messaging server 302 via line 315 (e.g., the system bus or a network connection to another hardware server) and a database server 303 via line 311. The messaging server 302 works with the front end server 301 via line 315 and is also connected to the Internet via communication lines 313. The messaging server 302 provides various messaging functionality in various communications media such as telephone, email, instant messaging, active desktop application, and web browser notices. For example, email notices such as product news, discount updates, and customer service access are provided via communications line 313. News of upcoming sales offers that may interest the potential customer are delivered frequently. Also, any questions that a user may have may be directed to customer service through the messaging server 302, which will direct the email to the appropriate personnel within the customer service department. As noted above, various forms of instant messaging as are well known in the art could replace some or all of the functionality of messaging server 302.

Note that communications lines 313 and 314 are standard interfaces to the Internet (e.g., an Ethernet or other network interface to a router and CSU/DSU, modem, etc.) or across machines which are typically Ethernet-connected at the "back end" of the network.

In another embodiment, the front end server 301 and messaging server 302 are integrated in an Internet server 300. The interface to the Internet 120 is provided by primary communications line 314 (line 313 is not implemented). Thus, all web traffic passes through this Internet server 300 via communications line 314. The messaging server 302 communicates with the front end server 301 and the back end of the system (e.g., database server 303).

The database server 303 performs many tasks related to the creation, deletion, and management of various files and records managed by the server 400. The database server 303 supports the front end server 301 in accomplishing its tasks of running the redemption portion of the Integrated Points System. The database server 303 includes a management tools and web page information unit 319. The management tools and web page information unit 319 provides exactly that— tools for the web page administrator to update, modify, and troubleshoot his web site. The web page information is also provided therein so that the front end server 301 accesses the web page information from this unit 319. Thus, when a user logs into the web page associated with server 400, the look and feel of this web page is stored in the unit 319. However, the web server does not access the unit 319 for each access of this web page; rather, the front end server 301 accesses the web information in the unit 319 only periodically to update its contents.

The bottle cap code server 317 is coupled to the front end server 301 via line 318. The bottle cap code server 317 verifies that a submitted bottle cap code by a registered user is valid.

If a valid code is submitted, the bottle cap code server 317 returns an acknowledgment to the front end server 301. If an invalid bottle cap code is submitted, the bottle cap code server 317 returns an error to the front end server 301.

The database server 303 serves a database of content, functionality, and user accounts. For example, database server 303 can serve an incentive points database 305, a coupon database 306, a merchandise database 307, an auction database 316, and an account database 308. These databases are coupled to a communications line 310 and to the database server 303.

These databases on communications line 310 comprise the "back end" of the system. Note that the common bus-like illustration of the communications line 310 is merely conceptual. The databases may not actually be on a common bus. These databases may be widely dispersed geographically or integrated into one database. Also, some of the databases may be on a common bus while others may be located remotely and accessed via the Internet.

The incentive points database 305 contains various incentive points banner ads and programs. Additionally, the prerequisites for earning these incentive points are also stored therein. Similarly, the coupon database 306 contains various coupon information that is either disseminated via the messaging server 302 or awarded to certain users when certain requirements are satisfied. Also, the merchandise database 307 contains various merchandise information that can be purchased by users or awarded based on satisfying certain requirements. These databases 305-307 can also contain links to specific web pages associated with the incentive point, coupon, or merchandise so that the user can be properly redirected to that website. In another embodiment, these databases do not contain ads, programs, coupons or information; rather, these databases contain only links where the user can be properly redirected for more detailed information. The website associated with the link has the programs and coupons that are awarded to users. If necessary, these websites communicate with the account database 308 to keep credits, debits, and points information.

The account database 308 is analogous to the user database 402 in FIG. 12 and contains information about each user's account. Normally, only a user with an account (i.e., member) gets the benefit of this Integrated Points System with points, coupons, and merchandise. The account information includes account balance (points or otherwise), expiration date for each point or group of points, redemption information, credit card information, billing information, billing address, and whether the account is authorized for using points for credit. Although this embodiment illustrated in FIG. 12 shows the account database 308 integrated with the rest of the server 400, another embodiment may have the account database located in a third party's server and maintained by the third party.

These databases contain appropriate linking fields so that an entry in one database can be associated with a related entry in another database. For example, when a user earns incentive points from the incentive points database 305, that user's account in the account database 308 is appropriately updated.

In another embodiment, the incentive points database 305, the coupon database 306, and the merchandise database 307 are integrated into one database. The auction database 316 and the account database 308, however, are kept separate. In still another embodiment, these databases are distributed across one or more machines. These machines are coupled via communications line 310 to the database server 303. These databases comprise the "back end" of the system which the Internet server 300 access.

The authentication server 304 provides security functionality so that only those users with a proper account can access the features provided by the server 400. Typically, a user ID and password would be needed to access the account or even submit a bottle cap code for verification.

The memory 309 provides support for the database server 303 and the authentication server 304 so that these servers can serve all the user requests coming in. For example, hundreds if not thousands of users may be accessing this server 400 to register, access accounts, verify points, redeem points, shop, and/or participate in ongoing auctions. These requests are temporarily stored in the memory 309 until they are served by the database server 303, the authentication server 304, or both.

14.2 Network Operation

14.2.1 System Overview

The operation of the Integrated Points System will now be discussed. Continuing with FIG. 12, users may access the Integrated Points System either directly or indirectly. Direct access involves the user entering the URL associated with web server 400 via his web browser. Indirect access involves the user navigating to some other site which provides a link to the web server 400. In the latter case, the user may initially access the web pages associated with a particular store's web server 403, a particular auction web page associated with auction web server 405, some some search engine or web portal. These web pages provide a link to the URL associated with web server 400 and the user clicks on it.

The Integrated Points System web page may be provided by a web server that is independent of the soft drink company (e.g., XYZ Corporation). Alternatively, the Integrated Points System web page may be integrated with XYZ Corporation's website. Once the user has accessed the Integrated Points System web page, the user is asked to enter a user ID and password. Alternatively, cookies may be used to store these state information so that the user need not remember the ID and password. After successfully entering the user ID and password, the user has several options as described below.

Figure 14A:
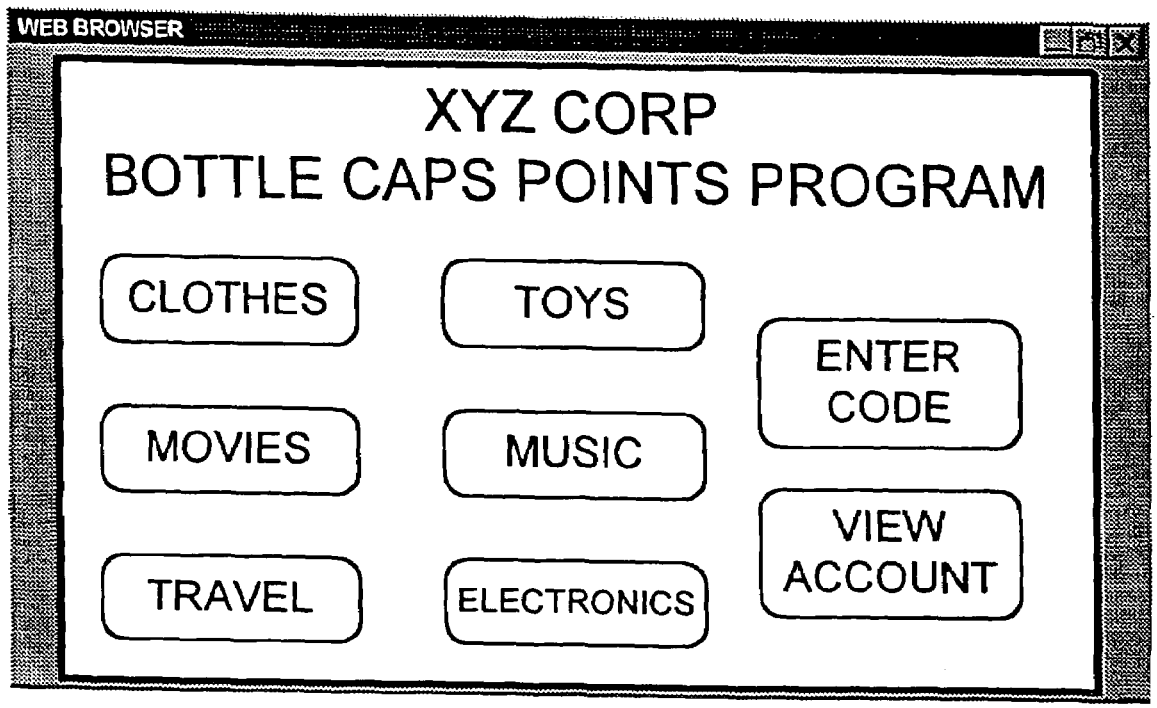
FIGS. 14(A) to 14(E) show screenshots of the various pages that are presented to the user when the user accesses the Integrated Points System's server in accordance with one embodiment of the present invention.

Referring now to FIG. 14(A), the main web page of the XYZ Corporation's bottle cap points program is displayed. Because the user has already been successfully authenticated, he is free to shop, view his account, or enter the bottle cap code for verification. In this example, this web page provides him with links to other web pages for shopping opportunities such as clothes, toys, movies, music, travel, and consumer electronics. Clicking on any of the shopping buttons such as clothes, for example, would lead to a web page of links to those participating companies that sell clothes on the web. In a second embodiment, clicking on clothes, for example, would lead to a web page of various categories of clothes and links to participating web stores that sell clothes in each of those categories.

A third embodiment will now be discussed. Assume that the user clicked on "ELECTRONICS" on the web page shown in FIG. 14(A). In one embodiment, the next web page that the user sees is shown in FIG. 14(D). Here, the web page indicates how many points the user has in his account. Also, a collection of consumer electronics items (e.g., items 1-8) that the user is able to purchase with his accumulated points are displayed. Because the user has only 3,000 points, only eight items are availabe for purchase. These eight items may range from a low end DVD player to a number of DVD movies. The user can purchase any of these available items with all or any portion of his accumulated points by clicking on the their respective links. On the other hand, the user can enter another bottle cap code, view his account, or shop for other types of merchandise.

A fourth embodiment will now be discussed. Instead of the shopping categories (e.g., clothes, toys, music) shown in FIG. 14(A), the user sees the web page shown in FIG. 14(E). Here, the user sees a table of store goods (both hard and soft) and their corresponding purchase price (points), current auction high bid (if it is available as an auction item), and any available coupons. So, in this example, the user has 3,000 points in his account. The web page lists in tabular form those items that the user can afford to purchase (or bid). Item 1 is available for 500 points. If the user clicks on the coupon, the user can get 50 points off the purchase price of this item. This item 1, however, is not available as an auction item. Item 3, however, is available as an auction item with the current high bid at 960 points. If the user decides the purchase item 3 instead, he needs 1,200 points. A 100-point coupon is availabe for this item 3. Finally, item 4 is available for purchase for 2,800 points but it is not available as an auction item nor is a coupon available. Like the other web pages, the user can also view his account, enter a bottle cap code for verification, and shop (e.g., web page of FIG. 14(A)).

Figure 14B:
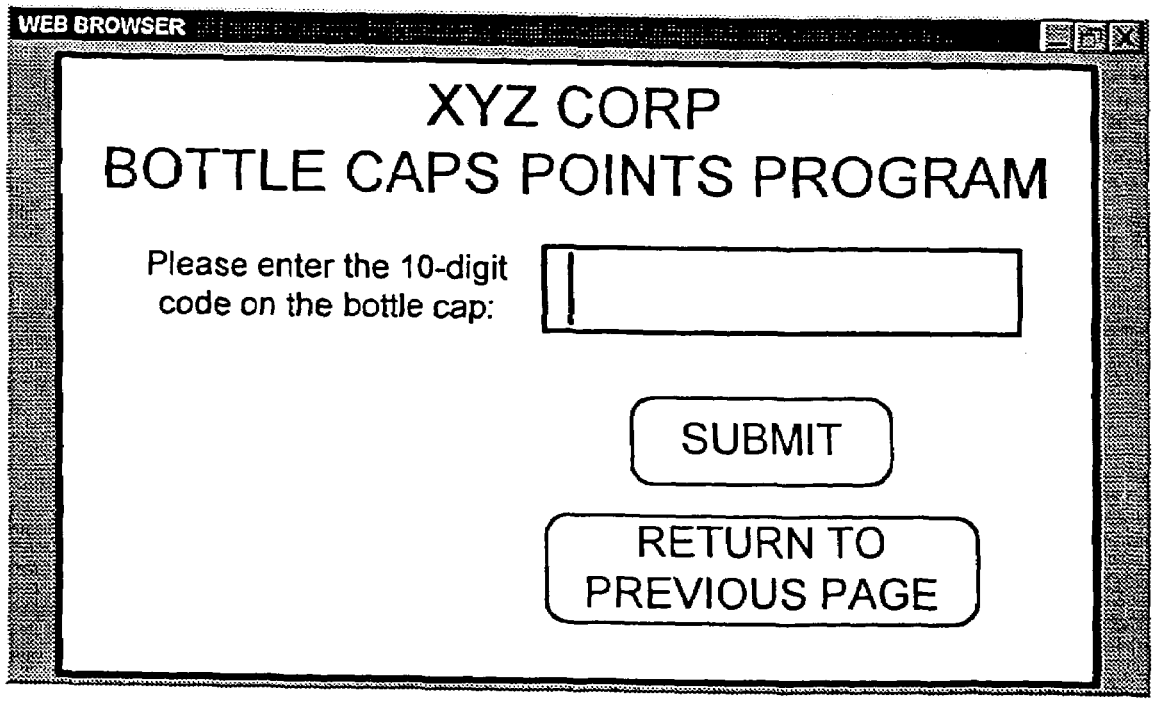

Returning to FIG. 14(A), if the user clicked on "ENTER CODE," the user would see the web page illustrated on FIG. 14(B). Here, the user is asked to enter the 10-digit code that is provided on the bottle cap. If the user enters an incorrect bottle cap code number (either through fraud or mistake), he is notified of the error and asked to try again. This process continues until the correct code is entered or some specified threshold limit has been reached. If the user reaches this threshold limit, the user's account is locked indefinitely until security issues have been resolved. In one embodiment, the threshold limit is 10 invalid attempts within a 30-minute span.

If the user enters a correct bottle cap code on the web page shown in FIG. 14(B), his account is credited with those number of points associated with this valid bottle cap code. So, if his particular bottle cap is worth 100 points and his account balance is 4,000 points, entering the bottle cap code associated with this bottle cap would result in his account balance being updated to 4,100 points.

Figure 14C:
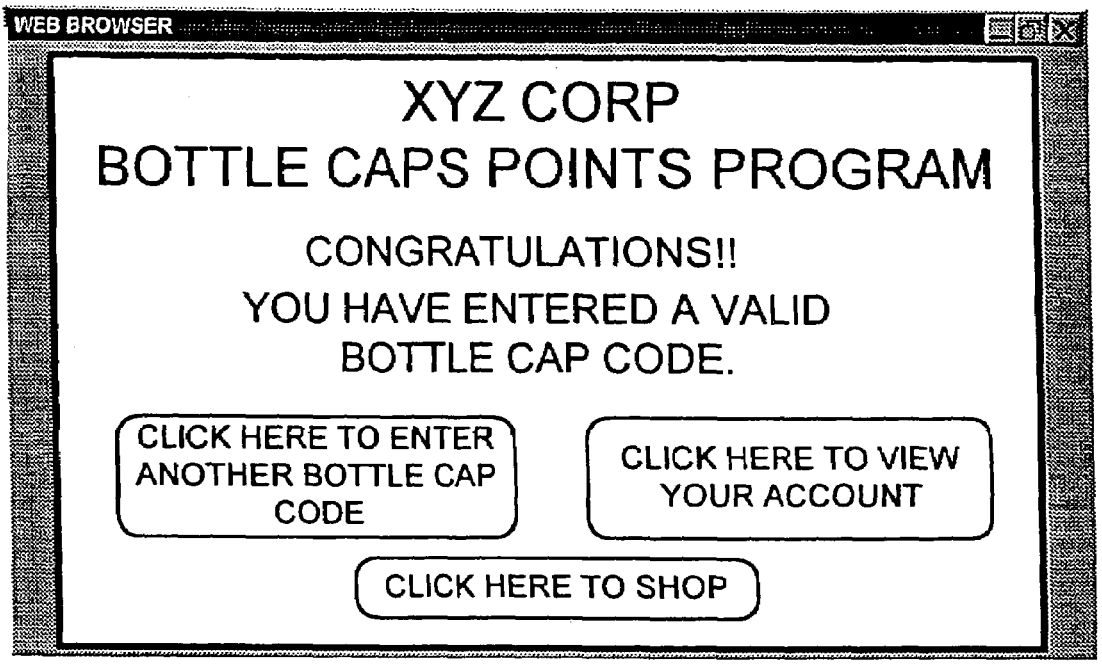
Figure 14D:
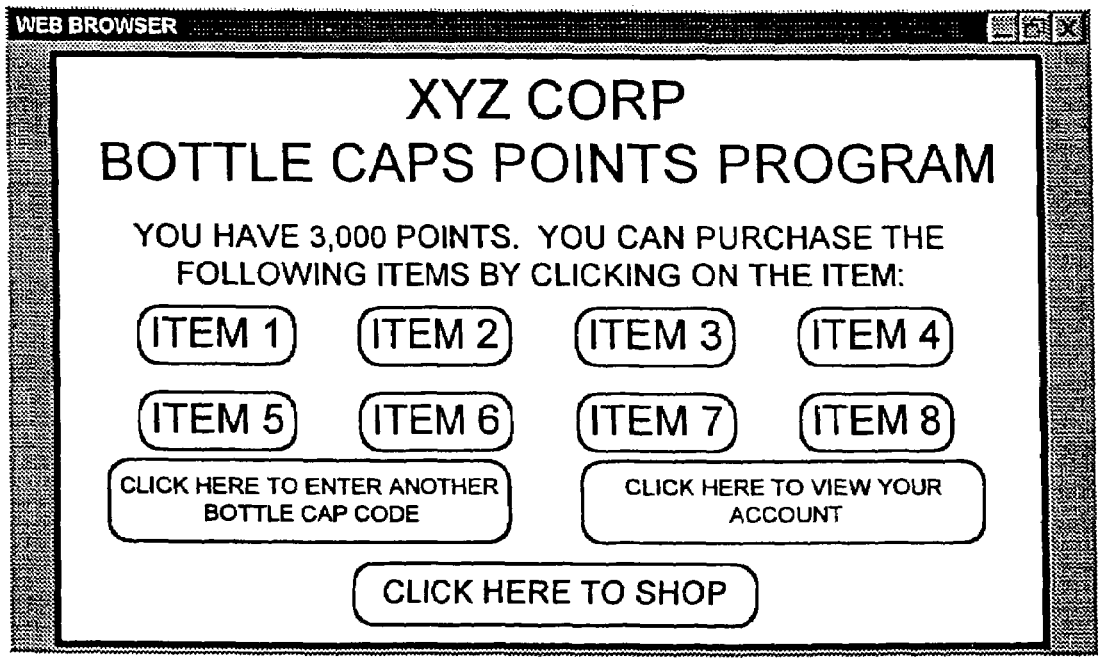
Figure 14E:
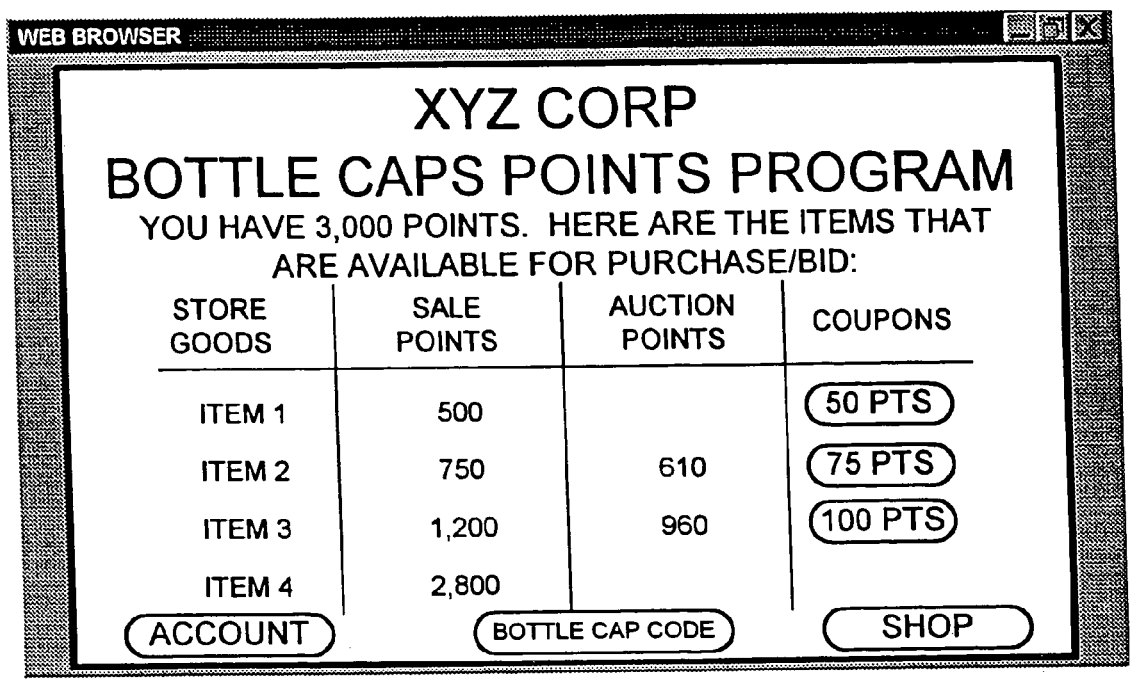

The next web page that the user sees is that shown in FIG. 14(C). Here, the web page indicates that the user has entered a valid bottle cap code. In addition, this web page allows the user to enter another bottle cap code, view his account, or shop for merchandise with points or credit card. If the user clicks on the "CLICK HERE TO ENTER ANOTHER BOTTLE CAP CODE," then the web page looks similar to that shown on FIG. 14(B). If the user clicks on "CLICK HERE TO SHOP," then the web page looks similar to that shown on FIG. 14(A).

Shopping can be finalized as follows for two cases—(1) central shopping site, and (2) web store specific shopping site. In both cases, items of interest are selected and placed in a virtual shopping cart. Thereafter, the procedure diverges.

In the first case where the user shops for goods of multiple web stores at a central shopping site, the user selects goods and coupons. Any selected coupons are applied to the purchase price of the goods in the user's shopping cart. Once at the checkout line, the user provides delivery information. For soft goods and some coupons (if the coupon is to be delivered and earned after the current purchase, such as "EARN 50 POINTS ON YOUR NEXT DVD PURCHASE"), the user provides his email address. For hard goods, the user provides a physical shipping address (i.e., street, city, state).

For soft goods, the user is provided a confirmation code or special code (e.g., 12-digit code) to securely access a file server so that he can download his purchased soft good. He is then directed to that file server. If he elects to download his soft good at a later time, he can use the special code for accessing that file server. The server also sends him the special code via email as return confirmation and as backup in case the user loses the special code for some reason. For coupons, the value, limitations, and expiration date of that coupon is updated into the user's account. For hard goods, the purchased good along with the shipping address is provided to a shipping clearinghouse which is responsible for delivering the hard good to the user in a timely fashion.

In the second case where the user purchased goods from a particular web store, rather than a central shopping store, email confirmation is also used. For soft goods, the server sends an email to the user that has the URL address to a file server or the website of a particular manufacturer of the purchased soft good. In addition, the email contains a special unique code (e.g., 12-digit code). After the user accesses that file server or website, the user is asked to enter the special unique code. If the code is valid, the user is now able to download the soft good that he purchased. Similarly, the user is given a special unique code that represents a coupon, which is usually associated with some expiration date. When the user later decides to redeem his coupon, he can access the web store's site, select an item for purchase, and enter the coupon code so that the shopping server can apply the coupon's value to the purchase price of the item(s) in his shopping cart.

In both FIGS. 14(A) and 14(C), the user is given the option to view his account. In FIG. 14(A), the web page provides a "VIEW ACCOUNT" button, while in FIG. 14(C), the web page provides a "CLICK HERE TO VIEW YOUR ACCOUNT" button. By clicking on either button, the next web page shows details of the user's account. The account shows the user's name, number of incentive points earned, number of incentive points spent (if any) within any specified time period, the last N (e.g., N=5) transactions regardless of whether points or cash was used, the last N transactions where points were used, dates of the last N bottle caps submitted and verified, items purchased, delivery information, dates of purchase, and any outstanding coupons.

Alternatively, if the user enters a valid bottle cap code in the web page of FIG. 14(B), the next web page may be that shown in FIG. 14(A) with some additional indication that the user had entered a valid bottle cap code. At this point, the user can shop by clicking on any of the shopping-related buttons, view his account, or enter another bottle cap code (if any). Regardless of how the web page looks, the basic functional design of any web page within the Integrated Points System is such that the user is able to shop, view his account, or enter a bottle cap code whenever he wants to with the click of a button.

14.2.2 Encryption

The encryption process involves the generation of billions and billions of unique codes, where a single code will be printed on the bottle caps and later verified online through the Integrated Points System. In addition, encryption is involved so that the creation of these codes will not necessarily result in the need for a lot of disk space.

In one embodiment, approximately 2 billion codes will be selected such that the chance of guessing the codes is very very low. The alphabet for the codes includes thirty-six alphanumeric letters—A to Z and 0 to 9. To eliminate those letters that may look ambiguous (e.g., 5 and S; O and 0), the number of letters in the alphabet can be reduced. Based on the number of letters in the alphabet, a special fixed-length code that will be printed on the bottle caps can be generated. The following table shows the number of possible combinations for a given number of letters (L) in the alphabet and the number of letters (C) in the special code string:

| L | C | $L^c$ | Odds: $L^c$/2 billion |
|---|---|---|---|
| 36 | 10 | 3,656 trillion | 1 in 1,828,079 |
| 35 | 10 | 2,758 trillion | 1 in 1,379,273 |
| 34 | 10 | 2,064 trillion | 1 in 1,032,188 |
| 33 | 10 | 1,531 trillion | 1 in 765,789 |
| 32 | 10 | 1,125 trillion | 1 in 562,949 |
| 31 | 10 | 819 trillion | 1 in 409,814 |
| 30 | 10 | 590 trillion | 1 in 295,245 |
| 29 | 10 | 420 trillion | 1 in 210,353 |
| 28 | 10 | 296 trillion | 1 in 148,098 |
| 27 | 10 | 205 trillion | 1 in 102,945 |
| 36 | 9 | 101 trillion | 1 in 50,779 |
| 35 | 9 | 78 trillion | 1 in 39,407 |
| 34 | 9 | 60 trillion | 1 in 30,358 |
| 33 | 9 | 46 trillion | 1 in 23,205 |
| 32 | 9 | 35 trillion | 1 in 17,592 |
| 31 | 9 | 26 trillion | 1 in 13,219 |
| 30 | 9 | 19 trillion | 1 in 9,841 |
| 29 | 9 | 14 trillion | 1 in 7,253 |
| 28 | 9 | 10 trillion | 1 in 5,289 |
| 27 | 9 | 7 trillion | 1 in 3,812 |

As explained above, "L" represents the number of letters in the alphabet. In this table, a 27-36 letter alphabet is shown. "C" represents the number of letters in the special code that will be printed on the bottle caps. In this table, the code can be either a 10- or 9-digit code. "$L^c$" represents the number of possible combinations for a given letter (L) and code length (C) combination.

"$L^c$/2 billion" represents the odds of a user guessing a code at random and having it match one of the 2 billion legitimate codes. "$L^c/V$" represents the general case where V is the desired number of valid legitimate codes. Thus, out of the 420 trillion possible combinations for a 10-digit code from a 29-letter alphabet, the distance between codes is roughly 210,353 codes.

In one embodiment, the alphabet comprises 29 letters due to the elimination of some similar-looking letters—for example, the number 0 and letters O and D, the number 8 and letter B, the number 5 and letter S, the number 2 and letter Z, and the number 1 and letter I, letters V and U. Of these, the letters D, V, Z, S, I, and B were retained, while the others were eliminated. Thus, the 29-letter used to generate the 10-digit code will include the following letters:

ABCDEFGHIJKLMNPQRSTVWXYZ34679

Figure 15:
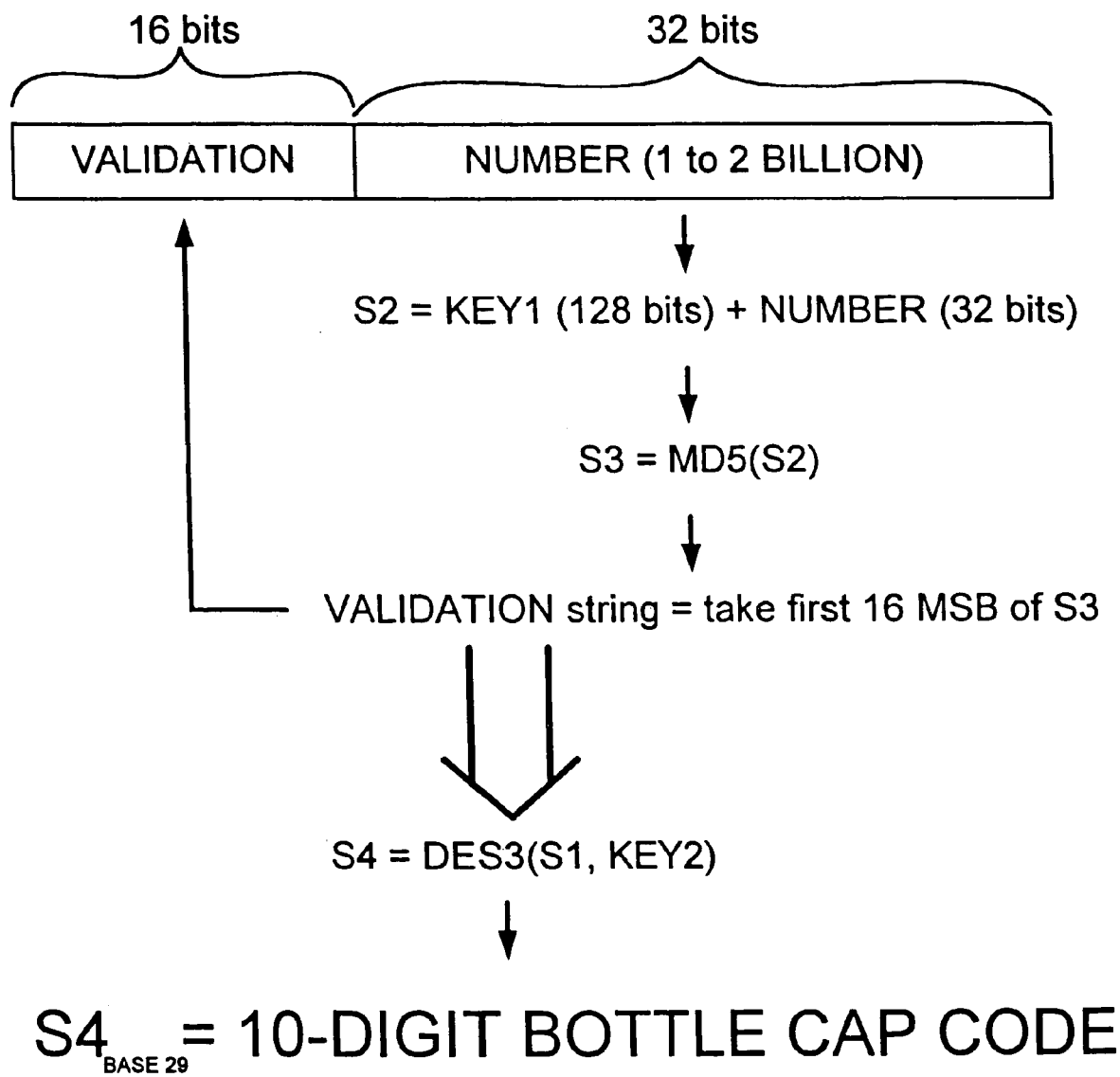
FIG. 15 shows a flow diagram of the encryption process in accordance with one embodiment of the present invention.

Referring now to FIG. 15, the encryption process will now be described. The ultimate goal of the encryption process is to generate a 10-digit code that will be printed on the bottle caps. Initially, a 48-bit string S1 will be created. This 48-bit string includes a 32-bit integer number portion and a 16-bit validation portion. The 32-bit integer number portion is merely the numbers from 1 to 2 billion, since approximately 2 billion unique codes will be generated. The 16-bit validation portion is generated from the 32-bit integer number portion.

To generate the validation portion, an internally known 128-bit secret key KEY1 is first selected. A second string S2 includes the combination of KEY1 and the integer number. Using this KEY1, a well-known hash algorithm, such as MD5, is applied to string S2 to generate string S3. As known to those ordinarily skilled in the art, MD5 is a one-way hash function to generate an output string. A one-way hash takes an input string S1 and transforms it into an output string S2. It is designed so that "decryption" is not possible. In other words, it is not possible to take S2, and generate S1 from it. In the current scheme, the key K1 is appended (or prepended) to the input string—S1+K1=S1'.S1' is then run through the one way hash to generate S2.

In this scheme, knowing the output string will not yield the input. This string S3 is a 128-bit string. Given this 128-bit string S3, the 16 most significant bits can be used as the 16-bit validation portion of the 48-bit string S1. Of course, any 16-bit portion of this 128-bit string S3 can be used without much difficulty. In the present embodiment, the first 16 bits are used.

Given the 48-bit string S1 and a second internally known 128-bit secret key KEY2, the well-known DES3 encryption algorithm is applied to the string S1. This creates a 48-bit encrypted string S4. By converting this 48-bit encrypted string S4 to base 29 (for the 29 letters in the current alphabet), the 10-digit bottle cap code is generated. If the conversion results in a base 29 number that has less than 10 digits, then the system will prepend as many letter "A" as possible to generate the 10-digit code. This 10-digit code is printed on the bottle cap.

In this embodiment, a user cannot generate a new code without three pieces of information: (1) algorithm, (2) secret key KEY1 for the one-way hash, and (3) secret key KEY2 for the DES3 encryption. Even if a user discovered the algorithm, this embodiment uses a 128-bit secret key for DES3 and a 128-bit secret key for the one-way hash. Guessing 256 bits for the secret keys is almost impossible since there are $2^{256}$ possible key values.

In another embodiment of the present invention, the special codes are generated in a random manner. A list of approximately 2 billion codes can be generated from the number space. One form of a pseudo-random number generating algorithm uses a seed number and then generates a sequence of numbers following that seed number. If the same seed number is used, then the same sequence of numbers will be produced.

Another, and better, form of random number generating algorithm incorporates some truly random data to further mix up the seed number. This random data is usually from the user's computing environment, such as hard disk seek times and time between key strokes. Such an algorithm produces a very good set of random numbers that is most likely unreproducible even if the same seed number is used. In addition, some measures are taken to ensure that the same codes are not generated and that the generated codes are well-spaced across the number space. These codes are then entered into a production database (similar to the bottle cap code database).

14.2.3 Verification

Figure 16:
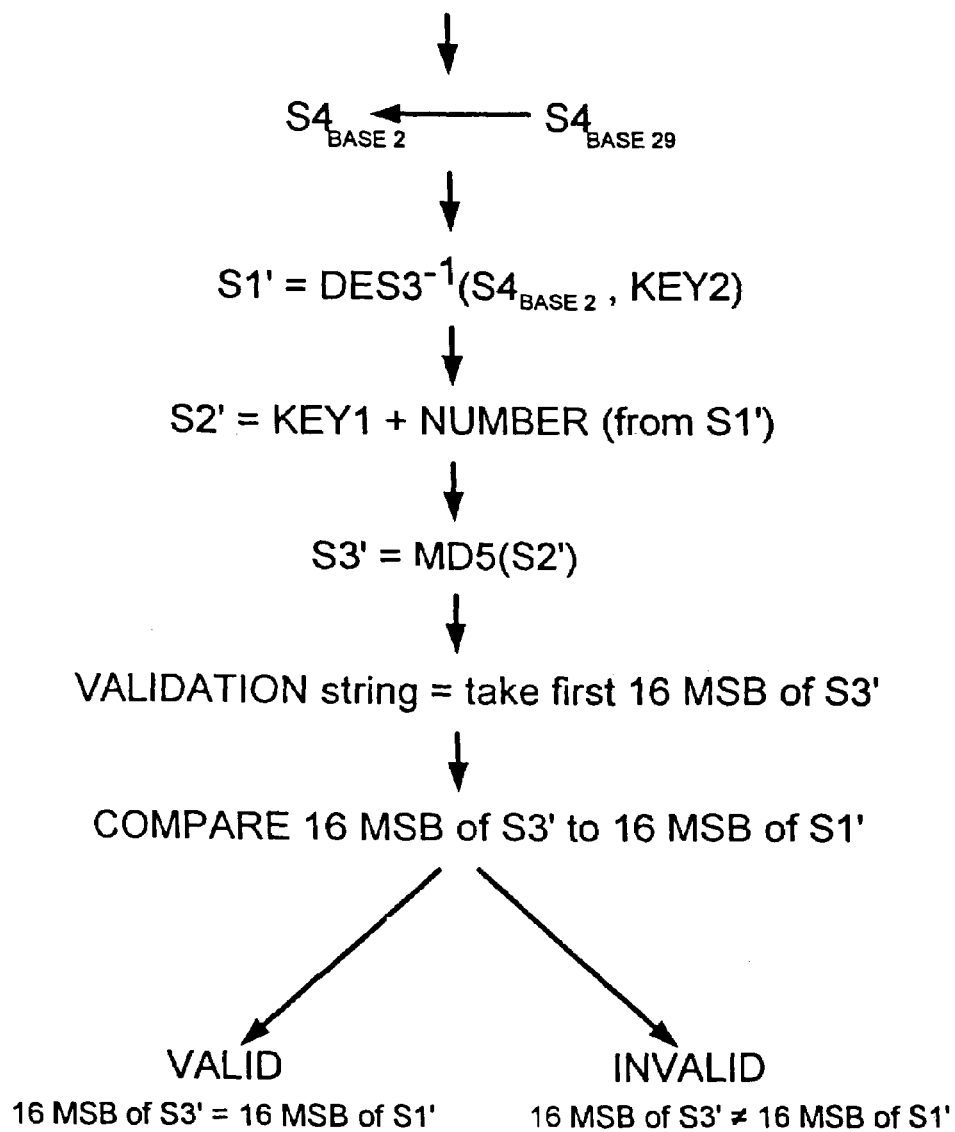
FIG. 16 shows a flow diagram of the verification process in accordance with one embodiment of the present invention.

Having generated and printed the special codes on the bottle caps, the Integrated Points System must verify that the bottle cap code that the user submitted online is indeed a valid bottle cap code. Referring now to FIG. 16, the user submits the 10-digit bottle cap code $S4_{BASE29}$. Any prepended "A's" can be removed or otherwise ignored. This code is, of course, in base 29 and should be converted to base 2 form to generate $S4_{BASE2}$.

This string $S4_{BASE2}$ is decrypted using DES3 and the secret key KEY2, which is of course known to the Integrated Points System. This decryption operation results in the string S1'. This string S1' includes a validation portion (first 16 bits) and an integer number portion (last 32 bits) that may or may not correspond to those of the valid string S1 (see FIG. 15).

Using the secret key KEY1 and the number portion from the string S1', a second string S2' is created. The well-known MD5 algorithm is applied to S2' to generate the string S3'. The first 16 bits of this string S3' are now compared to the first 16 bits (the validation portion) of the string S1" calculated above. If these 16 bits match, then the code that the user submitted is a valid code. Thereafter, this code is checked off in the code database so that others cannot use this same valid code again.

However, if these 16 bits do not match, then the code that the user submitted is an invalid code.

In another embodiment, truly random codes are used. In this case, the encryption portion of the Integrated Points System implements an algorithm that incorporates some truly random data to further mix up the seed number. As mentioned above, this random data is usually from the user's computing environment, such as hard disk seek times and time between key strokes. Such an algorithm produces a very good' set of random numbers that is most likely unreproducible even if the same seed number is used. These codes are then entered into a production database (similar to the bottle cap code database). When the points program is publicly launched and users submit codes, these codes will be checked against the database to ensure that any valid codes that were submitted cannot be submitted again in the future.

14.2.4 Database Management

Returning to FIG. 12, the user database 402 contains information about each user's account. Normally, only a user with an account (i.e., member) gets the benefit of this Integrated Points System with points, coupons, and merchandise. The account information includes account balance (points or otherwise), expiration date for each point or group of points, redemption information, credit card information, billing information, billing address, and whether the account is authorized for using points for credit. The user's account is updated as points are earned or spent.

In one embodiment, the user database is updated by the bottle cap code server 401 directly as shown by dotted line 409. Thus, as codes are verified when users submit them, these valid codes must be checked off in the bottle cap code production database 401 so that these same codes cannot be used again. The nefarious user may attempt to submit the same valid code multiple times in hopes of earning more and more points. To curb this behavior (or otherwise prevent this behavior from affecting the account points balance), the bottle cap code server 401 flags those codes that have been verified and thereafter, these codes will no longer be available for further use. In other words, if the user submits a previously verified code, the bottle cap server will send an error message to the web server, which will in turn deliver an error message to the user at his web browser that the code that he submitted cannot be used. In addition, the bottle cap server will not update the user's account in the user database with the points associated with this previously verified code.

In another embodiment, the web server 400 updates the user database 402. As codes are verified by the bottle cap server 401, the bottle cap server 401 checks off the codes and also alerts the web server 400 to update the user's account. The web server 400 updates the user's account in the user database 402 to reflect the recent transaction (e.g., points earned from verification of proper bottle cap code).

Figure 17:
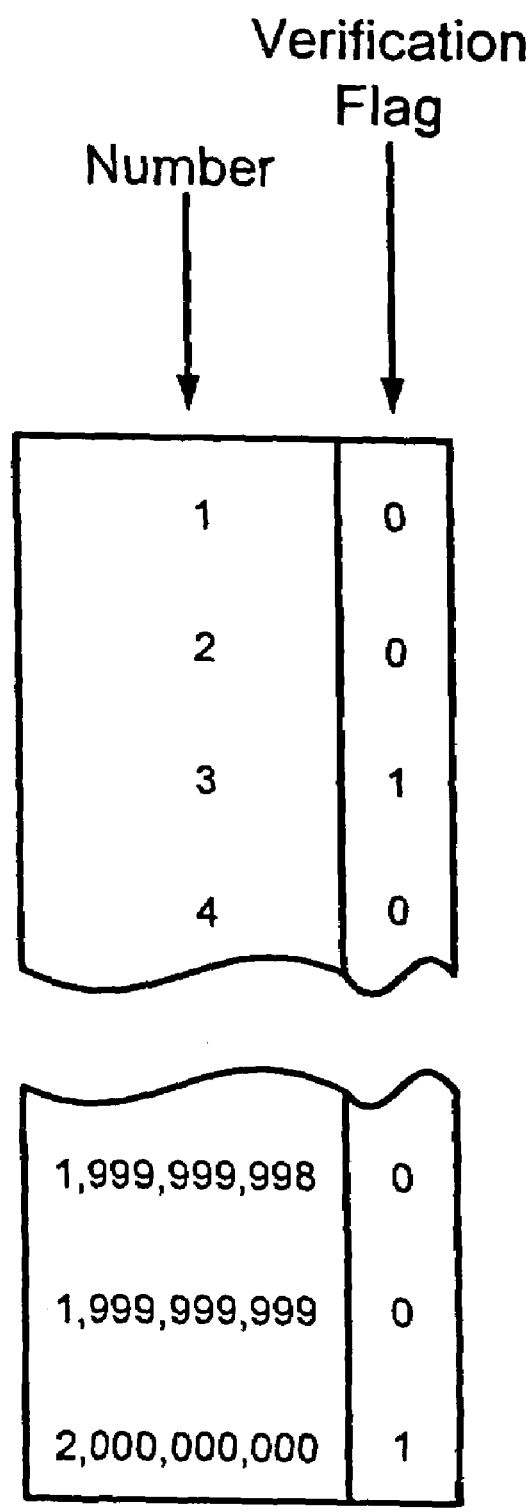
FIG. 17 shows the structure of the code production database and the contents in accordance with one embodiment of the present invention.

Referring now to FIG. 17, the database portion of the bottle cap code server and production database 401 is shown. In particular, FIG. 17 shows the manner in which the bottle cap codes are stored therein. In one embodiment, the actual numbers on the left column are not stored in memory. However, the verification flags are stored. If the verification flag is "0," this indicates that the number corresponding to this flag has not been verified yet. If the verification flag is "1," this indicates that the number corresponding to this flag has been verified and cannot be used again.

Instead of the number itself (i.e., 1, 2, 3, . . . , 1999999999, and 2000000000), a pointer to the appropriate corresponding flag is used. For example, if a code corresponding to number "3" is being verified, the pointer finds the verification flag corresponding to the third entry in memory and finds that a "1" is stored therein. This indicates that this code has already been verified and cannot be used again. The bottle cap server notes this and sends a message or error to either the web server 400 or the user database 402, depending on the embodiment. The web server would then alert the user of the error.

In this embodiment, only 2 billion bits (i.e., the verification flags themselves) are stored in memory. This requires at least 250 MB of memory. In one embodiment, the memory is the conventional random access memory (RAM) with battery backup. Also, as the codes are redeemed, these redeemed codes are stored in memory. Assuming a 20% redemption estimate, approximately 400 million codes or 4 GB of data are needed for the production database. If a user breaks into this database, the entire set of 2 billion codes is not available since they are not stored therein. Instead, the user can only download the redeemed codes which are basically useless. However, the secret keys KEY1 and KEY2 need to be guarded closely. Since these keys are in the production database or bottle cap code server sin some form, the server/production database is physically and electronically secure. In one embodiment, the server and database that maintains these secret keys are in a physically and electronically secure cage that conforms to international banking standards.

In another embodiment, truly random codes are used. In this case, the encryption portion of the Integrated Points System implements an algorithm that incorporates some truly random data to further mix up the seed number. As mentioned above, this random data is usually from the user's computing environment, such as hard disk seek times and time between key strokes. Such an algorithm produces a very good set of random numbers that is most likely unreproducible even if the same seed number is used. These codes are then entered into a production database (similar to the bottle cap code database). When the points program is publicly launched and users submit codes, these codes will be checked against the database to ensure that any valid codes that were submitted cannot be submitted again in the future.

The size of the production database is roughly 2 billion 10-character codes, or approximately 20 GB of database storage. This database is physically and electronically very secure. If a hacker breaks into the database somehow either physically or electronically, these list of codes could be downloaded. In one embodiment, the server and database that maintains these codes are in a physically and electronically secure cage that conforms to international banking standards.

As for verifying the code is a valid code, the implemented approach is to store the full 10 digit string of every valid code received. Then, when a new valid code is received, it is checked against the database of received codes to make sure it hasn't been used before. Since 20% redemption is expected, that would be 400 million valid codes, which would require 4 GB of storage. This solution takes advantage of the fact that the codes were generated using the encryption algorithm described above. When the system validates a code, the 10 digit code decrypts to a single number between 1 and 2 billion. So when a valid code is received, the system sets the corresponding validation bit to 1 in the database. This requires storing 2 billion bits of data, or 250 MB.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. One skilled in the art will readily appreciate that other applications may be substituted for those set forth herein without departing from the spirit and scope of the present invention. Accordingly, the invention should only be limited by the claims included below.

We claim:

1. A method for verifying the validity of an encrypted code generated in base L, the method comprising:

obtaining an encrypted code from a user, that when decrypted is determinable to indicate a value-in base L, the encrypted code obtained by appending a third string, which is an output of applying an encryption algorithm employing a second secret code to a second string composed of an n-bit raw number and an in-bit validation number, the in-bit validation number generated by hashing, with a hash function, a first string with a first secret code, the first string composed of the n-bit raw number and the first secret code;

converting the encrypted code to a base 2 string;

decrypting the base 2 string using the second secret code to generate a recovered second string;

hashing, with the first secret code, an n-bit portion of the recovered second string concatenated with the first secret code to generate a second in-bit validation number;

comparing the remaining in-bits of the recovered second string with the second m-bit validation number to verify the validity of the encrypted code; and if valid then crediting the user with the value indicated by the decrypted code, wherein n=32 and m=16.

2. A method for awarding incentive points to a user, comprising the steps of:

receiving on-line from a user a code generated with encrypted information and obtained by the user off-line;

verifying the validity of the code by processing the encrypted information; and awarding incentive points to the user if the code is valid, wherein the code is generated by:

providing a number portion, deriving a validation portion from the number portion, appending the validation portion to the number portion to form a string, encrypting the string, and deriving the code from the encrypted string by converting the encrypted string to base L string, wherein the string is 48-bits long and the number portion is 32-bits long.

3. A computer-enabled method for awarding incentive points to a user, comprising:

receiving on-line from the user a code generated with encrypted information and obtained by the user offline;

verifying the validity of the code by processing the encrypted information; and awarding incentive points to the user if the code is valid, wherein the code is generated by:

providing a number portion, $S1_{INT}$, from a first string, S1 arranging a first secret key, K1, next to the number portion, $S1_{INT}$, from S1, to form a second string, S2, applying a hash function to S2 to produce a third string, S3, extracting a validation portion, $S1_{VAL}$, from S3 and arranging $S1_{VAL}$ next to $S1_{INT}$ in S1 ($S1=S1_{VAL}+S1_{INT}$), encrypting S1 using a second secret key, K2, to form a fourth string, S4, and deriving the code by converting S4 to a base L fixed-length code string, wherein S1 is 48-bits long and the number portion, $S1_{INT}$, is 32-bits long.

4. A method for offline-online management of incentive points, comprising:

receiving a code, generated by providing a number portion, deriving a validation portion from the number portion, appending the validation portion to the number portion to form a string, encrypting the string, and deriving the code from the encrypted string by converting the encrypted string to base L string, the code obtained off-line and received on-line; and submitting the code to a server that has valid codes, wherein the code is associated with N points maintained by the server in a user account, wherein each point, characterized as a purchase or attention incentive point, is redeemable; and verifying the code against the valid codes to determine if it is valid, wherein if the code is valid, a predetermined number of points are added to the user account, wherein the string is 48-bits long and the number portion is 32-bits long.

5. A method for generating a code that corresponds to incentive points, comprising:

providing a number portion, $S1_{INT}$;

arranging a first secret key, K1, next to $S1_{INT}$ to form a second string, S2;

applying a hash function to S2 to produce a third string, S3;

extracting a validation portion, $S1_{VAL}$, from S3 and arranging $S1_{VAL}$, next to $S1_{INT}$ to produce S1 ($S1=S1_{VAL}+S1_{INT}$);

encrypting S1 using a second secret key, K2, to form a fourth string, S4;

deriving the code by converting S4 to a base L fixed-length code string;

fixing the code onto a medium such that the code is obtainable from the medium off-line, wherein S1 is 48-bits long and the number portion, $S1_{INT}$, is 32-bits long and;

distributing the medium such that the code obtained from the distributed medium is used to receive the incentive points.

6. A method for offline-online management of incentive points, comprising:

receiving a code, generated by providing a number portion, deriving a validation portion from the number portion, appending the validation portion to the number portion to form a string, encrypting the string, and deriving the code from the encrypted string by converting the encrypted string to a base L string, the code obtained off-line and received on-line;

submitting the code to a server that has valid codes, wherein the code is associated with N points maintained by the server in a user account, wherein each point, characterized as a purchase or attention incentive point, is redeemable;

verifying the code against the valid codes to determine if it is valid, wherein if the code is valid, a predetermined number of points are added to the user account, wherein the validation portion is at least 16 bits long, wherein the step of verifying the code includes:

converting the code from a base L string into a base 2 string, $S4_{BASE2}$, decrypting $S4_{BASE2}$ using a second secret key, K2, to form a decrypted first string, S1', providing a number portion from S', arranging a first secret key, K1, next to the number portion from S1' to form a second string, S2', applying a hash function to S2' to form a third string S3', extracting a validation portion from S3' and a validation portion from S1', and determining if the code is valid by comparing the validation portion from S3' with the validation portion from S1', wherein S3' is at least 16 bits long, and wherein S1' is 48-bits long and the number portion is 32-bits long.

* * * * *